(12) United States Patent
Myoki

(10) Patent No.: US 8,294,942 B2
(45) Date of Patent: Oct. 23, 2012

(54) DATA PROCESSING APPARATUS, IMAGE FORMING APPARATUS, AND COMPUTER PROGRAM

(75) Inventor: Yutaka Myoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 11/961,794

(22) Filed: Dec. 20, 2007

(65) Prior Publication Data

US 2008/0165383 A1    Jul. 10, 2008

(30) Foreign Application Priority Data

Jan. 5, 2007    (JP) .................................. 2007-000747

(51) Int. Cl.
*G06K 15/00* (2006.01)

(52) U.S. Cl. .............. 358/1.18; 358/1.14; 358/1.15; 358/1.16; 715/221; 715/224; 715/226

(58) Field of Classification Search .............. 358/1.15; 715/221–226
See application file for complete search history.

(56) References Cited

U.S. PATENT DOCUMENTS

| | | | | |
|---|---|---|---|---|
| 5,592,593 A * | 1/1997 | Speed | ........................... | 358/1.11 |
| 5,611,035 A * | 3/1997 | Hall | ............................... | 345/440 |
| 5,615,316 A * | 3/1997 | Imai et al. | ........................ | 358/1.18 |
| 5,668,897 A * | 9/1997 | Stolfo | ............................. | 382/283 |
| 5,729,665 A * | 3/1998 | Gauthier | ....................... | 358/1.18 |
| 6,078,403 A * | 6/2000 | Palmer | ........................... | 358/1.18 |
| 6,330,073 B1 * | 12/2001 | Sciatto | ........................... | 358/1.18 |
| 6,778,289 B1 * | 8/2004 | Iwata | ............................. | 358/1.15 |
| 6,919,967 B1 * | 7/2005 | Pentecost et al. | ............ | 358/1.15 |
| 7,069,327 B1 * | 6/2006 | Fabre | ............................. | 709/227 |
| 7,106,469 B2 * | 9/2006 | Simpson et al. | ............. | 358/1.15 |
| 2003/0189724 A1 * | 10/2003 | Kloosterman et al. | ........ | 358/1.18 |
| 2005/0094191 A1 * | 5/2005 | Vondran et al. | .............. | 358/1.15 |
| 2006/0023238 A1 * | 2/2006 | Blaszyk et al. | .............. | 358/1.13 |
| 2007/0081190 A1 * | 4/2007 | Prosi | ............................. | 358/1.18 |
| 2007/0253027 A1 * | 11/2007 | Hiebert | ......................... | 358/1.18 |

FOREIGN PATENT DOCUMENTS

| | | |
|---|---|---|
| EP | 1076311 | 2/2001 |
| JP | 4-175923 A | 6/1992 |
| JP | 2000-099289 A | 4/2000 |

* cited by examiner

*Primary Examiner* — King Poon
(74) *Attorney, Agent, or Firm* — Canon USA, Inc., IP Division

(57) ABSTRACT

An apparatus includes a content data acquisition unit configured to acquire content data to be inserted into an insertion area which is set in an image formation area for forming an image, and a content data transmission unit configured to transmit the acquired content data to an image forming apparatus that is capable of forming an image. The apparatus further includes an identification information acquisition unit configured to acquire identification information of the transmitted content data from the image forming apparatus; an image formation data generation unit configured to generate image formation data for forming the image, using the identification information; and an image formation data transmission unit configured to transmit the generated image formation data to the image forming apparatus.

3 Claims, 27 Drawing Sheets

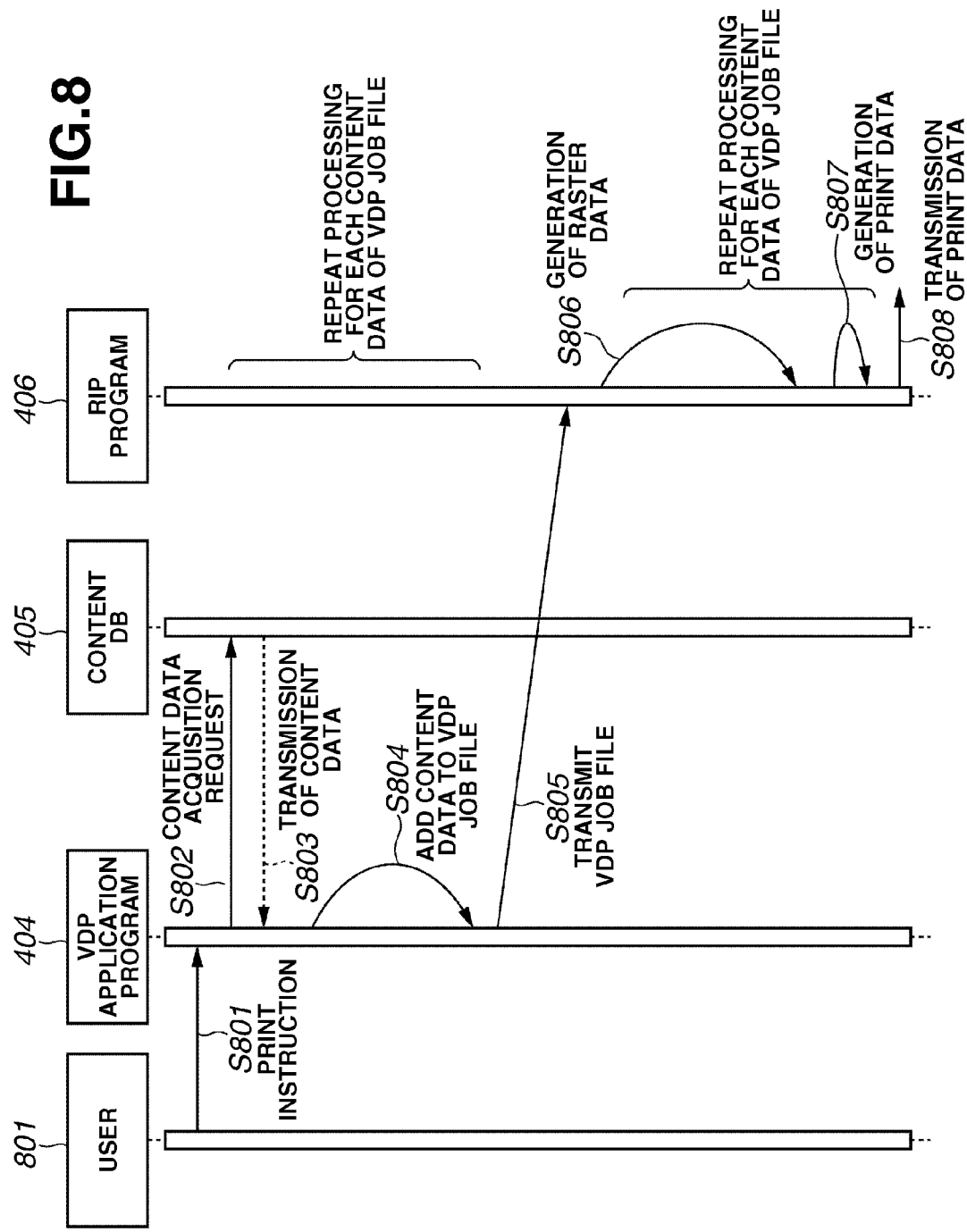

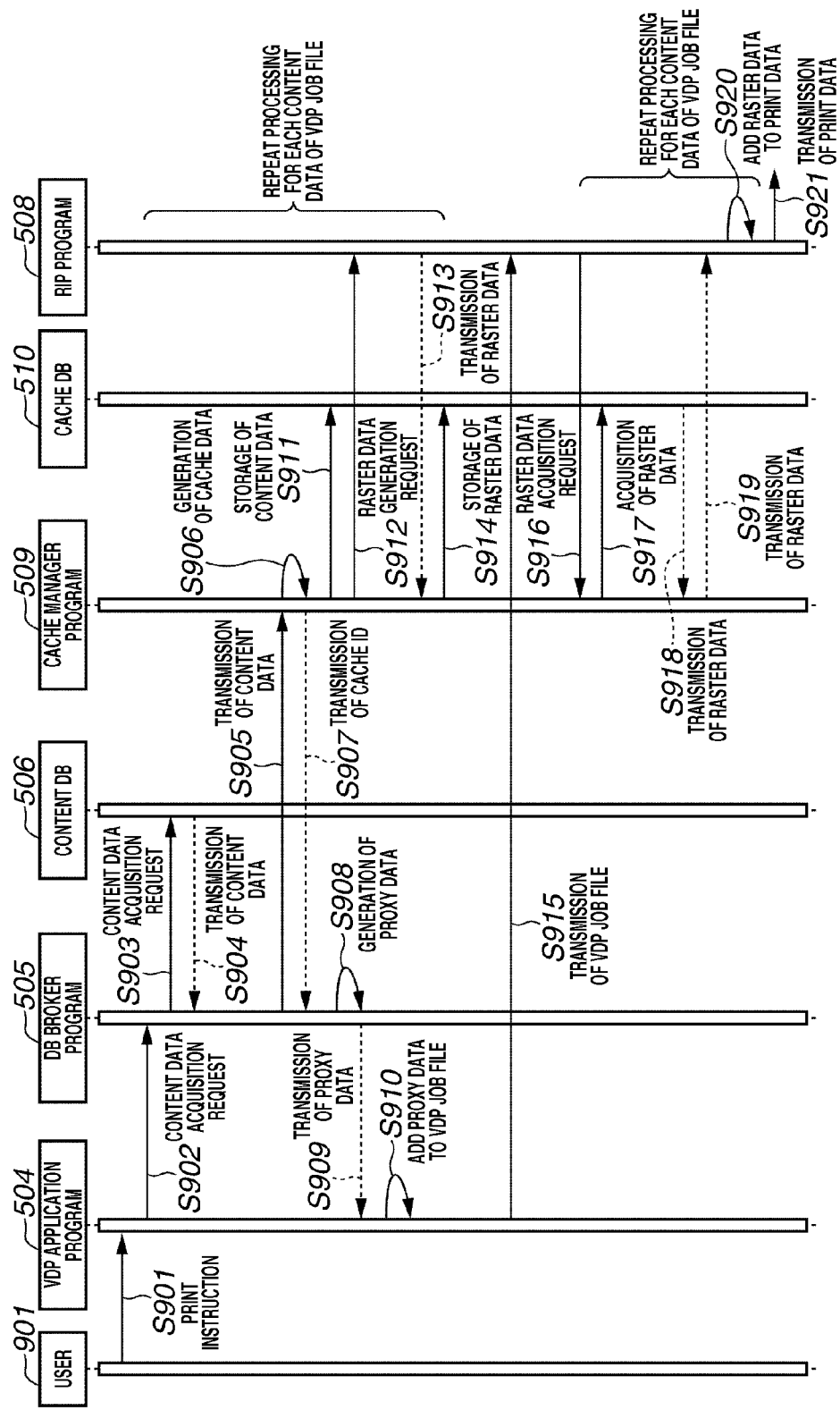

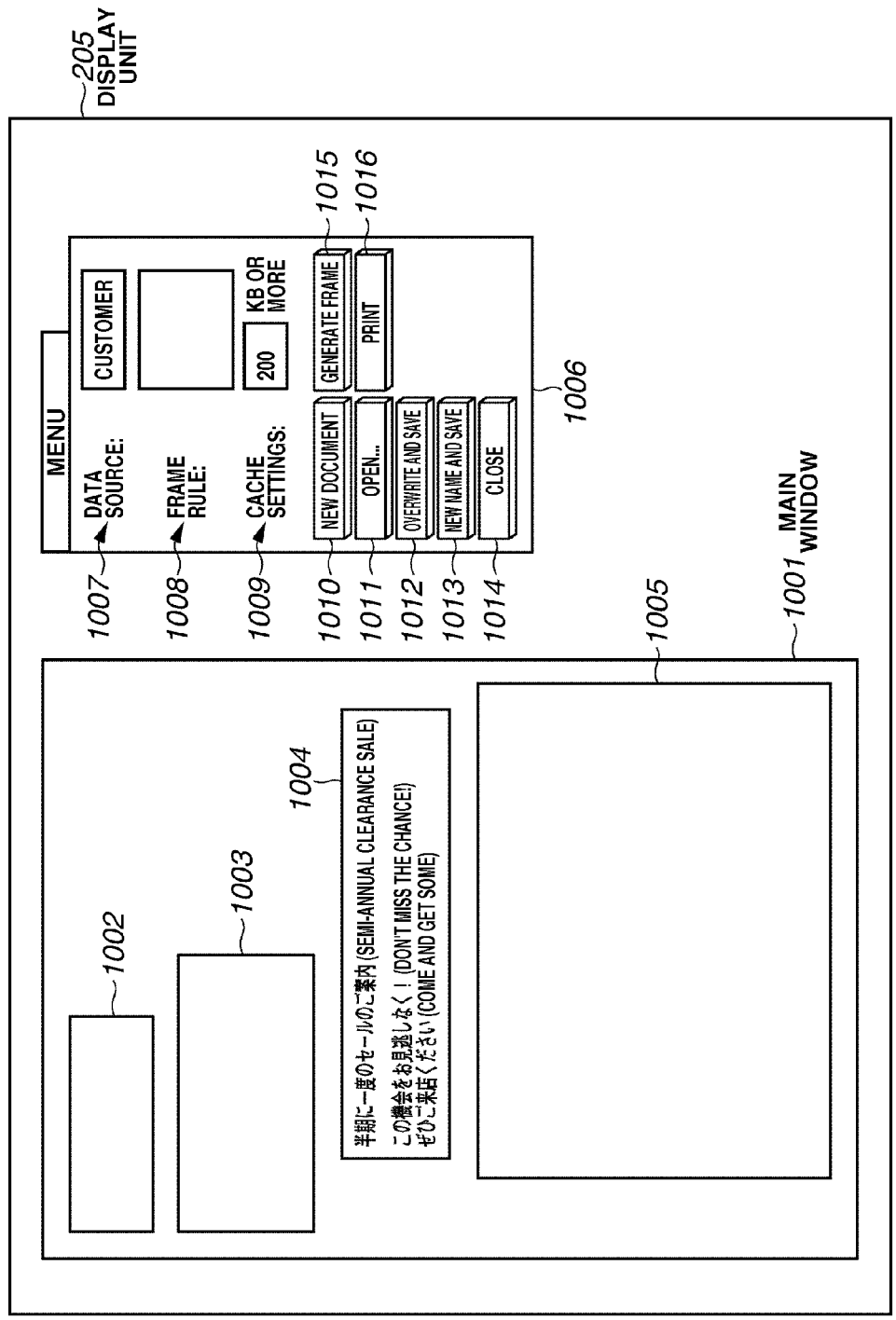

| RECORD NUMBER | LastName | FirstName | Gender | ZipCode | Address |
|---|---|---|---|---|---|
| 1 | 山田 (YAMADA) | 太郎 (TARO) | M | 111-2222 | 東京都千代田区丸の内〇-〇-〇 (〇-〇-〇, MARUNOUCHI, CHIYODA-KU, TOKYO) |
| 2 | 鈴木 (SUZUKI) | 花子 (HANAKO) | F | 333-4444 | 名古屋市中区栄△-△-△ (△-△-△, SAKAE, NAKA-KU, NAGOYA-SHI) |
| 3 | 佐藤 (SATO) | 次郎 (ZIRO) | M | 555-6666 | 大阪市北区難波□-□-□ (□-□-□, NAMBA, KITA-KU, OSAKA-SHI) |
| _1101_ | _1102_ | _1103_ | _1104_ | _1105_ | _1106_ |

| FrameNo | FrameRule | ReusableObject |
|---|---|---|
| 1 | \\Share\img\logo.jpg | TRUE |
| 2 | "〒" $ZipCode<br>$Address<br>$LastName $FirstName "様" | FALSE |
| 3 | | TRUE |
| 4 | if $Gender="M"<br>　\\Share\img\car.jpg<br>else<br>　\\Share\img\bag.jpg | FALSE |

| FILE PATH NAME (UNC NOTATION) | FILE SIZE | IMAGE |
|---|---|---|
| \\Share\img\logo.jpg | 10 KB | |
| \\Share\img\car.jpg | 300 KB | NUR NOCH TAGE (car image) |
| \\Share\img\bag.jpg | 100 KB | (bag image) |

| CACHE ID | CONTENT ID | CONTENT DATA | CACHE (RASTER) DATA |
|---|---|---|---|
|  |  |  |  |
|  |  |  |  |
|  |  |  |  |

1401     1402     1403     1404

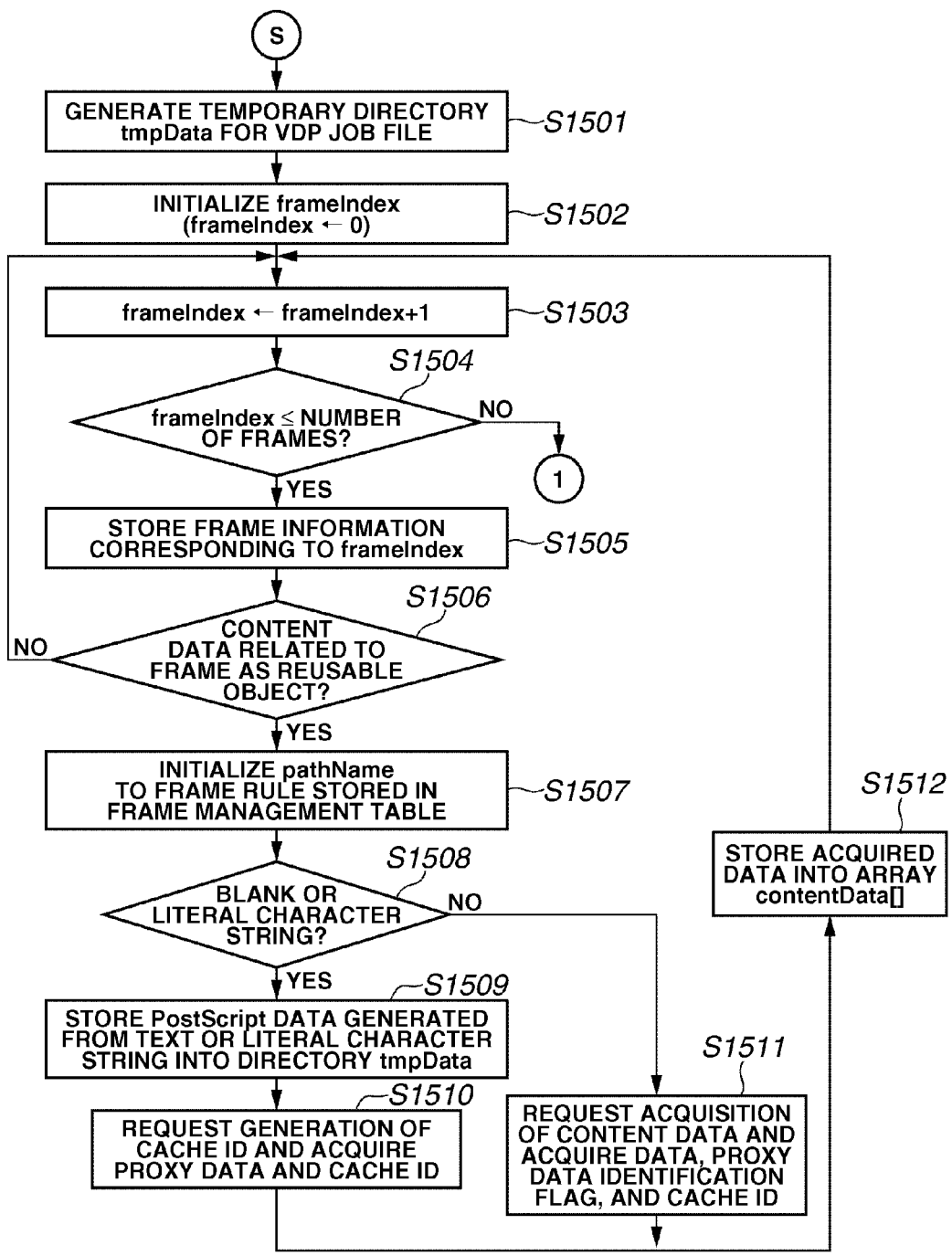

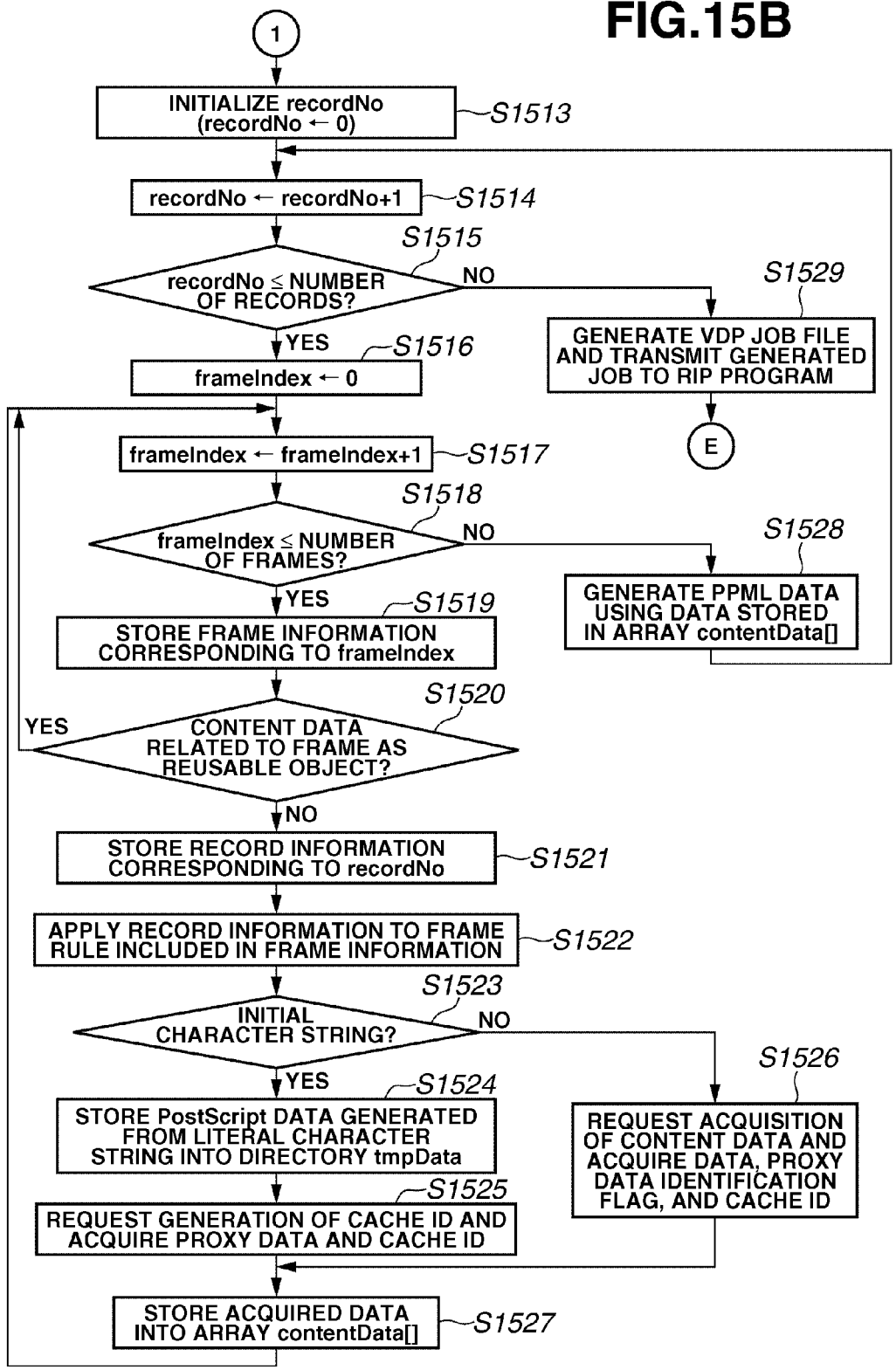

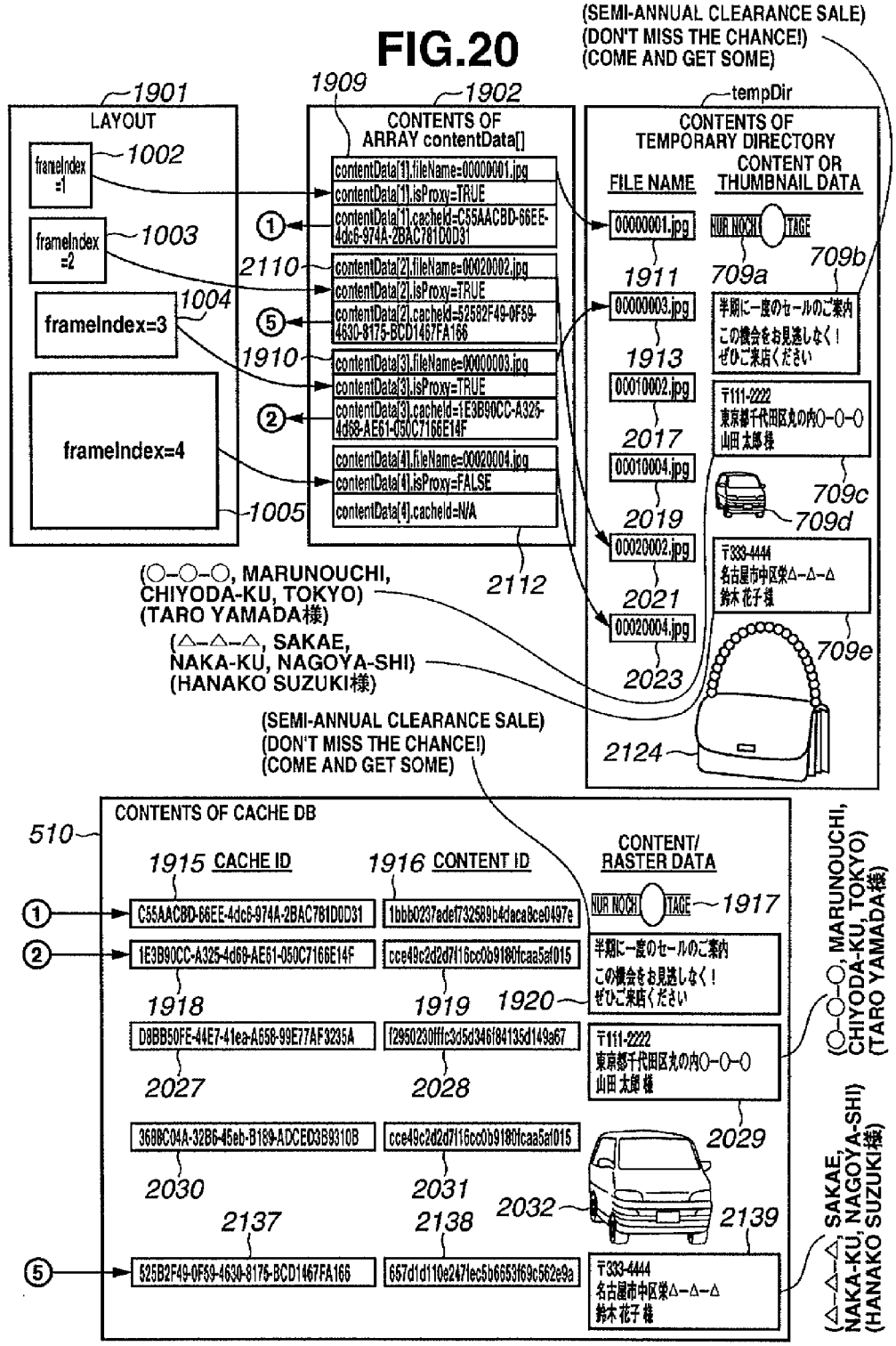

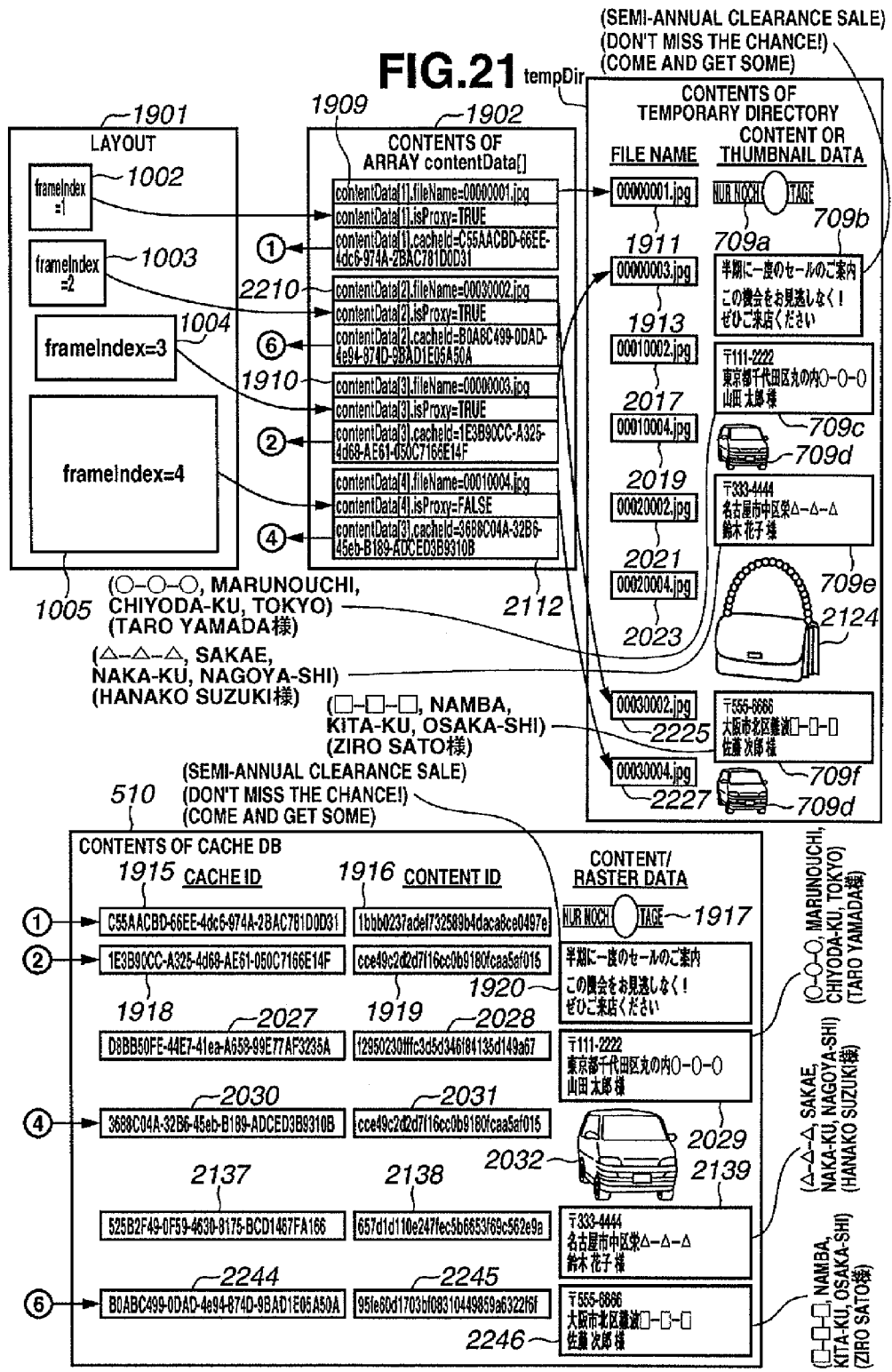

FIG.22

```xml
001  <?xml version="1.0"?>
002  <PPML xmlns="urn://www.podi.org/ppml/ppml2" xmlns:ext="http://xxx.invalid/ppml2-ext">
003  <JOB>
004  <DOCUMENT>
005  <REUSABLE_OBJECT>
006      <OBJECT Position="0.0">
007          <SOURCE Format="image/jpeg" Dimensions="200 100">
008              <EXTERNAL_DATA Src="00000001.jpg" ext:isProxy="TRUE" ext:cacheId="C55AACBD-66EE-4dc6-974A-2BAC781D0D31"/>
009          </SOURCE>
010      </OBJECT>
011      <OCCURRENCE_LIST>
012          <OCCURRENCE Name="00000001" Scope="Document"/>
013      </OCCURRENCE_LIST>
014  </REUSABLE_OBJECT>
015  <REUSABLE_OBJECT>
016      <OBJECT Position="0.0">
017          <SOURCE Format="image/jpeg" Dimensions="400 100">
018              <EXTERNAL_DATA Src="00000003.jpg" ext:isProxy="TRUE" ext:cacheId="1E3B90CC-A325-4d68-AE61-050C7166E14F"/>
019          </SOURCE>
020      </OBJECT>
021      <OCCURRENCE_LIST>
022          <OCCURRENCE Name="00000003" Scope="Document"/>
023      </OCCURRENCE_LIST>
024  </REUSABLE_OBJECT>
025  <!-- Page 1 -->
026  <PAGE>
027      <MARK Position="50 600">
028          <OCCURRENCE_REF Ref="00000001"/>
029      </MARK>
030      <OBJECT Position="50 450">
031          <SOURCE Format="image/jpeg" Dimensions="250 100">
032              <EXTERNAL_DATA Src="00010002.jpg" ext:isProxy="TRUE" ext:cacheId="D8BB50FE-44E7-41ea-A658-99E77AF3235A"/>
033          </SOURCE>
034      </OBJECT>
035      <MARK Position="100 300">
036          <OCCURRENCE_REF Ref="00000003"/>
037      </MARK>
038      <OBJECT Position="50 50">
039          <SOURCE Format="image/jpeg" Dimensions="500 200">
040              <EXTERNAL_DATA Src="00010004.jpg" ext:isProxy="TRUE" ext:cacheId="3688C04A-32B6-45eb-B189-ADCED3B9310B"/>
041          </SOURCE>
042      </OBJECT>
043  </PAGE>
044  <!-- Page 2 -->
045  <PAGE>
046      <MARK Position="50 600">
047          <OCCURRENCE_REF Ref="00000001"/>
048      </MARK>
049      <OBJECT Position="50 450">
050          <SOURCE Format="image/jpeg" Dimensions="250 100">
051              <EXTERNAL_DATA Src="00020002.jpg" ext:isProxy="TRUE" ext:cacheId="52582F49-0F59-4630-8175-BCD1467FA166"/>
052          </SOURCE>
053      </OBJECT>
054      <MARK Position="100 300">
055          <OCCURRENCE_REF Ref="00000003"/>
056      </MARK>
057      <OBJECT Position="50 50">
058          <SOURCE Format="image/jpeg" Dimensions="500 200">
059              <EXTERNAL_DATA Src="00020004.jpg" ext:isProxy="FALSE"/>
060          </SOURCE>
061      </OBJECT>
062  </PAGE>
063  <!-- Page 3 -->
064  <PAGE>
065      <MARK Position="50 600">
066          <OCCURRENCE_REF Ref="00000001"/>
067      </MARK>
068      <OBJECT Position="50 450">
069          <SOURCE Format="image/jpeg" Dimensions="250 100">
070              <EXTERNAL_DATA Src="00010002.jpg" ext:isProxy="TRUE" ext:cacheId="B0A8C499-0DAD-4e94-874D-9BAD1E05A50A"/>
071          </SOURCE>
072      </OBJECT>
073      <MARK Position="100 300">
074          <OCCURRENCE_REF Ref="00000003"/>
075      </MARK>
076      <OBJECT Position="50 50">
077          <SOURCE Format="image/jpeg" Dimensions="500 200">
078              <EXTERNAL_DATA Src="00010004.jpg" ext:isProxy="TRUE" ext:cacheId="3688C04A-32B6-45eb-B189-ADCED3B9310B"/>
079          </SOURCE>
080      </OBJECT>
081  </PAGE>
082  </DOCUMENT>
083  </JOB>
084  </PPML>
```

FIG.24
1917 — NUR NOCH  TAGE
2029 —
〒111-2222
東京都千代田区丸の内〇-〇-〇
(〇-〇-〇, MARUNOUCHI, CHIYODA-KU, TOKYO)
山田 太郎 様
(MR. TARO YAMADA)
半期に一度のセールのご案内
(SEMI-ANNUAL CLEARANCE SALE)
1920 — この機会をお見逃しなく！
(DON'T MISS THE CHANCE!)
ぜひご来店ください
(COME AND GET SOME)
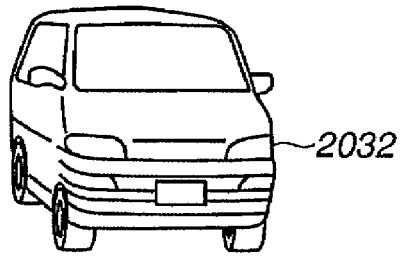
2032

DATA PROCESSING APPARATUS, IMAGE FORMING APPARATUS, AND COMPUTER PROGRAM

BACKGROUND OF THE INVENTION

1. Field of the Invention

The present invention relates to a data processing apparatus which is capable of inserting content data into an insertion area set in an image formation area to form an image. The present invention also relates to an image forming apparatus and a computer program.

2. Description of the Related Art

In the business flow of conventional print industries, fundamental phases are receiving an order from a customer (or a client), producing print products (e.g., magazines, newspapers, catalogs, advertisement prints, gravures, etc) according to the order, and delivering the finished products to the customer (or client). Many of conventional printing companies are still using large scale printing devices, such as offset type printing machines. The printing work according to a conventional printing method includes various processes, such as document reception, design, layout, comprehensive layout (presentation based on a printer output), correction (layout correction or color correction), proof (proof print), block copy preparation, printing, post-processing treatment, and delivery.

The offset type printing machine requires, as a mandatory step, preparation of a block copy. When a block copy is once finished, modifying or correcting the block copy is not easy. Complicated correction, if performed at later timing, increases the total manufacturing cost. Accordingly, the printing work according to the conventional printing method requires careful corrections, including check of the layout and confirmation of colors. In this manner, the conventional printing method requires a large scale device and a sufficient lead time to finish the print works as requested by a customer or client. Furthermore, these works require specialized knowledge or know-how.

On the other hand, electro-photographic printing devices and inkjet printing devices can provide high speed and high quality outputs. To develop a new market of electronic data-based digital printing, a new business model, so called "Print on Demand (referred to POD)," has been recently introduced which is capable of handling a relatively smaller lot of jobs and finishing the jobs in a short period of time without using a large scale device or system, for example, by fully utilizing a digital image forming apparatus, such as a digital copy machine or a digital multifunction peripheral.

In such a POD market, computer-based controls and managements are essential factors to promote the digitization in various printing processes, increase the quality level of print products, and advance the technology employed by the print industries. For example, the POD market includes Print for Pay (PFP) as print service suitable for a copy/print shop or a print company and Centralized Reproduction Department (CRD) as print service suitable for an in-house section of a company.

The print services and commodities provided by print industries or the POD market is required to have the capability of covering the entire field of the business including reception of an order, packing, delivery, after-service, inventory management, and payment management. Furthermore, the capability of collecting production related data, processing the collected data, and reporting the analysis result will provide an efficient supporting system for the corporate planning and management. Furthermore, a system capable of storing the information and timely providing the information to an appropriate section will be required in the future.

However, it is generally difficult to keep skilled workers in the POD market, compared to the conventional print industries. Furthermore, the goal of this new market is satisfying various requirements, such as accomplishing a print job at a low cost, starting a business with a small investment, and reducing the total cost of ownership (TCO).

A conventional printing system can perform a "print with insertion" operation which includes dividing the contents of a document into fixed portions and variable portions and supplying arbitrary data from a database or a Concurrent Versions System (CVS) file into each variable portion to print a different image on each sheet. The printing operation performed according to the above-described technology is referred to as Variable Data Printing (hereinafter, referred to as VDP). The transaction relating to the VDP includes inspection of a print result, finishing of a print product, packaging of a print product, and delivery of a packaged print product.

Personalized Printing Markup Language (PPML) developed through a special program of the Digital Printing Initiative (PODi) is a document format technology applicable to the VDP. The PPML is an eXtensible Markup Language (XML)-based standard language usable for separately describing a document into fixed portions and variable portions which are respectively subjected to Raster Image Processing (hereinafter, referred to as RIP). The processed raster image data are stored and reused. Furthermore, Variable Data exchange (PPML/VDX) is a PPML-based technology that uses content data of Portable Document Format (PDF).

The document format technologies capable of realizing the VDP include FreeForm, VPS, and VIPP in addition to PPML. The FreeForm is a technology usable for the Fiery that EFI has introduced. These technologies are characteristic in performing raster image processing on fixed portions of a document and storing the processed data as master data beforehand, then successively performing raster image processing on variable portions of a document, and combining the processed raster image data with the master data stored beforehand. FreeForm 2 is a technology capable of processing a plurality of master data. Similarly, a technology discussed in Japanese Patent Application Laid-Open No. 4-175923 includes storing overlay data beforehand, combining received original data with the overlay data, and rasterizing the combined data on a bitmap memory.

Variable Print Specifications (VPS) is an extension language of PostScript introduced by Creo Corporation. The VPS divides the contents of a page into a plurality of parts regardless of the nature of each data (fixed data or variable data), performs raster image processing on the data of each divided part, and stores the result of processed data (raster data) into a recording medium (disk) so that the data can be reused. The VPS can realize speedy printout processing because the raster image processing is not required in combining and outputting respective parts.

The Variable-data Intelligent PostScript Printware (VIPP) is a VDP software technology provided by Xerox® Corporation, according to which a client transmits variable data, such as Comma Separated Value (CSV), to a printer. Then, a printer controller of the printer combines the variable data with fixed data and performs raster image processing on the combined data.

A printing system may perform the VDP for a large size of content data, such as image data, which takes a long time to process. The PPML or the PPML/VDX uses a package of fixed data and variable data. If the content data has a large size, the package has a large size. Therefore, performances (e.g., writing speed of data into a recording medium (disk), data processing load of a CPU, and transfer speed of data via a network) may deteriorate.

Furthermore, if the method for packaging fixed data and variable data is applied to a plurality of packages that use the same content data, the same data is repetitively stored in each package. In such cases, generation of some content data is useless. Furthermore, a VDP application that generates a VDP document is independent from a printer that performs print processing of the document. Nevertheless, the document generation processing and the print processing are performed one after another. Therefore, the VDP system cannot execute the processing at an optimized speed. The throughput of the VDP system deteriorates significantly.

SUMMARY OF THE INVENTION

Exemplary embodiments of the present invention are directed to a technique capable of improving the throughput in the processing for forming an image with insertion of content data into an insertion area set in an image formation area.

According to an aspect of the present invention, an apparatus (e.g., computer) includes a content data acquisition unit configured to acquire content data to be inserted into an insertion area which is set in an image formation area for forming an image; a content data transmission unit configured to transmit the content data acquired by the content data acquisition unit to an image forming apparatus that is capable of forming an image; an identification information acquisition unit configured to acquire, from the image forming apparatus, identification information of the content data transmitted from the content data transmission unit; an image formation data generation unit configured to generate image formation data for forming the image, using the identification information; and an image formation data transmission unit configured to transmit the image formation data generated by the image formation data generation unit to the image forming apparatus.

According to another aspect of the present invention, an apparatus (e.g., printer) includes a content data reception unit configured to receive content data to be inserted into an insertion area which is set in an image formation area for forming an image, from a data processing apparatus that generates image formation data for forming the image; an identification information generation unit configured to generate identification information of the content data received by the content data reception unit; an identification information transmission unit configured to transmit the identification information generated by the identification information generation unit to the data processing apparatus; an image data generation unit configured to generate image data corresponding to the content data received by the content data reception unit; a storage unit configured to relate the identification information generated by the identification information generation unit with image data corresponding to content data identified by the identification information, and store the related data; an image formation data reception unit configured to receive the image formation data for forming the image from the data processing apparatus; and an image forming unit configured to form the image based on the image formation data received by the image formation data reception unit, wherein, if the image formation data received by the image formation data reception unit includes the identification information, the image forming unit forms the image based on imaged data stored in the storage unit in relation to the identification information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 8 illustrates a print processing sequence of the printing system illustrated in FIG. 4 which is performed in response to a print instruction from a user according to an exemplary embodiment of the present invention.

FIG. 9 illustrates a print processing sequence of the printing system illustrated in FIG. 5 which is performed in response to a print instruction from a user according to an exemplary embodiment of the present invention.

FIG. 10 illustrates an example layout screen displayed on a display unit according to an exemplary embodiment of the present invention, when a VDP client executes a VDP application program loaded into a random access memory (RAM).

FIG. 11 illustrates example contents of a CUSTOMER table designated as an example data source related to a VDP document being currently generated according to an exemplary embodiment of the present invention.

FIG. 12 illustrates a structure of a frame management table used when frame information is stored in a RAM and example contents of the frame information according to an exemplary embodiment of the present invention.

FIG. 13 illustrates example information of content data stored in a content database (DB) according to an exemplary embodiment of the present invention.

FIG. 14 illustrates an example structure of a cache database (DB) according to an exemplary embodiment of the present invention.

FIG. 15A is a flowchart illustrating an example operation of the VDP application program according to an exemplary embodiment of the present invention, performed when a user presses a button to instruct a print operation.

FIG. 15B is a flowchart illustrating the rest of the example operation of the VDP application program (illustrated in FIG. 15A) according to an exemplary embodiment of the present invention.

FIG. 20 illustrates an example internal state of the VDP system that has completed the processing for a second page of the job according to an exemplary embodiment of the present invention.

FIG. 21 illustrates an example internal state of the VDP system that has completed the processing for a third page (final page) of the job according to an exemplary embodiment of the present invention.

FIG. 22 illustrates an example PPML data file according to an exemplary embodiment of the present invention.

FIG. 24 illustrates an example print result of the first page according to an exemplary embodiment of the present invention.

DETAILED DESCRIPTION OF THE EMBODIMENTS

Figure 1:
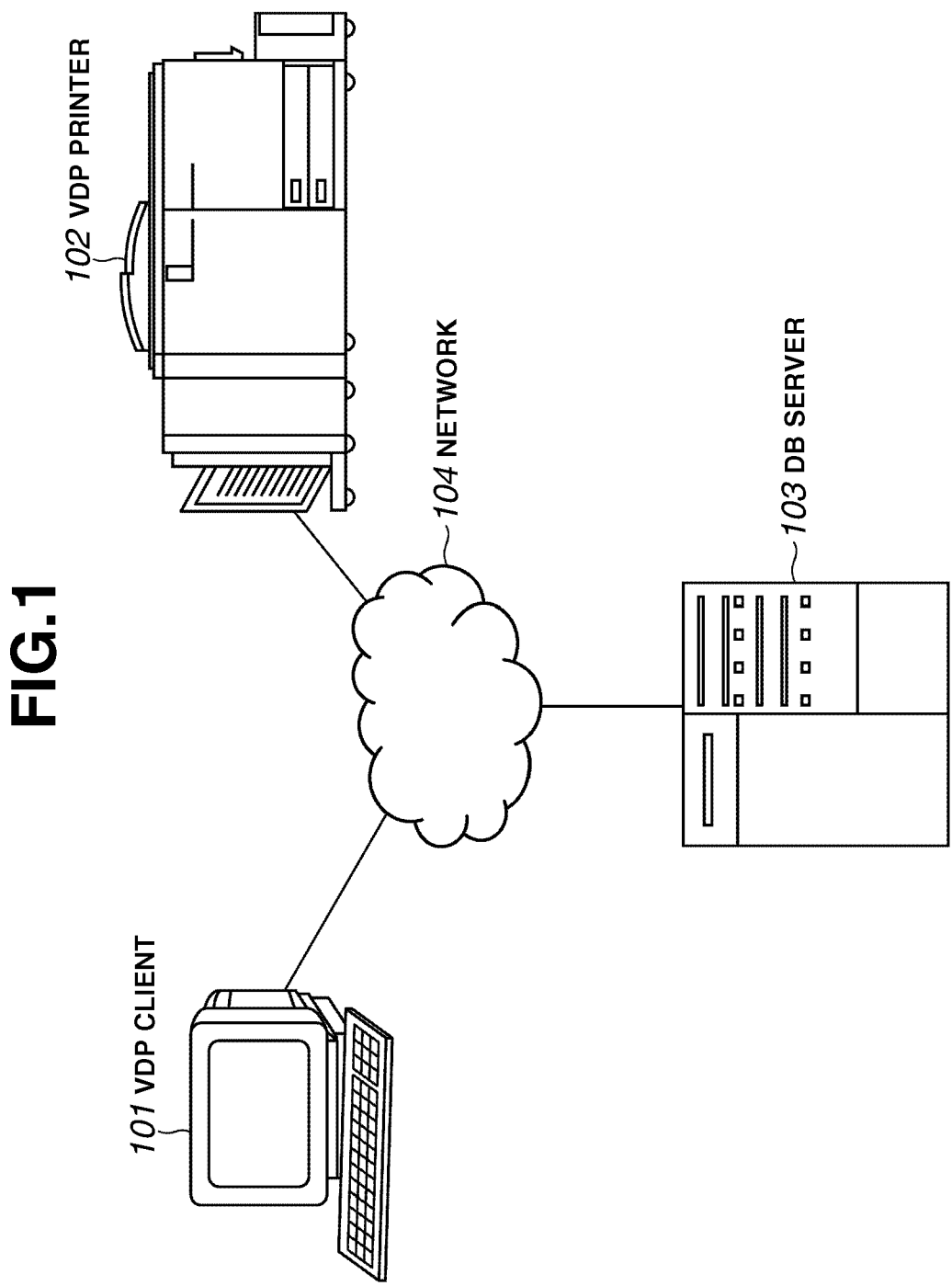
FIG. 1 illustrates a printing system according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

A printing system (i.e., an example of an image forming system) is described below with reference to a diagram of FIG. 1. In FIG. 1, the printing system includes a variable data printing (VDP) client 101 that can be operated by a user, a VDP printer 102, a database (DB) server 103, and a network 104. The VDP client 101 is, for example, a personal computer (PC) which has a network interface connected to the network 104. The VDP printer 102 receives a print instruction from the VDP client 101 via the network 104. Similar to the VDP client 101, the VDP printer 102 has a network interface connected to the network 104. As described above, the VDP client 101 can transmit a print instruction to the VDP printer 102 via the network 104. The VDP client 101 functions as a data processing apparatus and the VDP printer 102 functions as an image forming apparatus.

The DB server 103 stores a database. The DB server 103 can perform various processing, including receiving data from an external device via the network 104, storing (writing) the received data into the database, reading data from the database, and transmitting the read data to an external device via the network 104. Similar to the VDP client 101 and the VDP printer 102, the DB server 103 has a network interface connected to the network 104.

Figure 2:
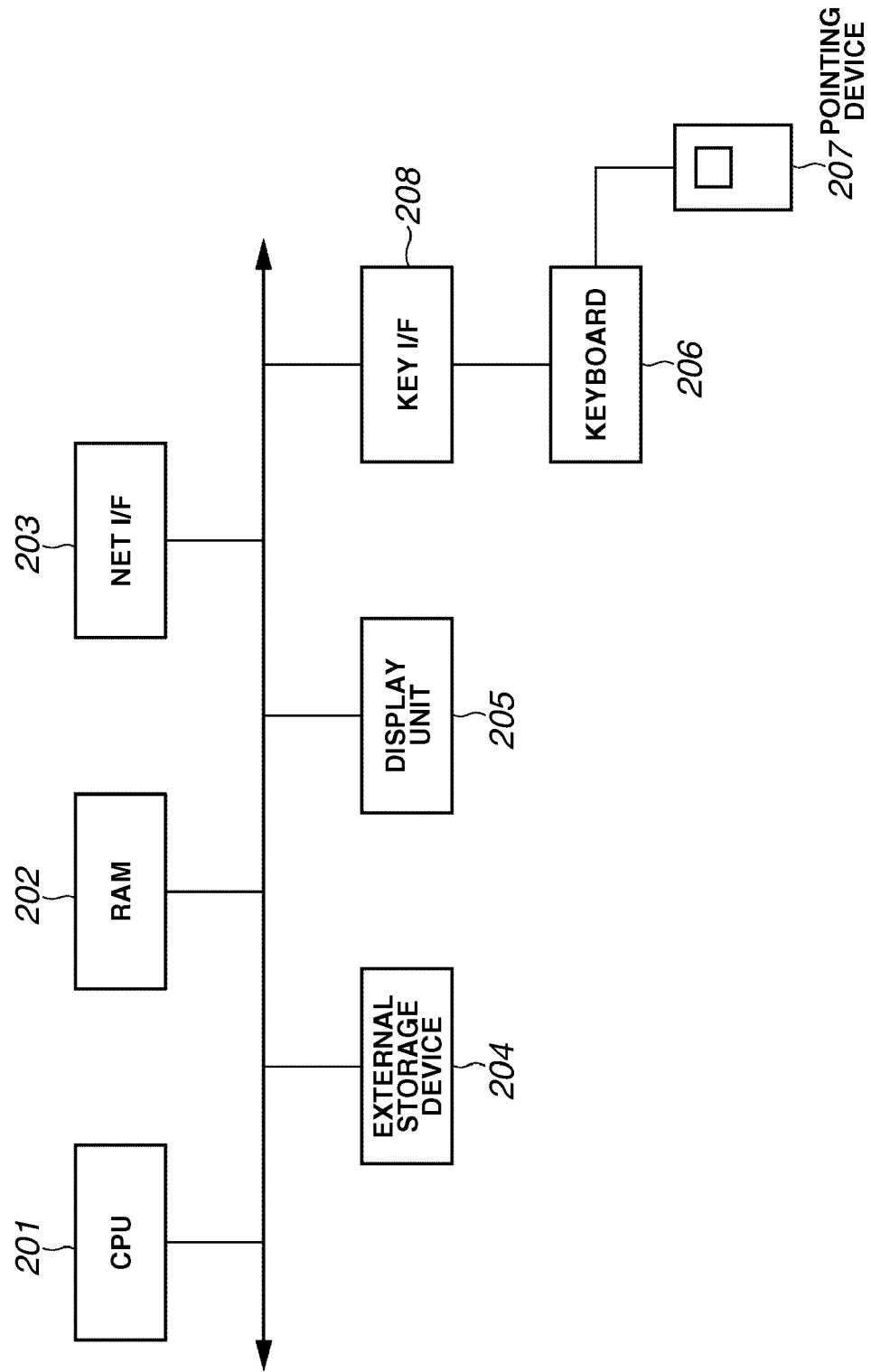
FIG. 2 is a block diagram illustrating a VDP client and a database (DB) server according to an exemplary embodiment of the present invention.

A computer apparatus and a printer apparatus used for the printing system illustrated in FIG. 1 are described below with reference to FIGS. 2 and 3. FIG. 2 is a block diagram illustrating an example arrangement of the VDP client 101 and the DB server 103. In FIG. 2, a central processing unit (CPU) 201 controls an overall operation of the apparatus according to a control program stored in a random access memory (RAM) 202. The RAM 202 is an internal storage unit storing programs that the CPU 201 executes and various data including document images.

A network interface (Net I/F) 203 performs transmission/reception of data between the network 104 and the apparatus (i.e., the VDP client 101 or the DB server 103) under a control of the CPU 201. An external storage device 204 is, for example, a magnetic disk that can store data. The apparatus includes a display unit 205, a keyboard 206, and a pointing device 207 (e.g., a mouse). A keyboard interface (Key I/F) 208 connects the keyboard 206 and the pointing device 207 to the apparatus (i.e., the VDP client 101 or the DB server 103).

A program stored in the RAM 202 can use a function of the operating system (OS) stored in the RAM 202, if necessary to execute processing. More specifically, a program stored in the RAM 202 can perform reading/writing of data contents being temporarily stored in the RAM 202 or reading/writing of data to the external storage device 204, and can perform transmission/reception of data via the network interface 203. Furthermore, the program can receive data/information from a user via the keyboard 206 or the pointing device 207, or can cause the display unit 205 to display an image.

The DB server 103 stores a database in the external storage device 204. A database program stored in the RAM 202 receives a database reading/writing command from the VDP client 101 via the network interface 203, and reads data corresponding to the reading/writing command from the database. Then, the database program stored in the RAM 202 transmits the readout data to the VDP client 101 via the network interface 203.

Figure 3:
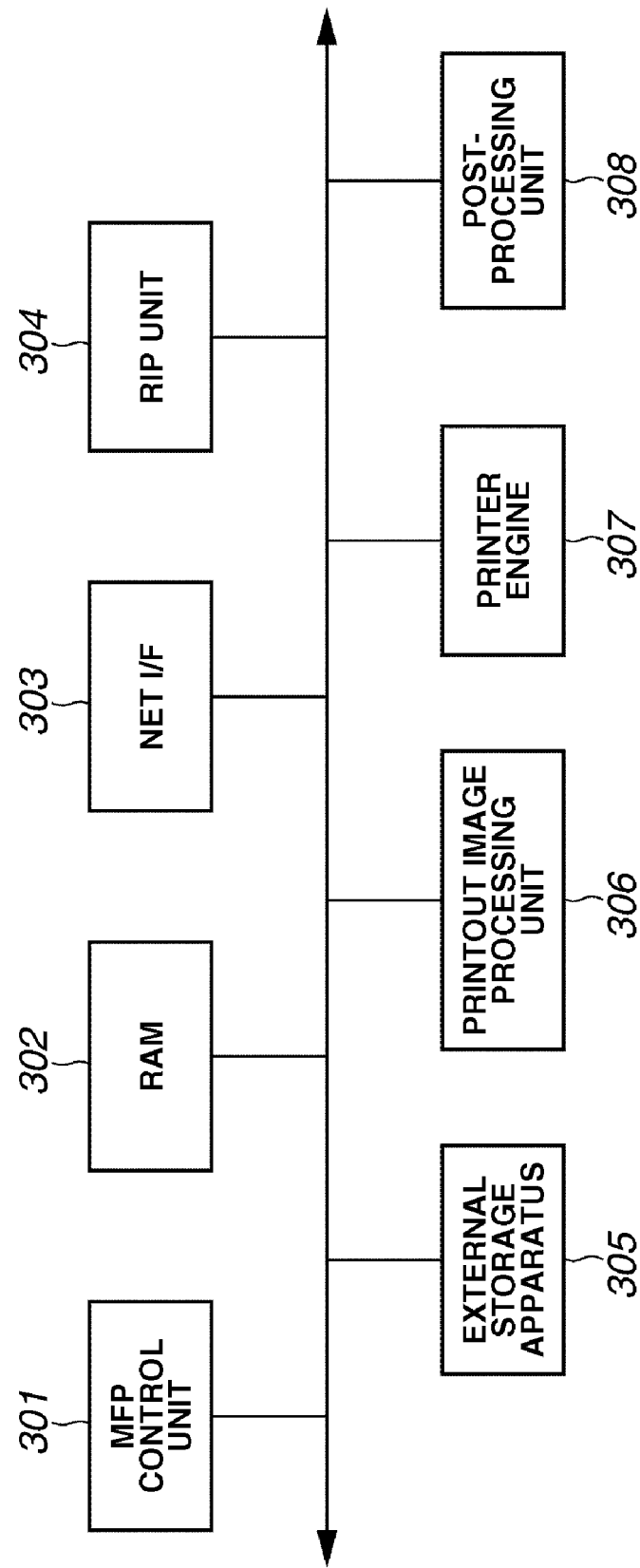
FIG. 3 is a block diagram illustrating a VDP printer according to an exemplary embodiment of the present invention.

FIG. 3 is a block diagram illustrating an example arrangement of the VDP printer 102. The VDP printer 102 includes a multifunction peripheral (MFP) control unit 301, a RAM 302, a network interface 303, a raster image processing (RIP) unit 304, an external storage apparatus 305, a printout image processing unit 306, a printer engine 307, and a post-processing unit 308.

The MFP control unit 301 controls an overall operation of the VDP printer 102. The RAM 302, the network interface 303, and the external storage apparatus 305 are functionally similar to the RAM 202, the network interface 203, and the external storage device 204 illustrated in FIG. 2 respectively.

The RIP unit 304 receives print data from the network interface 303 and, if the received print data is Page Description Language (PDL) data, interprets the print data and performs raster image processing. The printout image processing unit 306 performs image processing on raster data (i.e., raster image processed data) received from the RIP unit 304 and generates image data. The printer engine 307, including a paper (or sheet) feeding function, can print an image on the paper (or sheet) based on the image data generated by the printout image processing unit 306. The post-processing unit 308 receives the printed sheet from the printer engine 307 and performs sheet sorting processing and sheet finishing processing for the received sheets.

Figure 4:
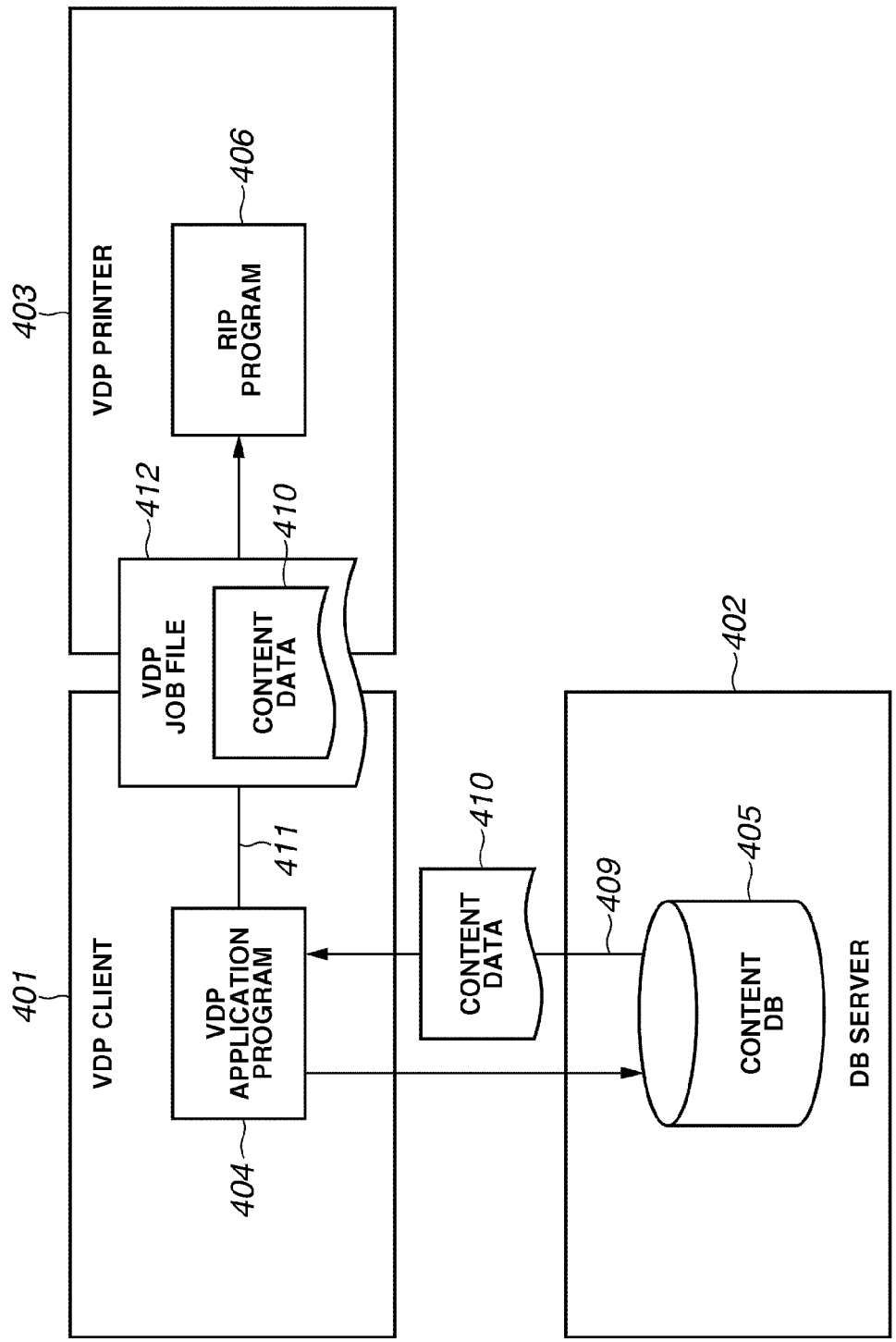
FIG. 4 is a block diagram illustrating a fundamental arrangement of the printing system according to an exemplary embodiment of the present invention as an example.

An example arrangement of the printing system is described below with reference to FIGS. 4 and 5. FIG. 4 is a block diagram illustrating a fundamental arrangement of the printing system. The printing system includes a VDP client 401, a DB server 402, and a VDP printer 403. The VDP client 401 includes a VDP application program 404 that operates under a control of the OS. The DB server 402 manages the content DB 405. The VDP printer 403 includes a RIP program 406 that operates under a control of the OS.

The VDP application program 404 transmits an acquisition request to the DB server 402 via a communication path 408, to acquire content data corresponding to the content designated as fixed data or variable data in a VDP document that a user edits. The DB server 402 acquires content data 410 from the content DB 405 based on the content data acquisition request received from the VDP application program 404. Then, the DB server 402 transmits the acquired content data 410 to the VDP client 401 via a communication path 409. The VDP application program 404 generates a VDP job file 412 based on the content data 410 acquired from the DB server 402. In this case, the VDP application program 404 generates the VDP job file 412 using a VDP document format (e.g., PPML file).

The content data 410 acquired from the DB server 402 is directly stored in the VDP job file 412. The VDP application program 404 transmits the generated VDP job file 412 to The VDP printer 403 via a communication path 411. When the VDP printer 403 receives the VDP job file 412, the RIP program 406 performs RIP processing on the received VDP job file 412 and transmits a result of the RIP processing to the printer engine 307, thereby accomplishing print processing of the VDP job file 412.

Figure 5:
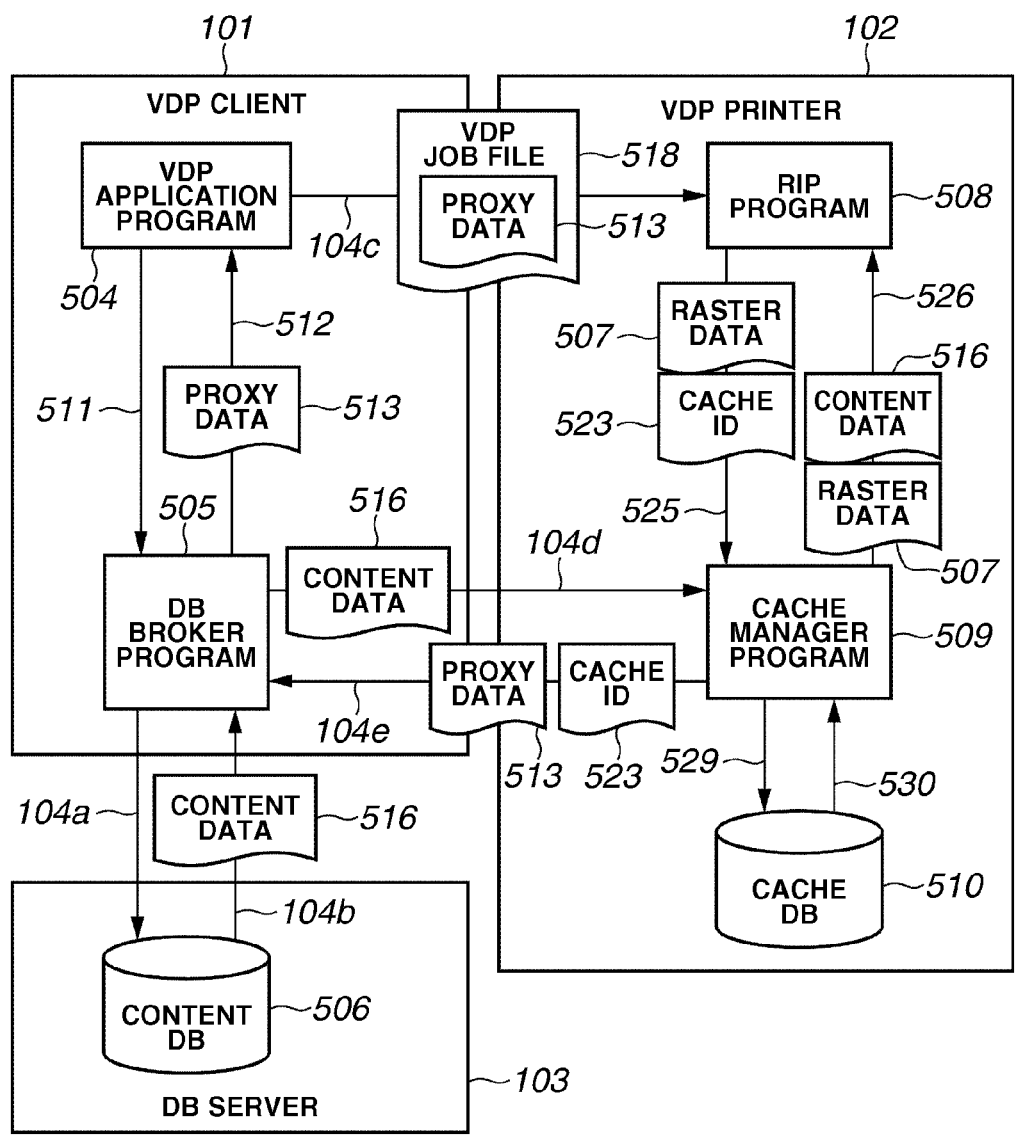
FIG. 5 is a block diagram illustrating an example of the printing system according to an exemplary embodiment of the present invention.

FIG. 5 is a block diagram illustrating an example arrangement of the printing system. More specifically, FIG. 5 is logic blocks (program module, data entity, and communication path) relating to an operation according to an exemplary embodiment, applicable to the VDP client 101, the VDP printer 102, the DB server 103, and the network 104 illustrated in FIG. 1.

In FIG. 5, the VDP client 101 operates under control of the OS. In general, a VDP application program 504 and a DB broker program 505 are stored in the external storage device 204. The VDP application program 504 and the DB broker program 505 can be loaded into the RAM 202 and enters an executable state under a control of the OS in response to an execution instruction from a user, the OS, or another program.

The DB broker program 505 intervenes between the VDP application program 504 and the content DB 506 to transmit a content data acquisition request. The DB broker program 505 performs communication with a cache manager program 509 of the VDP printer 102, on behalf of the VDP application program 504. The VDP application program 504 transmits the content data acquisition request to the DB broker program 505 via a communication path 511. The DB broker program 505 transmits an acquisition request of content data 516 to the DB server 103 via a communication path 104a, on behalf of the VDP application program 504.

In response to the content data acquisition request, the DB server 103 transmits the content data 516 to the DB broker program 505 via a communication path 104b. The DB broker program 505 generates proxy data 513 and transmits the generated proxy data 513 to the VDP application program 504 via a communication path 512 as shown in FIG. 5. The DB broker program 505 transmits the content data 516 to the cache manager program 509 via a communication path 104d. In response to transmission of the content data 516, the cache manager program 509 transmits a cache ID 523 to the DB broker program 505 via a communication path 104e. The VDP application program 504 generates a VDP job file 518 based on the proxy data 513 acquired from the DB broker program 505 and transmits the generated VDP job file 518 to the VDP printer 102 via a communication path 104c as shown in FIG. 5.

The VDP job file 518 directly stores the proxy data 513 acquired from the DB broker program 505 via the communication path 512. The communications using the communication path 511 for the content data acquisition request and the communication path 512 for the proxy data 513 can be performed under control of the OS as interprocess communication between the VDP application program 504 and the DB broker program 505. The communications using the communication paths 104c, 104d, and 104e for the VDP job file 518, the content data 516, and the cache ID 523 can be performed via the network interfaces 203 and 303 of the VDP client 101 and the VDP printer 102.

The DB server 103 operates under a control of the OS. The external storage device 204 of the DB server 103 stores the content DB 506. The program operating in the VDP client 101 or other computer can communicate with a database program (not illustrated) operating in the DB server 103 via the network interface 203 of the DB server 103. Thus, the program operating in the VDP client 101 or other computer can read and write contents (the content data 516) of the content DB 506.

As described above, the DB broker program 505 transmits an acquisition request of the content data 516 to the DB server 103 via the communication path 104a. The DB server 103 transmits the content data 516 to the DB broker program 505 via the communication path 104b in response to the content data acquisition request. The communications using the communication paths 104a and 104b can be performed via the network interface 203 of the VDP client 101 and the network interface 203 of the DB server 103.

The VDP printer 102 operates under control of the MFP control unit 301. The external storage apparatus 305 of the VDP printer 102 stores a cache DB 510. The RAM 302 of the VDP printer 102 stores a RIP program 508 and a cache manager program 509 in an executable state. The RIP program 508 receives the VDP job file 518 via the network interface 303 and stores data of the VDP job file 518, if necessary, to the external storage apparatus 305. Then, the RIP program 508 invokes the cache manager program 509, if necessary, and controls the printout image processing unit 306 and the printer engine 307 to print the contents of VDP job file 518.

The cache manager program 509 can read and write the contents of cache DB 510 under control of the MFP control unit 301. The cache manager program 509 transmits the content data 516 to the RIP program 508 via a communication path 526. In response to an acquisition request of the content data 516, the RIP program 508 transmits raster data 507 to the cache manager program 509 via a communication path 525. Furthermore, the RIP program 508 transmits a cache data acquisition request (i.e., the cache ID 523) to the cache manager program 509 via the communication path 525. Furthermore, in response to the cache data acquisition request (i.e., an acquisition request of the cache ID 523), the cache manager program 509 transmits the raster data 507 to the RIP program 508 via the communication path 526. The communications using the communication paths 525 and 526 can be performed under control of the MFP control unit 301 as interprocess communication between the RIP program 508 and cache manager program 509.

Next, example structures of the VDP job file 412 and the VDP job file 518 are described with reference to FIGS. 6, 7A and 7B.

Figure 6:
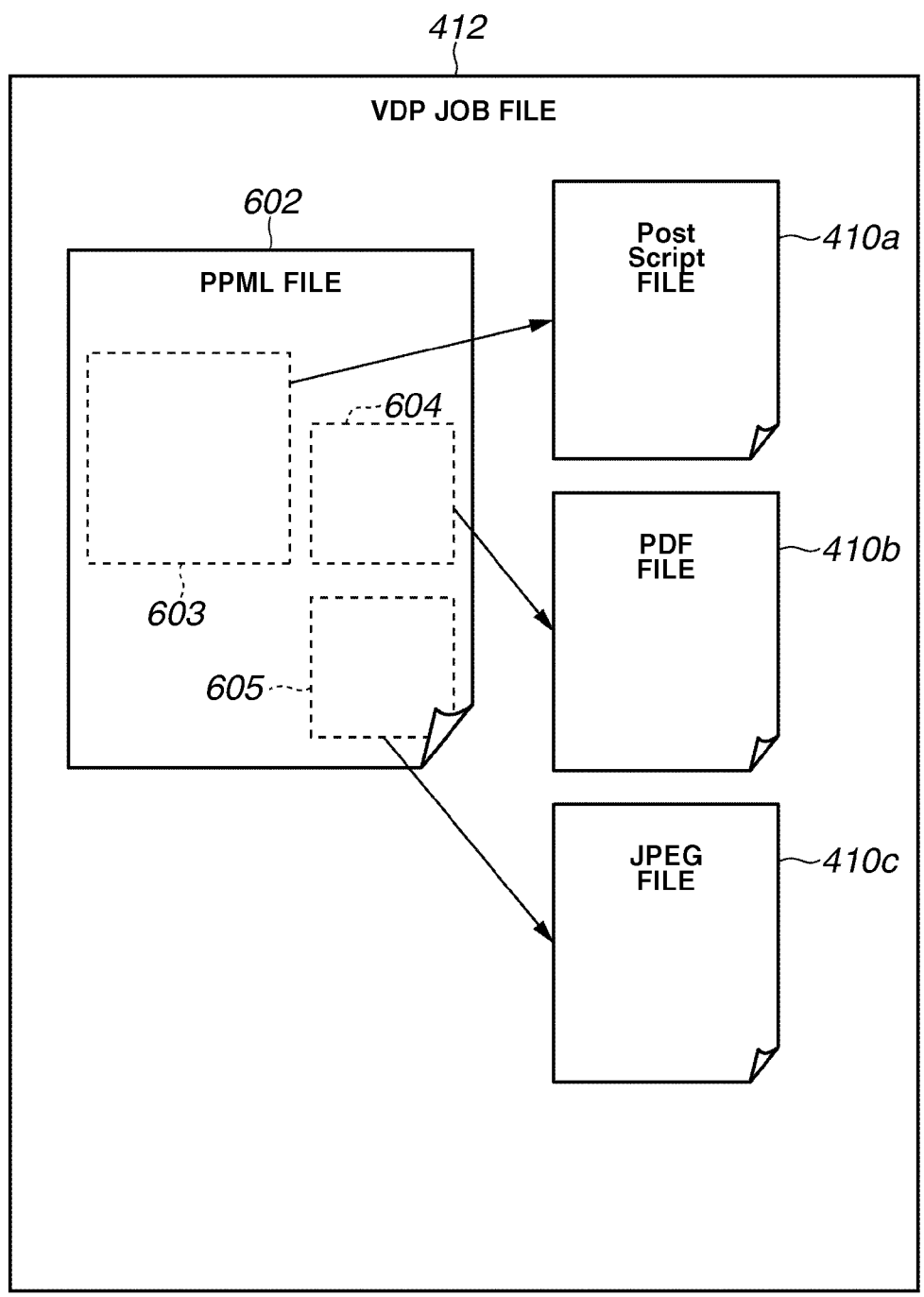
FIG. 6 illustrates an example of a VDP job file according to an exemplary embodiment of the present invention, using the PPML format technology.

FIG. 6 illustrates an example structure of the VDP job file 412 including a PPML file 602. According to the PPML format, one VDP job file 601 includes only one PPML file 602.

The VDP job file 412 includes a PostScript file 410a, a PDF file 410b, and a JPEG file 410c which are files corresponding to the content data 410 illustrated in FIG. 4. The PPML file 602 defines drawing areas 603, 604, and 605. These drawing areas 603 through 605 are related to the files 410a through 410c.

The VDP job file 412 can use an arbitrary method for transmitting the files 410a through 410c and 602, if any agreement or negotiation is established beforehand between the VDP client 401 and the VDP printer 403. In general, a ZIP format or other compression format can be used to transmit a compressed file combining the above-described files 410a through 410c and 602.

The RIP program 406 receives the VDP job file 412 and, if the VDP job file 412 is compressed, expands the VDP job file 412 and reconstructs the files 410a through 410c and 602. Then, the RIP program 406 performs RIP processing based on the information included in the files 410a through 410c and 602.

Figure 7A:
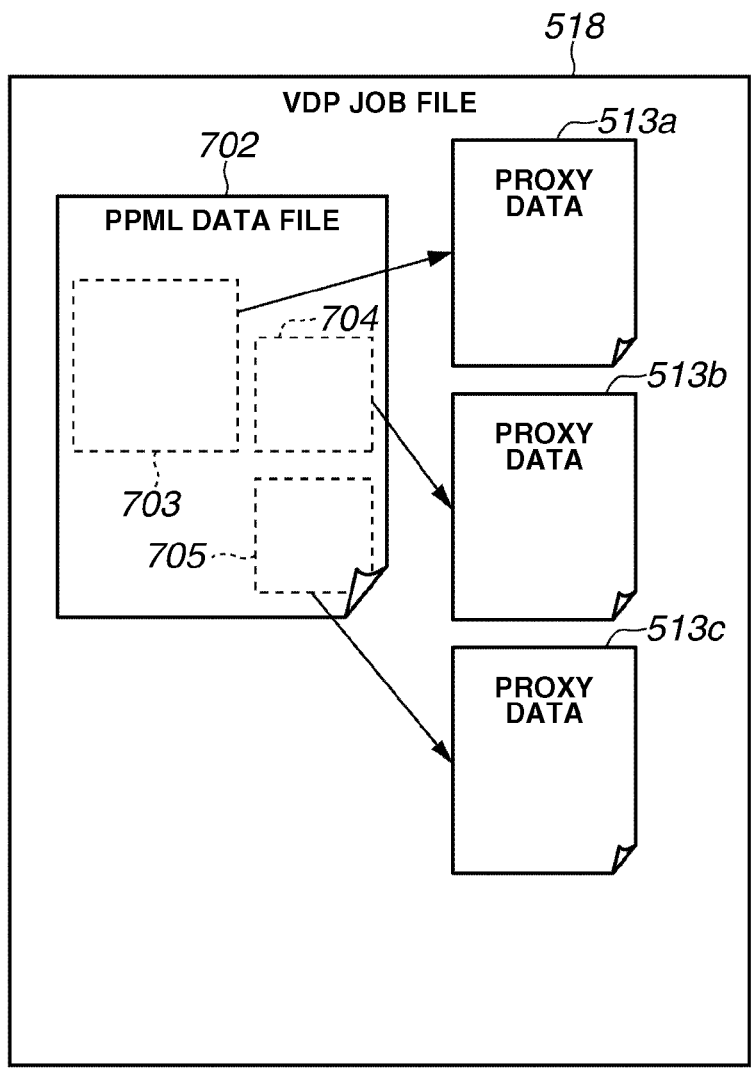
FIGS. 7A and 7B illustrate an example of a VDP job file according to an exemplary embodiment of the present invention document, using the PPML format technology.

FIG. 7A illustrates an example structure of the VDP job file 518 including a PPML file 702. According to the PPML format, one VDP job file 701 includes only one PPML file 702. The PPML file 702 defines drawing areas 703, 704, and 705.

The VDP job file 518 includes proxy data 513a through 513c which correspond to the proxy data 513 (i.e., data replaceable with the content data 516). FIG. 7B illustrates an example structure of the proxy data 513. As illustrated in FIG. 7B, the proxy data 513 includes the cache ID 523 and thumbnail data 709. The cache ID 523 is identification information of the content data 516. Each of the proxy data 513a through 513c has a similar structure. The drawing areas 703 through 705 are related to the proxy data 513a through 513c. According to an exemplary embodiment, the VDP application program 504 can combine and compress the above-described files into a single file using the ZIP format and can transmit the compressed file (the VDP job file 518) to the VDP printer 102.

The RIP program 508 receives the VDP job file 518 and expands the VDP job file 518 to reconstruct the files 513a through 513c and 702. Then, the RIP program 508 transmits the cache ID 523 to the cache manager program 509. In response to the received cache ID 523, the cache manager program 509 transmits the raster data 507 to the RIP program 508. The RIP program 508 performs RIP processing based on the reconstructed files 513a through 513c and 702 while acquiring the raster data 507.

An example print processing sequence performed in the printing system is described with reference to FIGS. 8 and 9.

FIG. 8 illustrates an example print processing sequence of the printing system illustrated in FIG. 4 performed in response to a print instruction from a user. FIG. 8 includes messages representing communications via the network 104 and the description with a mark ("}") which integrates a plurality of messages. Accordingly, FIG. 8 does not strictly comply with the notation of Unified Modeling Language (UML).

A user 801 is an example actor who uses the printing system illustrated in FIG. 4. An actor represents a role of an object outside the system which can directly interact with objects in the system. In an actual printing system, the user 801 may be an administrator of the DB server 103 or an operator of the VDP printer 102. The number of actors is not limited to one, although FIG. 8 illustrates only one user 801 who instructs a print.

First, in step S801, the user 801 instructs a print to the VDP application program 404 via the keyboard 206 or the pointing device 207. In step S802, the VDP application program 404 transmits a request message for acquiring the content data 410 to the content DB 405 via the communication path 408.

In step S803, the content DB 405 transmits the requested content data 410 to the VDP application program 404 via the communication path 409. The VDP application program 404 and the content DB 405 repeat the processing of steps S802 and S803 for each content data 410 of the VDP job file 412. According to the VDP job file 412 illustrated in FIG. 6, the processing of steps S802 and S803 is repeated for each of three content data 410a through 410c.

In step S804, the VDP application program 404 generates the VDP job file 412 using more than or equal to one piece of content data 410 acquired through the processing of steps S802 and S803. The VDP job file 412 generated in step S804 has a structure, for example, illustrated in FIG. 6.

In step S805, the VDP application program 404 transmits the VDP job file 412 generated in step S804 to the RIP program 406 via the communication path 411. In step S806, the RIP program 406 performs RIP processing on the content data 410 included in the VDP job file 412 received in step S805 and generates raster data.

The RIP program 406 repeats the processing of step S806 for each content data 410 included in the VDP job file 412. According to the VDP job file 412 illustrated in FIG. 6, the processing of step S806 is repeated for each of three content data 410a through 410c.

In step S807, the RIP program 406 generates print data using the raster data generated in step S806. Then, in step S808, the RIP program 406 performs print processing of the print data.

FIG. 9 illustrates an example print processing sequence of the printing system illustrated in FIG. 5 performed in response to a print instruction from a user. Similar to FIG. 8, FIG. 9 includes messages representing communications via the network 104 and the description with a mark ("}") that integrates a plurality of messages. Accordingly, FIG. 9 does not strictly comply with the notation of the UML. Furthermore, a description for the processing of the VDP client 101 and the operation of the VDP printer 102 performed concurrently does not strictly comply with the notation of the UML. In FIG. 9, similar to the user 801 illustrated in FIG. 8, a user 901 is an example actor who uses the printing system illustrated in FIG. 5.

First, in step S901, the user 901 instructs a print to the VDP application program 504 via the keyboard 206 or the pointing device 207. In step S902, the VDP application program 504 transmits a content data acquisition request message to the DB broker program 505 via the communication path 511.

In step S903, the DB broker program 505 directly transmits the content data acquisition request message to the content DB 506 via the communication path 104a. In step S904, the content DB 506 transmits the requested content data 516 to the DB broker program 505 via the communication path 104b. Thus, the DB broker program 505 acquires the content data 516. Thus, the VDP application program 404 acquires the content data 410. As described above, according to an exemplary embodiment, the processing of step S904 can realize a content data acquisition unit and a content data acquisition step.

In step S905, the DB broker program 505 transmits the acquired content data 516 to the cache manager program 509 via the communication path 104e without directly transmitting to the VDP application program 504. As described above, according to an exemplary embodiment, the processing of step S905 can realize a content data transmission unit and a content data transmission step.

In step S906, the cache manager program 509 receives the content data 516 and generates the cache ID 523. In step S907, the cache manager program 509 transmits the generated cache ID 523 to the DB broker program 505. In step S908, the DB broker program 505 generates the proxy data 513 based on the thumbnail data 709 generated from the content data 516 acquired in step S904 and the cache ID 523 acquired in step S907.

Figure 7B:
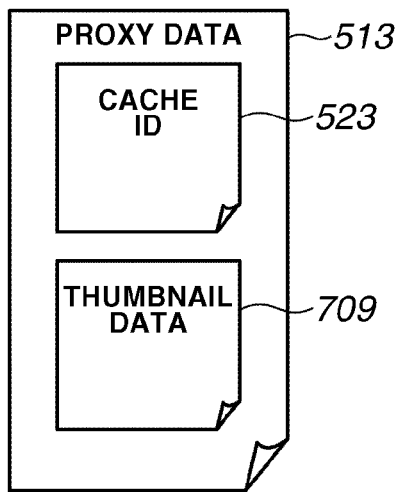

The proxy data 513 generated in step S908 has a structure, for example, illustrated in FIG. 7B. As described above, according to an exemplary embodiment, the processing of step S906 can realize a content data reception unit, an identification information generation unit, a content data reception step, and an identification information generation step. Furthermore, the processing of step S907 can realize an identification information transmission unit and an identification information transmission step. Furthermore, the processing of step S908 can realize an identification information acquisition unit and an identification information acquisition step.

The DB broker program 505 relates the content data 516 acquired in step S904, the thumbnail data 709 generated from the content data 516, and the cache ID 523 acquired in step S907 with each other, and stores the related data into the external storage device 204. Thus, the DB broker program 505 can skip the processing of steps S905 through S907 if the cache ID 523 relating to the content data 516 having been requested by the VDP application program 504 is already present. As described above, according to an exemplary embodiment, the processing of step S908 can realize a storage unit of a data processing apparatus and a storage step of a data processing method.

In step S909, the DB broker program 505 transmits the proxy data 513 generated in step S908 to the VDP application program 504. Thus, the VDP application program 504 can receive the proxy data 513 corresponding to the content data acquisition request (step S902). In step S910, the VDP application program 504 adds the proxy data 513 acquired in step S909 to the VDP job file 518 having a structure similar to the structure illustrated in FIG. 7A. As described above, according to an exemplary embodiment, the VDP job file 518 is a file corresponding to image formation data. Furthermore, the processing of step S910 can realize an image formation data transmission unit.

On the other hand, in step S907, the cache manager program 509 transmits the cache ID 523 to the DB broker program 505. Thereafter, in step S911, the cache manager program 509 stores the content data 516 received in step S905 into the cache DB 510 via a communication path 529. In this case, the cache manager program 509 relates the cache ID 523 returned to the DB broker program 505 in step S907 with the content data 516 received in step S905 and stores the related data into the cache DB 510. An example structure of the cache DB 510 is described later with reference to FIG. 14.

In step S912, the cache manager program 509 directly transmits the content data 516 received in step S905 to the RIP program 508 via the communication path 526. Thus, the cache manager program 509 performs a raster image processing request of the content data 516 (i.e., a raster data generation request) The RIP program 508 performs raster image processing on the content data 516 received in step S912. Then, in step S913, the RIP program 508 transmits the raster data 507 (i.e., data obtained through the raster image processing) to the cache manager program 509 via the communication path 525. As described above, according to an exemplary embodiment, the processing of step S913 can realize an image data generation unit and an image data generation step.

In step S914, the cache manager program 509 stores the raster data 507 acquired in step S913 into the cache DB 510 via the communication path 529. In this case, the cache manager program 509 relates the cache ID 523 transmitted to the DB broker program 505 in step S907 with the content data 516 stored in step S911 and stores the raster data 507. As described above, according to an exemplary embodiment, the processing of step S914 can realize a storage unit of an image forming apparatus and a storage step of an image forming method. The VDP client 101 performs the processing of steps S908 through S910, while the VDP printer 102 performs the processing of steps S911 through S914. In other words, the processing of steps S908 through S910 and the processing of steps S911 through S914 can be performed concurrently by different hardware devices.

The sequential processing of steps S902 through S914 is repeated for each content data (the proxy data 513) included in the VDP job file 518. According to the VDP job file 518 illustrated in FIG. 7A, the process of steps S902 through S914 is repeated for each of three content data (the proxy data 513a through 513c).

In step S915, the VDP application program 504 generates the VDP job file 518 based on the proxy data 513 obtained through the processing of steps S902 through S914 and transmits the generated VDP job file 518 to the RIP program 508. The VDP job file 518 generated in step S915 has a structure similar to that illustrated in FIG. 7A.

If the proxy data 513 is included in the VDP job file 518 received in step S915, the RIP program 508 acquires the cache ID 523 included in the proxy data 513 (as illustrated in FIG. 7B). Then, in step S916, the RIP program 508 requests the cache manager program 509 to acquire the raster data 507 via the communication path 525 according to the acquired cache ID 523. As described above, according to an exemplary embodiment, the processing of step S916 can realize an image formation data reception unit and an image formation data reception step.

In step S917, the cache manager program 509 retrieves the cache DB 510 via the communication path 529 with reference to the cache ID 523 received in step S916. The cache DB 510 retrieves the raster data 507 stored in step S914 to find raster data 507 that accords with the cache ID 523 received in step S916. Then, in step S918, the cache DB 510 transmits the retrieved raster data 507 to the cache manager program 509 via a communication path 530.

In step S919, the cache manager program 509 transmits the raster data 507 acquired in step S918 to the RIP program 508 via the communication path 526. In step S920, the RIP program 508 adds the raster data 507 acquired in step S919 to print data.

The processing of steps S916 through S920 is repeated for each proxy data 513 included in the VDP job file 518. According to the VDP job file 518 illustrated in FIG. 7A, the processing of steps S916 through S920 is repeated for each of three content data (the proxy data 513a through 513c). In step S921, the RIP program 508 performs print processing of the print data generated by repeating the processing of steps S916 through S920. As described above, according to an exemplary embodiment, the processing of step S920 can realize an image forming unit and an image forming step.

Next, an example layout screen for the VDP application is described with reference to FIG. 10. FIG. 10 illustrates an example layout screen displayed on the display unit 205 of the VDP client 101, when the VDP application program 504 is loaded into the RAM 202 and executed by the CPU 201.

In FIG. 10, a main window 1001 enables a user to perform layout (editing) processing for a VDP document generated by the VDP application program 504. The boundary of the main window 1001 represents a boundary of a page of the VDP document. As described above, according to an exemplary embodiment, an area of the main window 1001 corresponds to an image formation area. The main window 1001 includes frames 1002, 1003, 1004, and 1005 that define areas where fixed data and variable data are disposed. A user can perform various operations (e.g., generation, move, and selection of respective frames 1002 through 1005) using the keyboard 206 or the pointing device 207. As described above, according to an exemplary embodiment, the frames 1002 through 1005 correspond to insertion areas.

According to the example illustrated in FIG. 10, a user inputs text data in the frame 1004 using the keyboard 206 or the pointing device 207. As described in a frame management table 1200 of FIG. 12, data to be input in the frames 1002 through 1005 are not limited to fixed text data. A user can designate data to be input in the frames 1002 through 1005 according to a frame rule registered in the frame management table 1200. As described above, a user can designate fixed data or variable data by registering a frame rule in the frame management table 1200.

A menu window 1006 enables a user to designate an option that can be designed for the VDP application program 504 or execute a command that can be executed. A user can input instruction or data to the menu window 1006 using the keyboard 206 or the pointing device 207.

A text box 1007 enables a user to designate a data source related to a VDP document being currently generated, such as "CUSTOMER." A text box 1008 enables a user to display and edit a frame rule for a frame selected from the frames 1002 through 1005 generated in the VDP document.

A text box 1009 enables a user to designate a threshold value to determine an object data to be cached among the fixed data used in a VDP document. The fixed data having a size equal to or greater than the designated threshold value becomes an object to be cached.

A button 1010 enables a user to instruct generating a new VDP document. A button 1011 enables a user to instruct opening of a VDP document stored in the external storage device 204 of the VDP client 101. A button 1012 enables a user to instruct overwriting and saving of a generated VDP document into the external storage device 204 of the VDP client 101. A button 1013 enables a user to instruct saving of the generated VDP document with a new name into the external storage device 204 of the VDP client 101.

A button 1014 enables a user to instruct closing of the VDP document being currently edited. The above-described buttons 1010 through 1014 realize standard functions that can be realized according to an application program of Microsoft Windows® or Apple Mac OS®.

A button 1015 enables a user to instruct generating of a new frame. If a user presses the button 1015 using the keyboard 206 or the pointing device 207, the main window 1001 operates in a frame generation mode. A user can designate both a start point and a size of a new frame using the keyboard 206 or the pointing device 207 in a state where the main window 1001 operates in the frame generation mode. Upon accomplishing generation of a new frame, the main window 1001 returns from the frame generation mode to an original editing state. A button 1016 enables a user to instruct the VDP printer 102 to print a VDP document being currently edited.

A structure and contents of a data source used according to an exemplary embodiment are described below with reference to FIG. 11.

FIG. 11 illustrates contents of a CUSTOMER table 1100 which is a data source related to a VDP document being currently generated. The CUSTOMER table 1100 is, for example, stored in the external storage device 204 of the VDP client 101. A column 1101 indicates a record number which does not constitute part of a data structure. The record numbers, such as "1", "2", "3" - - - , are assigned to records in an ascending order.

The CUSTOMER table 1100 is composed of a total of five columns 1102 through 1106. More specifically, for each record number, the LastName column 1102 stores a last name, the FirstName column 1103 stores a first name, and the Gender column 1104 stores a gender. Furthermore, the ZipCode column 1105 stores a zip code, and the Address column 1106 stores an address.

The LastName column 1102, the FirstName column 1103, the ZipCode column 1105, and the Address column 1106 can store arbitrary character strings. On the other hand, the Gender column 1104 can store a character "M" (representing male) or "F" (representing female).

The CUSTOMER table 1100 illustrated in FIG. 11 stores three kinds of records identified by record numbers 1 through 3. A printing operation described later with reference to FIG. 15A through FIG. 26 can be performed using the records illustrated in FIG. 11.

A structure and contents of a frame management table used according to an exemplary embodiment are described below with reference to FIG. 12. FIG. 12 illustrates a structure of the frame management table 1200 that can be used when the information of frames 1002 through 1005 is stored in the RAM 202, together with example contents of frame information. The frame management table 1200 is, for example, stored in the external storage device 204 of the VDP client 101.

The frame management table 1200 is composed of three columns (i.e., FrameNo column 1201, FrameRule column 1202, and ReusableObject column 1203). For each frame information, the FrameNo column 1201 stores a frame number (an arbitrary number that can be identified in the frame management table 1200), and a FrameRule column 1202 stores a frame rule (a rule for deriving the content data 516 applied to the frames 1002 through 1005). More specifically, the description of a frame rule includes a total of four constituent elements (i.e., "conditional determination", "character string", "data source reference" and "content database reference") to finally derive either the "character string" or the "content database reference."

The following is an example frame rule grammar used for describing a frame rule, which is expressed according to the Extended Backus-Naur Form (EBNF).

[1] frame rule::=character string|content data reference|conditional statement
[2] character string::=(literal character string|data source reference|blank)+
[3] content data reference::=(usable character)+
[4] literal character string::='"' (usable character)+'"'
[5] data source reference::='$' (usable character)+
[6] conditional statement::=IF blank determination equation blank frame rule blank ELSE blank frame rule

[7] determination equation::=data source reference blank? determination mark blank? literal character string
[8] determination mark::='='
[9] usable character::=[a-zA-Z0-9]|[-'( )+.=#@_%]|[亜-
[10] blank::=(#x20|#x9#xD|#xA)+

According to [1], the frame rule is a "character string", a "content data reference", or a "conditional statement." According to [2], the "character string" includes at least one of a "literal character string", a "data source reference", and a "blank". The "character string" is a connection of the results of the "literal character string" and the "data source reference." The portion of a blank is neglected.

According to [3], the "content data reference" includes at least one usable character. The "content data reference" includes reference information that identifies a file of the content data 516 in the content DB 506. In an exemplary embodiment, the "content data reference" is described according to the Universal Naming Convention (UNC) notation of Microsoft Windows®. More specifically, the "content data reference" directly describes a UNC name that represents a file of the content data 516 in the content DB 506. According to [9], the usable character does not include "'" and "$." Thus, the VDP client 101 can determine that it is a "content data reference" if it does not begin with "'" or "$."

According to [4], the "literal character string" includes at least one usable character in parentheses (",") The "literal character string" can be used for a constituent element in deriving a final character string or can be used for the determination equation [7] included in the conditional statement [6].

According to [5], the "data source reference" includes at least one usable character starting with "$." In an exemplary embodiment, "$" can be used for a column name of a data source 1007 which is related to a VDP document by the VDP application program 504. Thus, it is feasible to derive a "literal character string" corresponding to data from a corresponding column in a table that can be referred to by the data source 1007. For example, as a data source, as illustrated in FIG. 11, the CUSTOMER table 1100 is related to the VDP document. "$LastName" is designated as "data source reference." Therefore, if a currently processed record is the record of record number 1, a character string "山田(Yamada)" is derived. If a currently processed record is the record of record number 2, a character string "鈴木(Suzuki)" is derived.

According to [6], "conditional statement" is described in order of "IF determination equation frame rule Else frame rule." If the determination equation is true, the former frame rule is derived. If the determination equation is false, the latter frame rule is derived. According to [1], the frame rule includes a conditional statement that can be described using a nesting.

According to [7], the "determination equation" includes a determination mark connecting a "data source reference" and a "literal character string." There may be blanks at both sides of the determination mark.

According to [8], the determination mark is "=." For example, in the determination equation [7], a "literal character string" derived from a data source character string in the left side of the determination mark is compared with a "literal character string" in the right side of the determination mark. If the compared character strings are the same, it is determined that the determination equation is true. If the compared character strings are different, it is determined that the determination equation is false.

According to [9], alphabet characters, Japanese characters, and some marks can be used for a frame rule. According to [10], some blank characters are defined.

Referring back to FIG. 12, the ReusableObject column 1203 stores information ("TRUE" or "FALSE") that determines whether the content data 516 related to the frames 1002 through 1005 is reusable object. The VDP application program 504 performs this determination. If a frame rule corresponding to the frame does not include any data source reference, the determination becomes "TRUE." If the frame rule corresponding to the frame includes a data source reference, the determination is "FALSE."

FIG. 12 illustrates an example frame rule for the four frames 1002 through 1005 generated in FIG. 10, which is determined using the above-described frame rule grammar.

The frame 1002 illustrated in FIG. 10 is assigned a frame number "1" stored in the FrameNo column 1201. A frame rule of this frame is a "content data reference" described in the first row of the FrameRule column 1202. For example, the "content data reference" is "¥¥Share¥¥img¥logo.jpg" representing a file of the content data 516 in the content DB 506 according to the UNC notation. The frame rule does not include any "data source reference." Accordingly, "TRUE" is stored in the first row of the ReusableObject column 1203. Namely, the content data 516 indicated by "¥¥Share¥img¥logo.jpg" is a reusable object. The content data 516 stored in the content DB 506 has contents described later with reference to FIG. 13.

The frame 1003 in illustrated FIG. 10 is assigned a frame number "2" stored in the FrameNo column 1201. A frame rule of this frame is a connection of a "literal character string" and a "data source reference" described in the second row of the FrameRule column 1202. Accordingly, a character string can be derived by solving the "data source reference." Furthermore, the frame rule includes a "data source reference." Therefore, the content data 516 generated according to this frame rule is not a reusable object. Thus, "FALSE" is stored in the second row of the ReusableObject column 1203.

The frame 1004 illustrated in FIG. 10 is assigned a frame number "3" stored in the FrameNo column 1201. Nothing is described in the FrameRule column 1202 because no frame rule is applied to this frame. As described above, if nothing is described in the FrameRule column 1202, a text inserted into the frame (frame 1004) can be directly used as literal character string. Furthermore, the frame rule does not include any "data source reference." Therefore, the content data 516 generated according to this frame rule is a reusable object. Thus, "TRUE" is stored in the third row of the ReusableObject column 1203.

The frame 1005 illustrated in FIG. 10 is assigned a frame number "4" stored in the FrameNo column 1201. A frame rule of this frame is a "conditional statement" as described in the fourth row of the FrameRule column 1202. A determination equation of the "conditional statement" refers to a different data source based on a comparison between a value registered in the Gender column illustrated in FIG. 11 (i.e., $Gender) and a literal character string "M." Accordingly, the determination equation can be evaluated by solving the "data source reference" and either "content data reference" ("¥¥Share¥img¥car.jpg" or "¥¥Share¥img¥bag.jpg") can be derived. As described above, a file of the content data 516 stored in the content DB 506 can be expressed according to the UNC notation as "content data reference."

Example contents of content DB 506 are described with reference to FIG. 13. FIG. 13 illustrates example information of the content data 516 stored in the content DB 506.

In FIG. 13, an area 1301 stores a path name used when a "content data reference" is described according to the frame rule stored in the FrameRule column 1202. As described above, according to an exemplary embodiment, the path name is expressed according to the UNC notation. An area 1302 stores a file size of the content data 516. An area 1303 stores the thumbnail data 709 displayed when the content data 516 is displayed or printed.

An example structure of the cache DB 510 is described with reference to FIG. 14. In FIG. 14, an area 1401 stores the cache ID 523. The cache manager program 509 can assign a unique cache ID 523 to each record.

An area 1402 stores a content ID. The cache manager program 509 can assign the content ID so that the same content data 516 has the same value. An area 1403 stores the content data 516. An area 1404 stores the raster data 507 obtained by the RIP program 508 that performs raster image processing on the content data 516.

FIGS. 15A and 15B are flowcharts illustrating an example operation performed by the VDP application program 504 when a user presses the button 1016 to instruct a print operation. The processing of FIGS. 15A and 15B can be realized by the CPU 201 that executes a program loaded into the RAM 202 from the external storage device 204. In the layout screen illustrated in FIG. 10, a data source related to the main window 1001 (i.e., a window enabling a user to edit a VDF document) is the CUSTOMER table 1100 illustrated in FIG. 11. Furthermore, information (e.g., flags indicating a frame number, a frame rule, and a reusable object) of the frame management table 1200 illustrated in FIG. 12 is set for the frames 1002 through 1005 generated in the main window 1001.

The processing of FIGS. 15A and 15B is roughly classified into preprocessing of step S1501, reusable object processing of steps S1502 through S1512, print data generation processing of steps S1513 through S1528, and print data transmission processing of step S1529.

First, in step S1501, the VDP application program 504 generates a temporary directory for the VDP job file 518 in the external storage device 204 of the VDP client 101. A path name of this temporary directory is tmpDir.

The processing of steps S1502 through S1512 is loop processing for the VDP application program 504 that processes a reusable object included in a VDP document. Namely, the VDP application program 504 successively performs the processing of steps S1502 through S1512 for each of frame information in the frame management table 1200 illustrated in FIG. 12. In step S1504, the VDP application program 504 determines whether the loop processing is terminated.

In step S1502, the VDP application program 504 prepares a parameter frameIndex (i.e., a variable used to refer to the frame management table 1200 illustrated in FIG. 12) in the RAM 202 and sets a value of the parameter frameIndex to 0 (i.e., initializes the parameter frameIndex). Next, in step S1503, the VDP application program 504 increments (+1) the parameter frameIndex value.

In step S1504, the VDP application program 504 determines whether the parameter frameIndex value is equal to or less than the number of frames stored in the frame management table 1200 illustrated in FIG. 12. If the parameter frameIndex value is equal to or less than the number of frames (YES in step S1504), the VDP application program 504 determines continuing the loop processing and the processing flow proceeds to step S1505. If the parameter frameIndex value is greater than the number of frames (NO in step S1504), the VDP application program 504 determines terminating the loop processing and the processing flow proceeds to step S1513 of FIG. 15B.

In step S1505, the VDP application program 504 prepares a parameter frameInfo (i.e., a variable used to hold frame information), if it is not prepared, in the RAM 202. Then, the VDP application program 504 identifies frame information corresponding to the frameIndex among the frame information stored in the frame management table 1200 illustrated in FIG. 12 and stores the identified frame information into the parameter frameInfo.

In step S1506, the VDP application 504 determines whether the value of the ReusableObject column 1203 included in the frame information stored in step S1505 is "TRUE." Namely, the VDP application program 504 determines whether the content data 516 related to a frame identified by the frame information stored in step S1505 is a reusable object. If the value of the ReusableObject column 1203 is "FALSE" (NO in step S1506), the VDP application 504 determines that the content data 516 related to the frame is not a reusable object and the processing flow returns to step S1503 to start processing for the next frame information.

If the value of the ReusableObject column 1203 is "TRUE" (YES in step S1506), the VDP application 504 determines that the content data 516 related to the frame is a reusable object and the processing flow proceeds to step S1507. According to the example illustrated in FIG. 12, if the parameter frameIndex value is "1" or "3" (frame 1002 or 1004), the VDP application 504 determines that the content data 516 related to the frame is a reusable object.

In step S1507, the VDP application program 504 prepares a parameter pathName (i.e., a variable used to identify a frame rule of the content data 516 (reusable object)), if it is not prepared, in the RAM 202. Then, the VDP application program 504 initializes the prepared parameter pathName to the frame rule included in the frame information (i.e., the frame rule stored in FrameRule column 1202). According to the determination processing of step S1506 and the method for identifying a reusable object in the frame management table 1200 illustrated in FIG. 12, the frame rule identified by the parameter pathName in step S1507 does not include any "data source reference." Namely, according to the example illustrated in FIG. 12, if the content data 516 is not a reusable object, the frame rule of the frame into which the content data 516 is inserted does not include any "data source reference." Accordingly, the parameter pathName is a "blank", a "literal character string", or a "content data reference."

In step S1508, the VDP application program 504 determines whether the parameter pathName is a "blank" or a "literal character string." Namely, the VDP application program 504 determines whether a "text" or a "literal character string" inserted into a frame can be processed or whether a "content data reference" can be used. If the parameter pathName is a "blank" or a "literal character string" (YES in step S1508), the VDP application program 504 determines that the "text" or "literal character string" inserted into a frame is processed and the processing flow proceeds to step S1509.

If the parameter pathName is not a "blank" or a "literal character string" (NO in step S1508), the VDP application program 504 determines that the content data 516 is referred to and the processing flow proceeds to step S1511. According to the example frame management table 1200 illustrated in FIG. 12, if the parameter frameIndex is "1", the parameter pathName is a "content data reference" and the processing flow proceeds to step S1511. If the parameter frameIndex is "3", the parameter pathName is a "blank" and the processing flow proceeds to step S1509.

In step S1509, the VDP application program 504 converts the "text" or the "literal character string" inserted in the frame into PostScript data. Then, the VDP application program 504 stores the PostScript data into a temporary directory designated by a parameter tmpData prepared in the RAM 202 in step S1501. If the parameter pathName is a "blank", text data inserted into a currently processed frame (i.e., a frame corresponding to the frameIndex of the frame management table 1200) of the main window 1001 can be used as a character string. On the other hand, if the parameter pathName is a "literal character string", the "literal character string" is directly used as a character string. According to the example frame management table 1200 illustrated in FIG. 12, if the parameter frameIndex is "3" (which corresponds to the frame 1004 of FIG. 10), the parameter pathName is a "blank." Accordingly, the text inserted into the frame 1004 of FIG. 10 is converted into the PostScript data and stored into the parameter tmpData.

In step S1510, the VDP application program 504 prepares parameters isPorxy, data, and cacheId, if they are not prepared, in the RAM 202. Then, the VDP application program 504 requests the DB broker program 505 to generate a cache ID by using, as argument, the contents of PostScript data stored in the parameter tmpData. Then, the VDP application program 504 receives proxy data 512 and cache ID 516 from the DB broker program 505. Then, the VDP application program 504 stores the proxy data 512 and the cache ID 523 into a parameter 'data' and a parameter cacheId, respectively. Furthermore, the VDP application program 504 stores "TRUE" into the parameter isProxy. Then, the processing flow proceeds to step S1512. An example operation performed by the DB broker program 505 in response to a generation request of cache ID is described later with reference to FIG. 16.

In step S1510, the VDP application program 504 determines whether the cache ID 523 and the proxy data 512 (i.e., data to be acquired) are already stored in the parameter cacheId and the parameter 'data.' If the cache ID 523 and the proxy data 512 are already stored, the VDP application program 504 does not request the DB broker program 505 to generate a cache ID. If the cache ID 523 and the proxy data 512 are not stored, the VDP application program 504 requests the DB broker program 505 to generate a cache ID.

If in step S1508 the VDP application program 504 determines that the parameter pathName is not a "blank" or a "literal character string", the processing flow proceeds to step S1511. In step S1511, the VDP application program 504 prepares parameters isPorxy, data, and cacheId, if they are not prepared, in the RAM 202. The VDP application program 504 requests the DB broker program 505 to acquire the content data 516 by using, as first argument, a name of the content data 516 identified by the "content data reference" stored in the parameter pathName.

In this case, the VDP application program 504 processes a reusable object as apparent from the determination result in step S1506. The reusable object can be used for a plurality of pages. Therefore, the VDP application program 504 determines that constantly caching a reusable object is effective. Then, the VDP application program 504 sets a cache execution flag (i.e., an identification flag determining whether to perform constant cache processing) as second argument to "TRUE." Then, the VDP application program 504 transmits the cache execution flag (second argument) to the DB broker program 505.

The VDP application program 504 receives data and a proxy data identification flag (an identification flag that determines whether the data is proxy data), and the cache ID 523 from the DB broker program 505, which are returned in response to the acquisition request of the content data 516. Then, the VDP application program 504 stores the received data, the proxy data identification flag, and the cache ID 523 into the parameter 'data', the parameter isProxy, and the parameter cacheId, respectively. Then, the processing flow proceeds to step S1512. An example operation performed by the DB broker program 505 in response to an acquisition request of the content data 516 is described later with reference to FIG. 16.

Also in step S1511, the VDP application program 504 determines whether the data to be acquired are already stored in the parameter 'data', the parameter isProxy, and the parameter cacheId. If the data to be acquired are already stored, the VDP application program 504 does not request the DB broker program 505 to acquire the content data 516. If the data to be acquired are not stored, the VDP application program 504 requests the DB broker program 505 to acquire the content data 516, as described above.

In step S1512, the VDP application program 504 prepares array contentData[ ], if it is not prepared, in the RAM 202. The array contentData[ ] can be used to hold the content data 516. Then, the VDP application program 504 stores the information stored in the parameter 'data' in step S1510 or S1511 into a temporary directory indicated by the parameter tmpDir prepared in step S1501. A file name of the information stored in the temporary directory is "0000"+"frame number." The frame number is a 4-digit number representing a value stored in the FrameNo column 1201 for the currently processed frame. If the value stored in the FrameNo column 1201 is not a 4-digit value, a character string including "0" to form a 4-digit value can be used. For example, if the frame number (i.e., a value stored in the FrameNo column 1201) for the currently processed frame is "1", the file name is "00000001." An appropriate extension can be used for a file name according to the type of data stored in the parameter 'data.'

The VDP application program 504 stores the assigned file name into the parameter fileName prepared in the RAM 202. The VDP application program 504 refers to a value of the parameter frameIndex. Then, the VDP application program 504 stores the values of the parameter fileName, the parameter isProxy, and the parameter cacheId into the array contentData[ ] which is prepared to hold the content data 516. Then, the processing flow returns to step S1503.

If in the step S1504 the parameter frameIndex value is greater than the number of frames (NO in step S1504), the processing flow proceeds to step S1513 of FIG. 15B. The processing of steps S1513 through S1528 of FIG. 15B is for applying a data source related to a VDP document to a frame rule, wherein the VDP application program 504 generates a page of a PPML file of the VDP document for each record in the data source. Steps S1513 through S1528 form a double loop. The processing of steps S1513 through S1528 (i.e., an outer loop) is to process each record in the data source. The end of the outer loop processing is determined in step S1515. On the other hand, the processing of steps S1516 through S1527 (i.e., an inner loop) is to apply each record to the frame rule of each frame in the VDP document. The end of the inner loop processing is determined in step S1518.

In step S1513, the VDP application program 504 prepares a parameter recordNo in the RAM 202. The parameter recordNo can be used to refer to the CUSTOMER table 1100 illustrated in FIG. 11. The VDP application program 504 initializes a parameter recordNo value to 0. In step S1514, the VDP application program 504 increments (+1) the parameter recordNo value.

In step S1515, the VDP application program 504 determines whether the parameter recordNo value is equal to or less than the number of records stored in the CUSTOMER table 1100 illustrated in FIG. 11. If the parameter recordNo value is greater than the number of records (NO in step S1515), the VDP application program 504 determines terminating of the loop processing and the processing flow proceeds to step S1529. If the parameter recordNo value is equal to or less than the number of records (YES in step S1515), the VDP application program 504 determines continuing the loop processing and the processing flow proceeds to step S1516.

In step S1516, the VDP application program 504 initializes the parameter frameIndex value (which is stored in the RAM 202 in step S1503) to 0. In step S1517, the VDP application program 504 increments (+1) the parameter frameIndex value.

In step S1518, the VDP application program 504 determines whether the parameter frameIndex value is equal to or less than the number of frames stored in the frame management table 1200 illustrated in FIG. 12. If the parameter frameIndex value is greater than the number of frames (NO in step S1518), the VDP application program 504 determines terminating of the loop processing and the processing flow proceeds to step S1528. If the parameter frameIndex value is equal to or less than the number of frames (YES in step S1518), the VDP application program 504 determines continuing the loop processing and the processing flow proceeds to step S1519.

In step S1519, the VDP application program 504 identifies frame information corresponding to the frameIndex, among the frame information stored in the frame management table 1200 illustrated in FIG. 12, and stores the identified frame information into the parameter frameInfo prepared in step S1505. In step S1520, the VDP application program 504 determines whether the value of the ReusableObject column 1203 included in the frame information stored in step S1519 is "TRUE." Namely, the VDP application program 504 determines whether the content data 516 related to a frame identified by the frame information stored in step S1519 is a reusable object.

If the value of the ReusableObject column 1203 is "TRUE" (YES in step S1520), the VDP application program 504 determines that the content data 516 related to the frame is a reusable object. In this case, the content data 516 of the reusable object is already processed in steps S1502 through S1512. Therefore, the processing flow returns to step S1517 to start processing of the next loop.

If the value of the ReusableObject column 1203 is "FALSE" (NO in step S1520), the VDP application program 504 determines that the content data 516 related to the frame is not a reusable object. Then, the processing flow proceeds to step S1521. According to the example illustrated in FIG. 12, if the parameter frameIndex value is "2" or "4" (frame 1003 or 1005), the VDP application program 504 determines that the content data 516 related to the frame is not a reusable object.

In step S1521, the VDP application program 504 prepares a parameter 'record', if it is not prepared, in the RAM 202. Then, the VDP application program 504 identifies record information corresponding to the recordNo, among the record information stored in the CUSTOMER table 1100 illustrated in FIG. 11, and stores the identified record information into the parameter 'record.'

In step S1522, the VDP application program 504 applies the record information stored in step S1521 to a frame rule (information in the FrameRule column 1202) included in the frame information stored in step S1519. According to the determination processing of step S1521 and the method for identifying a reusable object in the frame management table 1200 illustrated in FIG. 12, the frame rule being processed in step S1522 includes a "data source reference." Hence, the VDP application program 504 applies the record information stored in parameter 'record' to the "data source reference" and derives either a "literal character string" or a "content data reference" as a frame rule. Then, the VDP application program 504 stores the derived "literal character string" or the "content data reference" into the parameter pathName prepared in step S1507.

For example, if the parameter recordNo is "1" and the parameter frameIndex is "2", the information included in the parameter 'record' is information of record number "1" illustrated in FIG. 11. Then, the information included in the parameter frameInfo is information of FrameNo "2" illustrated in FIG. 12. The following frame rule can be used in this case.

"〒" $ZipCode
$Address
$LastName $FirstName "様"

The content data reference ($ZipCode) included in this frame rule is replaced with a value (111-2222) in the ZipCode column 1105 corresponding to the record number "1." Similarly, other content data references ($Address, $LastName, and $FirstName) are replaced with the values in the Address column 1106, the LastName column 1102, and the FirstName column 1103 corresponding to the record number "1."

As a result, the following literal character string can be derived from the frame rule.

〒111-2222
東京都千代田区丸の内○-○-○ (○-○-○, Marunouchi, Chiyoda-ku, Tokyo)
山田 太郎 様 (Mr. Taro Yamada)

Furthermore, if the parameter recordNo is "1" and the parameter frameIndex is "4", information included in the parameter 'record' is information of record number "1" illustrated in FIG. 11. The information included in the parameter frameInfo is information of FrameNo "4" illustrated in FIG. 12.

The following frame rule can be used in this case.
if $Gender="M"
¥¥Share¥img¥car.jpg
else
¥¥Share¥img¥bag.jpg The content data reference ($Gender) included in this frame rule is replaced with a value (M) of the Gender column 1104 corresponding to the record number "1" illustrated in FIG. 11. Then, a "content reference (¥¥Share¥img¥car.jpg)" can be derived by applying the above-described frame rule grammar [6] to a "conditional statement."

Referring back to FIG. 15B, in step S1523, the VDP application program 504 determines whether the parameter pathName is a "literal character string." Namely, the VDP application program 504 determines whether a literal character string inserted into the frame can be processed or whether the "content data reference" can be used. If the parameter pathName is a "literal character string" (YES in step S1523), the VDP application program 504 determines to process the literal character string. Then, the processing flow proceeds to step S1524. If the parameter pathName is not a "literal character string" (NO in step S1523), the VDP application program 504 determines to refer to the content data 516 and the processing flow proceeds to step S1526. According to the example frame management table 1200 illustrated in FIG. 12, if the parameter frameIndex is "2", the parameter pathName is a "literal character string." Therefore, the processing flow proceeds to step S1524. If the parameter frameIndex is "4", the parameter pathName is a "content reference", and the processing flow proceeds to later-described step S1526.

In step S1524, the VDP application program 504 converts the literal character string inserted in the frame into PostScript data. Then, the VDP application program 504 stores the PostScript data into a temporary directory indicated by the parameter tmpData prepared in the RAM 202 in step S1501. According to frame management table illustrated in FIG. 12, if the parameter frameIndex is "2", the above-described literal character string 〒111-2222
東京都千代田区丸の内○-○-○ (○-○-○, Marunouchi, Chiyoda-ku, Tokyo)
山田　太郎　様 (Mr. Taro Yamada)

is converted into PostScript data and stored into the temporary directory indicated by the parameter tmpData.

In step S1525, the VDP application program 504 requests the DB broker program 505 to generate a cache ID by using, as argument, the PostScript data stored in the parameter tmpData. Then, the VDP application program 504 receives the proxy data 512 and the cache ID 523 from the DB broker program 505. Furthermore, the VDP application program 504 stores "TRUE" in the parameter isProxy. Then, the processing flow proceeds to step S1527. An example operation performed by the DB broker program 505 in response to the generation request of the cache ID is described later with reference to FIG. 16.

If in the step S1523 the VDP application program 504 determines that the parameter pathName is not a "literal character string", the processing flow proceeds to step S1526. Then, the VDP application program 504 requests the DB broker program 505 to acquire the content data 516 by using, as first argument, a name of content data identified by the "content data reference" stored in the parameter pathName. Furthermore, the VDP application program 504 determines that caching only an object having a large size is effective and sets the cache execution flag (i.e., an identification flag determining whether to constantly perform cache processing) as second argument to "FALSE." Then, the VDP application program 504 transmits a value of the cache execution flag (second argument) to the DB broker program 505. Furthermore, the VDP application program 504 sets a value in the text box 1009 illustrated in FIG. 10 as a threshold value (third argument) used in the determination of the cache. The VDP application program 504 transmits the threshold value (third argument) to the DB broker program 505. An example threshold value is "200 KB."

The VDP application program 504 receives data and proxy data identification flag (an identification flag that determines whether the data is proxy data), and the cache ID 523 from the DB broker program 505, which are returned in response to the acquisition request of the content data 516. Then, the VDP application program 504 stores the received data, the proxy data identification flag, and the cache ID 523 into the parameters data, isProxy, and cacheId, respectively. Then, the processing flow proceeds to step S1527. An example operation performed by the DB broker program 505 in response to the acquisition request of the content data 516 is described later with reference to FIG. 16.

In step S1527, the VDP application program 504 stores the information of the parameter 'data' stored in step S1525 or S1526 into the temporary directory indicated by the parameter tmpDir prepared in step S1501. A file name of the information stored in the temporary directory is "record number"+"frame number." The record number is a 4-digit number representing a value stored in the record number column 1101 for the currently processed frame. If the value stored in the record number column 1101 is not a 4-digit value, a character string including "0" to form a 4-digit value can be used. Furthermore, the frame number is a 4-digit number representing a value stored in the FrameNo column 1201 for the currently processed frame. If the value stored in the FrameNo column 1201 is not a 4-digit value, a character string including "0" to form a 4-digit value can be used.

For example, if the record number (i.e., the value stored in the record number column 1101) for the currently processed record is "2" and the frame number (i.e., the value stored in the FrameNo column 1201) for the currently processed frame is "3", the file name is "00020003." An appropriate extension can be used for a file name according to the type of data stored in the parameter 'data.'

The VDP application program 504 stores the assigned file name to the parameter fileName prepared in the RAM 202. The VDP application program 504 refers to the parameter frameIndex value. Then, the VDP application program 504 stores the values of the parameter fileName, the parameter isProxy, and the parameter cacheId into the array contentData[ ] which is prepared in step S1512 to hold the content data 516. Then, the processing flow returns to step S1517.

If in step S1518 the VDP application program 504 determines that the parameter frameIndex value is greater than the number of frames, the processing flow proceeds to step S1528. Then, the VDP application program 504 generates the PPML data file 702 corresponding to the recordNo page using the data stored in the array contentData[ ] that can hold the content data 516. In this case, the VDP application program 504 refers to the content data 516 or the proxy data 512 stored in the temporary directory indicated by the parameter tmpDir prepared in step S1501. The VDP application program 504 stores the generated PPML data file 702 to the temporary directory indicated by the parameter tmpDir prepared in step S1501. Then, the processing flow returns to step S1514.

If in step S1515 the VDP application program 504 determines that the parameter recordNo value is greater than the number of records, the processing flow proceeds to step S1529. Then, the VDP application program 504 integrates and compresses all contents stored in the temporary directory indicated by the parameter tmpDir prepared in step S1501, according to the ZIP format, and generates the VDP job file 518. The VDP application program 504 transmits the generated VDP job file 518 to the RIP program 508. An example operation of the RIP program 508 performed in response to reception of the VDP job file 518 is described later with reference to FIG. 18.

An example operation performed by the DB broker program 505 in response to the cache ID generation request in step S1510 or S1525 or the content data acquisition request in step S1511 or S1526 is described below with reference to a flowchart of the FIG. 16. The processing of FIG. 16 can be realized by the CPU 201 that executes a program loaded into the RAM 202 from the external storage device 204.

In step S1601, the DB broker program 505 determines whether the content data acquisition request is received from the VDP application program 504. If the VDP application program 504 does not request acquiring of the content data 516 (NO in step S1601), the processing flow proceeds to step S1607. If the VDP application program 504 requests acquiring of the content data 516 (YES in step S1601), the processing flow proceeds to step S1602.

As described above, the VDP application program 504 requests the DB broker program 505 to acquire the content data 516 by using, as first argument, the name of content data identified by the "content data reference" stored in the parameter pathName. The VDP application program 504 transmits the content data acquisition request to the DB broker program 505. Furthermore, the VDP application program 504 transmits the value of the cache execution flag (i.e., the identification flag determining whether to constantly perform cache processing) as second argument to the DB broker program 505. Moreover, the VDP application program 504 transmits the threshold value (third argument) used in the determination of the cache to the DB broker program 505.

In step S1602, the DB broker program 505 prepares parameters data, isProxy, and cacheId in the RAM 202. The DB broker program 505 acquires the content data 516 having a file name identical to the first argument from the content DB 506 via the communication paths 104a and 104b. The DB broker program 505 stores the acquired content data 516 in the parameter 'data.' Furthermore, the DB broker program 505 initializes the parameter isProxy and the parameter cacheId to "FALSE" and "N/A (no value)" respectively.

In step S1603, the DB broker program 505 determines whether the cache execution flag (second argument) is "TRUE." If the cache execution flag (second argument) is "TRUE" (YES in step S1603), the DB broker program 505 determines executing the cache. Then, the processing flow proceeds to step S1605. If the cache execution flag (second argument) is "FALSE" (NO in step S1603), the processing flow proceeds to step S1604.

In step S1604, the DB broker program 505 determines whether the size of the content data 516 stored in the parameter 'data' in step S1602 is greater than the threshold value (i.e., third argument) used in the determination of the cache. If the size of the content data 516 stored in the parameter 'data' is greater than the threshold value (i.e., third argument) (YES in step S1604), the DB broker program 505 determines to perform cache processing. The processing flow proceeds to step S1605. If the size of the content data 516 stored in the parameter 'data' is not greater than the threshold value (i.e., third argument) (NO in step S1604), the DB broker program 505 does not perform cache processing.

In this case, the DB broker program 505 returns the following data to the VDP application program 504, as return values (i.e., parameter 'data', parameter isProxy, and parameter cacheId) responsive to the acquisition request of the content data 516. Namely, the DB broker program 505 returns contents of content data 516 designated by the argument pathName, as parameter 'data' value, to the VDP application program 504. Furthermore, the DB broker program 505 returns "FALSE" as a value of the parameter isProxy to the VDP application program 504. Furthermore, the DB broker program 505 returns "N/A (no value)" as a value of the parameter cacheId to the VDP application program 504.

For example, the determination result in step S1604 becomes NO in the following case. Namely, in a state where "FALSE" is set as the second argument and "200 KB" is set as the third argument for the frame 1004 (i.e., the frame of FrameNo "4" in FIG. 12), the record of record number "2" is processed in step S1526. In this case, a value of $Gender corresponding to the record of record number "2" is "F." Therefore, "¥¥Share¥img¥bag.jpg" is derived as a frame rule of the frame 1004. The content data 516 according with this file path has a size of 100 KB as illustrated in FIG. 13. Accordingly, the determination result in step S1604 becomes NO. As described above, according to an exemplary embodiment, the DB broker program 505 determines whether to generate the cache ID 523 (whether the cache ID 523 can be used as data instead of the content data 516) based on the predetermined conditions of steps S1603 and S1604.

If in step S1604 the DB broker program 505 determines that the size of the content data 516 stored in the parameter 'data' is greater than the threshold value (i.e., third argument) used in the determination of the cache, the processing flow proceeds to step S1605. In step S1605, the DB broker program 505 requests the cache manager program 509 to acquire the cache ID 523 using the content data 516 stored in the parameter 'data' as an argument. The DB broker program 505 uses the communication paths 104d and 104e for an acquisition request of the cache ID 523.

Then, the cache manager program 509 returns the proxy data 512 and the cache ID 523. The DB broker program 505 stores the cache ID 523 into the parameter 'data' and the cacheId prepared in the RAM 202. Furthermore, the DB broker program 505 stores "TRUE" in the parameter isProxy. In this case, the DB broker program 505 returns the following data to the VDP application program 504 as return values (parameter 'data', parameter isProxy, and parameter cacheId) responsive to the acquisition processing of the content data 516. Namely, the DB broker program 505 returns the proxy data 513 transmitted from the cache manager program 509, as parameter 'data' value, to the VDP application program 504. Furthermore, the DB broker program 505 returns "TRUE" as a value of the parameter isProxy to the VDP application program 504. Moreover, the DB broker program 505 returns the cache ID 523 transmitted from the cache manager program 509 as a value of the parameter cacheId to the VDP application program 504.

For example, the DB broker program 505 performs the processing of step S1605 when the VDP application program 504 generates an acquisition request of the content data 516 in step S1511, i.e., when the second argument which sets "TRUE" is transmitted to the DB broker program 505. In this case, the determination result in step S1603 becomes YES. The processing flow proceeds to step S1605.

Furthermore, the DB broker program 505 performs the processing of step S1605 when the record of record number "1" or "3" is processed in step S1526 in a state where "FALSE" is set as second argument and "200 KB" is set as third argument for the frame 1004. In this case, a value of $Gender corresponding to the record of record number "1" or "3" is "M." Therefore, "¥¥Share¥img¥car.jpg" is derived as a frame rule of the frame 1004. The content data 516 according with this file path has a size of 300 KB as illustrated in FIG. 13. Accordingly, the determination result in step S1604 becomes YES. The processing flow proceeds to step S1605. Example cache processing performed by the cache manager program 509 is described later with reference to FIG. 17.

In step S1606, the DB broker program 505 generates the thumbnail data 709 based on the content data 516 stored in the parameter 'data' and stores the generated thumbnail data 709 in the parameter 'data' prepared in the RAM 202. Then, the DB broker program 505 transmits the values of the parameters data, isProxy, and cacheId, as return values, to the VDP application program 504.

If in step S1601 the DB broker program 505 determines that acquisition request of the content data 516 is not received from the VDP application program 504, the processing flow proceeds to step S1607. In step S1607, the DB broker program 505 determines whether a cache ID acquisition request is received from the VDP application program 504. If the cache ID generation request is not received (NO in step S1607), the DB broker program 505 terminates the processing of this routine. If the cache ID generation request is received (YES in step S1607), the processing flow proceeds to step S1605. If the processing flow proceeds from step S1607 to step S1605, the DB broker program 505 receives the cache ID 523. Accordingly, the DB broker program 505 stores the cache ID 523 into the parameter cacheId prepared in the RAM 202. Then, the DB broker program 505 generates the thumbnail data 709 in step S1606 and transmits the values of the parameter 'data' and the parameter cacheId as return values to the VDP application program 504.

Next, an example operation performed by the cache manager program 509 in response to the acquisition request of the cache ID 523 in step S1605 is described below with reference to the flowchart of FIG. 17. As described above, the content data 516 stored in the parameter 'data' is transmitted, as argument, to the cache manager program 509 in response to the acquisition request of the cache ID 523. The processing of FIG. 17 can be realized by the MFP control unit (CPU) 301 which executes a program loaded into the RAM 302 from the external storage apparatus 305.

In step S1701, the cache manager program 509 prepares a parameter cacheId in the RAM 302 of the VDP printer 102. Then, the cache manager program 509 generates a unique cache ID 523 and stores the generated cache ID 523 into the parameter cacheId. The cache manager program 509 can generate the cache ID 523 using, for example, Globally Unique Identifier (GUID) of Microsoft Windows®.

In step S1702, the cache manager program 509 transmits a value of the parameter cacheId as return value to the DB broker program 505. The processing of steps S1703 and S1704 may take a long time. However, the response to the cache ID acquisition request ends at step S1702. Thus, the DB broker program 505 can continue the processing without waiting for completion of steps S1703 and S1704.

In step S1703, the cache manager program 509 prepares parameters contented and rasterData in the RAM 302 of the VDP printer 102. First, the cache manager program 509 generates a unique content ID 523 based on the contents of content data 516 (i.e., argument) and stores them in the parameter contented. In this case, the cache manager program 509 can use a value of Message Digest Algorithm 5 (MD5) calculated based on a value of the argument. Next, the cache manager program 509 requests the RIP program 508 to generate the raster data 507. Then, the cache manager program 509 acquires the raster data 507 (generated by performing the RIP processing on the content data 516) and stores the acquired raster data 507 in the parameter rasterData. The above-described processing for generating the raster data 507 can be performed using the communication paths 525 and 526.

In step S1704, the cache manager program 509 stores the parameter cacheId, the parameter contented, the argument contentData, and the parameter rasterData into the cache DB 510 via the communication path 529. According to the example illustrated in FIG. 14, the parameter cacheId, the parameter contented, the argument contentData, and the parameter rasterData are stored in the areas 1401 through 1404, respectively.

Next, an example internal state of the VDP system is described with reference to FIGS. 18 to 21, when the CPU executes the processing of the flowcharts of FIG. 15A through FIG. 17.

Figure 18:
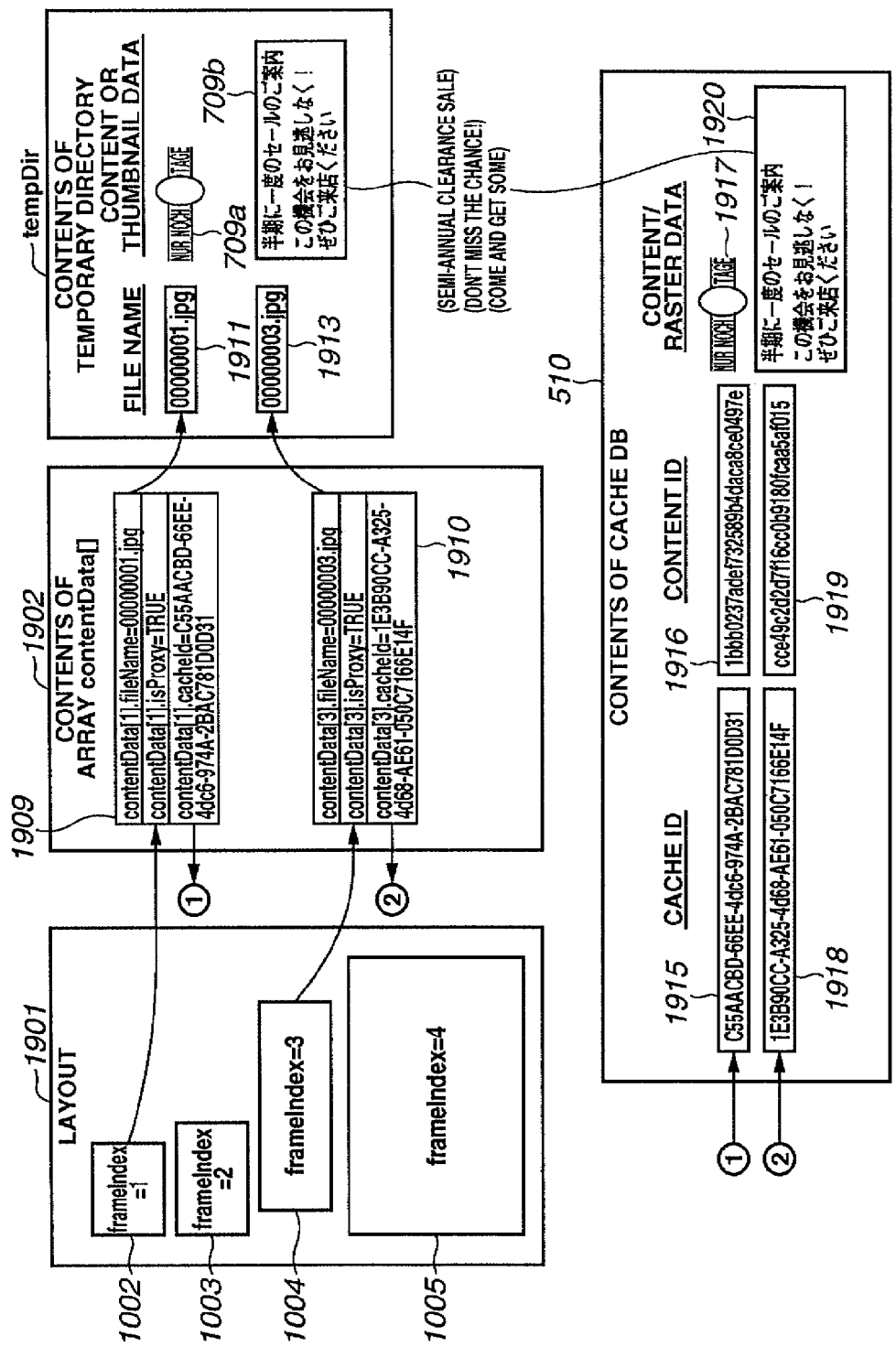
FIG. 18 illustrates an example internal state of a VDP system that has completed the processing relating to reusable objects for all frames stored in a frame management table according to an exemplary embodiment of the present invention.

FIG. 18 illustrates an example internal state of the VDP system at the time the VDP application program 504 terminates the loop processing (i.e., NO in step S1504) after executing the processing of steps S1501 and S1502 and the loop processing of steps S1503 through S1512. Namely, FIG. 18 illustrates an example internal state of the VDP system that has completed the processing relating to reusable objects for all frames stored in the frame management table 1200.

The VDP application program 504 generates a layout 1901 of a VDP document. A frame 1002 is present at the head of the frame management table 1200 of FIG. 12. Accordingly, the loop processing of steps S1501 to S1512 is first performed for the frame 1002. Namely, in the processing for the frame 1002, the parameter frameIndex value is set to "1."

In the processing for the frames 1003 though 1005, the value of the parameter frameIndex value is set to "2" through "4", respectively. In step S1512, the VDP application program 504 prepares the contents of array contentData[ ] 1902. As described above, if in step S1506 the VDP application program 504 determines that the content data is a reusable object, the VDP application program 504 executes the processing of steps S1507 through S1512. Accordingly, the processing of steps S1507 through S1512 is performed for only the frame whose value in the ReusableObject column 1203 of FIG. 12 is "TRUE." Namely, according to the example illustrated in FIG. 12, the processing of steps S1507 through S1512 is performed for the frames 1002 and 1004.

The parameter frameIndex value used in the processing for the frame 1002 is "1." Therefore, array contentData[1] 1909 holds the content data 516 for the frame 1002. The contentData[1] fileName has a value "00000001.jpg" according to the rule described in step S1512. The frame rule of the frame 1002 is "¥¥Share¥img¥logo.jpg" which is a "content reference" illustrated in FIG. 12. Accordingly, the determination result in step S1508 becomes NO and the processing flow proceeds to step S1511. Then, in step S1511, the VDP application program 504 sets the cache execution flag (second argument) to "TRUE" and requests the DB broker program 505 to acquire the content data 516. In response to this request, in step S1606 of FIG. 16, the DB broker program 505 returns the parameter isProxy which is set to "TRUE." Thus, in step S1512, the VDP application program 504 sets "TRUE" to contentData[1].isProxy.

Figure 17:
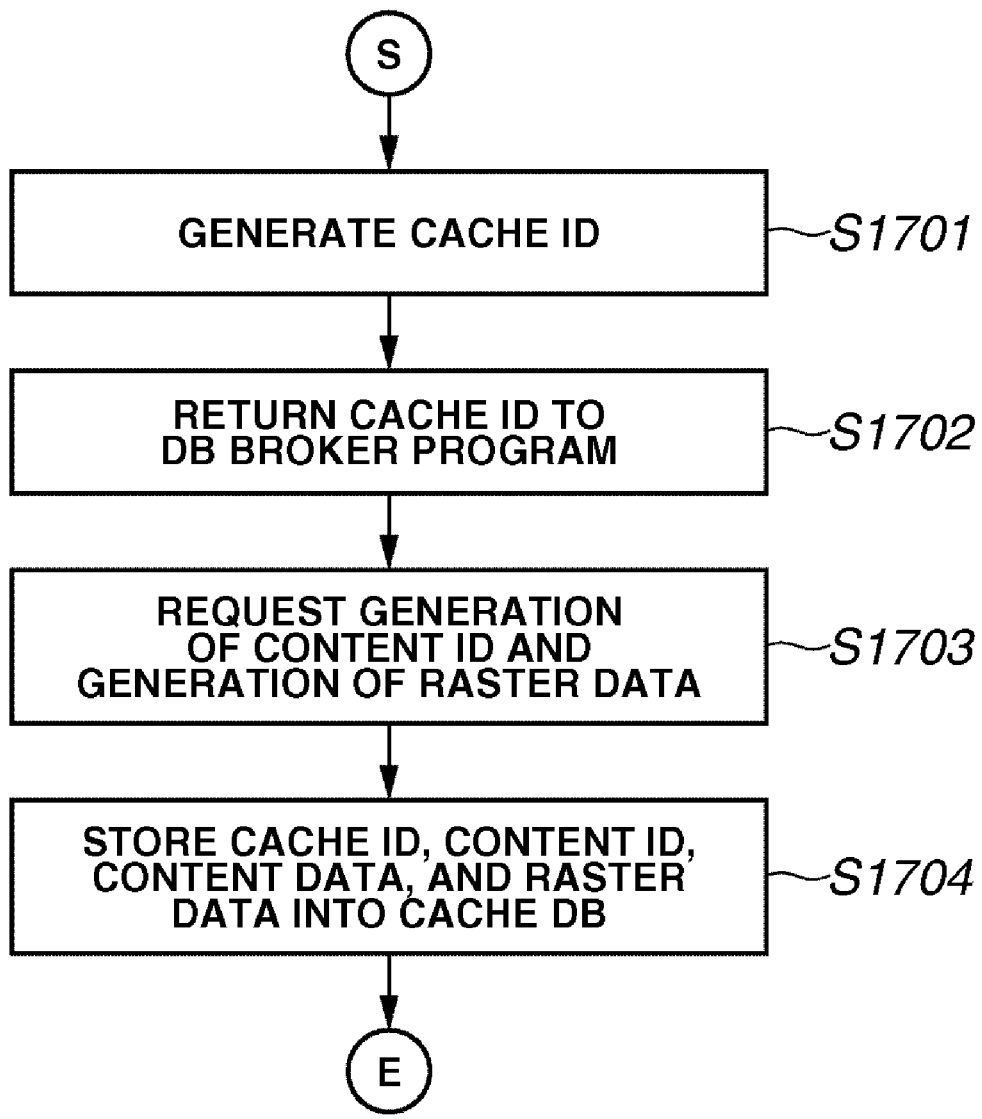
FIG. 17 is a flowchart illustrating an example operation of a cache manager program performed in response to an acquisition request of the cache ID according to an exemplary embodiment of the present invention.

Furthermore, if in step S1605 the DB broker program 505 requests the cache manager program 509 to acquire the cache ID, the cache manager program 509 generates the cache ID 523, the content ID, and the raster data 507 in steps S1701, S1703, and S1704 of FIG. 17 and stores the generated data into the cache DB 510. The cache ID 523 generated in this case is GUID 1915 of "C55AACBD-66EE-4dc6-974A-2BAC781D0D31." Furthermore, the content ID in this case is MD5 value 1916 of "1bbb0237adef732589b4daca8ce0497e" which is generated from the contents of "¥¥Share¥img¥logo.jpg" illustrated in FIG. 13.

The content data is, for example, JPEG data having the contents illustrated in FIG. 18. The JPEG data 1917 is identical to the image illustrated in FIG. 13. Furthermore, the raster data 507 can be obtained by performing the raster image processing on the JPEG data 1917. The above-described cache ID 523 (GUID 1915) is returned to the VDP application program 504, as return value cacheId, in step S1511. Then, in step S1512, the VDP application program 504 sets the cache ID 523 (GUID 1915) to contentData[1] cacheId. Furthermore, thumbnail data 709a generated in step S1606 is returned, as return value data, to the VDP application program 504. The thumbnail data 709a is stored in a temporary directory indicated by the parameter tmpData, with a file name contentData[1].fileName(00000001.jpg) 1911, in step S1512.

The parameter frameIndex value used for the processing for the frame 1004 is "3." Therefore, array contentData[3] 1910 holds the content data 516 for the frame 1004. The contentData[3].fileName has a value "00000003.jpg" according to the rule described in step S1512. The frame rule of the frame 1004 is "blank" as illustrated in FIG. 12. Accordingly, the determination result in step S1508 becomes YES and the processing flow proceeds to steps S1509 and S1510.

Then, in step S1510, the VDP application program 504 sets the parameter isProxy to "TRUE" and, in step S1512, sets contentData[3].isProxy to "TRUE." Furthermore, in step S1510, the VDP application program 504 requests the DB broker program 505 to generate the cache ID 523. The DB broker program 505 performs the processing of the flowchart illustrated in FIG. 16. Furthermore in step S1605, the DB broker program 505 requests the cache manager program 509 to acquire the cache ID 523. The cache manager program 509 performs the processing of the flowchart illustrated in FIG. 17.

Then, the cache manager program 509 generates the cache ID 523, the content ID, and the raster data 507 in steps S1701, S1703, and S1704 and stores the generated data into the cache DB 510. The cache ID 523 generated in this case is GUID 1918 of "1E3B90CC-A325-4d68-AE61-050C7166E14F." Furthermore, the content ID in this case is MD5 value 1919 of "cce49c2d2d7f16cc0b9180fcaa5af015" which is generated from the PostScript data representing the display illustrated in frame 1004 of FIG. 10.

The content data 516 is, for example, PostScript data 1914 having the contents illustrated in FIG. 18. Furthermore, the raster data 507 can be obtained by performing the raster image processing on the PostScript data 1914. The above-described cache ID 523 (GUID 1918) is returned to the VDP application program 504, as return value cacheId. Then, in step S1512, the VDP application program 504 sets the cache ID 523 (GUID 1918) to contentData[3].cacheId.

Furthermore, thumbnail data 709b generated in step S1606 is returned, as return value data, to the VDP application program 504. The thumbnail data 709b is stored in a temporary directory indicated by the parameter tmpData, with a file name contentData[3].fileName(00000003.jpg) 1913, in step S1512.

Figure 19:
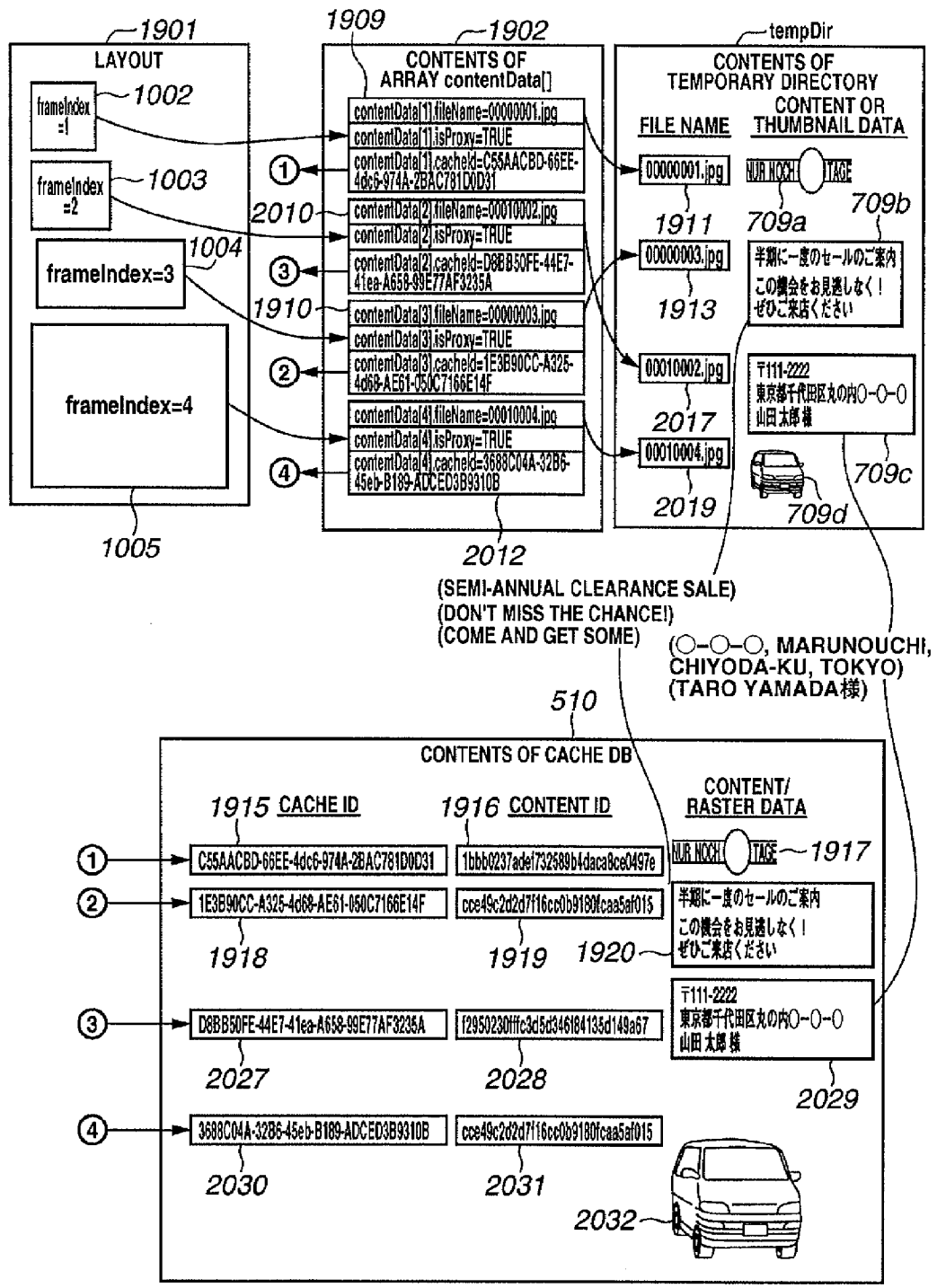
FIG. 19 illustrates an example internal state of the VDP system that has completed the processing for a first page of a job according to an exemplary embodiment of the present invention.

FIG. 19 illustrates an example internal state of the VDP system at the time the VDP application program 504 has finished one complete routine of steps S1514 through S1527 after executing the processing of step S1513 (i.e., at the time the processing for the first page of a job is finished). The parameter recordNo value in this case is "1."

The VDP application program 504 sets contents of array contentData[ ] 2010 and 2012 in step S1527. As described above, if in step S1520 the VDP application program 504 determines that the content data is not a reusable object, the VDP application program 504 executes the processing of steps S1521 through S1527. Accordingly, the processing of steps S1521 through S1527 is executed for only the frame having a "FALSE" value in the ReusableObject column 1203 of FIG. 12. Namely, according to the example illustrated in FIG. 12, the VDP application program 504 executes the processing of steps S1521 through S1527 for the frames 1003 and 1005.

The frameIndex value used in the processing for the frame 1003 is "2." Therefore, array contetnData[2] 2010 holds the content data 516 for the frame 1003. The contentData[2] fileName has a value "00010002.jpg" according to the rule described in step S1527. The following frame rule is applied to the frame 1003 as illustrated in FIG. 12.
"〒" $ZipCode
$Address
$LastName $FirstName "様"

As described above, the frame rule of the frame 1003 includes a "data source reference." Accordingly in step S1521 the VDP application program 504 acquires record information of record number "1" (record No=1) from the record information of FIG. 11. Then, in step S1522 the VDP application program 504 applies the acquired record information to the frame rule and derives the following "literal character string."
〒111-2222
東京都千代田区丸の内○-○-○ (○-○-○, Marunouchi, Chiyoda-ku, Tokyo)
山田 太郎 様 (Mr. Taro Yamada)

As described above, if the record information is applied to a frame rule and a "literal character string" is derived, the determination of step S1523 becomes YES and the processing flow proceeds to steps S1524 and S1525. Then, in step S1525, the parameter isProxy is set to "TRUE." In step S1527, a value of the contentData[2].isProxy is set to "TRUE."

Furthermore, if in step S1605 the DB broker program 505 requests the cache manager program 509 to acquire the cache ID 523 to acquire the cache ID 523, the cache manager program 509 generates the cache ID 523, the content ID, and the raster data 507 in steps S1701, S1703, and S1704 of FIG. 17 and stores the acquired data into the cache DB 510. The cache ID 523 generated in this case is GUID 2027 of "D8BB50FE-44E7-41ea-A658-99E77AF3235A." Furthermore, in step S1524 the VDP application program 504 converts the above-described literal character string into PostScript data. Then, the VDP application program 504 generates MD5 value 2028 of "f2950230fffc3d5d346f84135d149a67" from the PostScript data, as content ID.

The content data is, for example, PostScript data 2029 having the contents illustrated in FIG. 19. Furthermore, the raster data 507 can be obtained by performing the raster image processing on the PostScript data 2029. In step S1525, the VDP application program 504 receives the above-described cache ID 523 (GUID 2027), as return value cacheId. Then, in step S1527, VDP application program 504 sets the cache ID 523 (GUID 2027) to contentData[2].cacheId.

Furthermore, thumbnail data 709c generated in step S1606 is returned, as return value data, to the VDP application program 504. In step S1527, the VDP application program 504 stores the thumbnail data 709c into a temporary directory indicated by the parameter tmpData with a file name of contentData[2].fileName(00010002.jpg) 2027.

The parameter frameIndex value used in the processing for the frame 1005 is "4." Therefore, array contentData[4] 2012 holds the content data 516 for the frame 1005. The contentData[4] fileName has a value "00010004.jpg" according to the rule described in step S1527. The following frame rule is applied to the frame 1005 as illustrated in FIG. 12.
if $Gender="M"
¥¥Share¥img¥car.jpg
else
¥¥Share¥img¥bag.jpg As described above, the frame rule of the frame 1005 includes a "data source reference." Accordingly, in step S1521, the VDP application program 504 acquires record information of record number "1" (recordNo=1) from the record information of FIG. 11. Then, in step S1522, the acquired record information is applied to the frame rule and the following "content reference" is derived.
¥¥Share¥img¥car.jpg If the "content reference" is derived, the determination result in step S1523 becomes NO and the processing flow proceeds to step S1526. Then, in step S1526, the VDP application program 504 sets the cache identification flag (second argument) to "FALSE" and sets the threshold value (third argument) to "200 KB." Then, the VDP application program 504 requests the DB broker program 505 to acquire the content data 516 using the second and third arguments. In response to this request, the DB broker program 505 executes the processing of FIG. 16. As the cache identification flag (second argument) is "FALSE", the determination result in step S1603 becomes NO and the processing flow proceeds to step S1604.

The size of "¥¥Share¥img¥car.jpg" (indicated by "content reference") is "300 KB" as illustrated in FIG. 13. Accordingly, the determination result in step S1604 becomes YES and the processing flow proceeds to step S1605. In step S1605, the DB broker program 505 sets "TRUE" to the parameter isProxy. In step S1526, the VDP application program 504 receives the parameter isProxy of "TRUE", as return value. Then, in step S1527, the VDP application program 504 sets the return value to contentData[4].isProxy.

Furthermore, if in step S1605 the DB broker program 505 requests the cache manager program 509 to acquire the cache ID, the cache manager program 509 generates the cache ID 523, the content ID, and the raster data 507 in steps S1701, S1703, and S1704 in FIG. 17 and stores the generated data into the cache DB 510. The cache ID 523 generated in this case is GUID 2030 of "3688C04A-32B6-45eb-B189-ADCED3B9310B." Furthermore, the VDP application program 504 generates MD5 value 2031 of "cce49c2d2d7f16cc0b9180fcaa5af015" from the "¥¥Share¥img¥car.jpg" ("content reference"), as content ID.

The content data is, for example, JPEG data 2032 having the contents illustrated in FIG. 19. The JPEG data 2032 is identical to the image illustrated in FIG. 13. Furthermore, the raster data 507 can be obtained by performing the raster image processing on the JPEG data 2032. The above-described cache ID 523 (GUID 2030) is returned to the VDP application program 504, as return value cacheId, in step S1526. Then, in step S1527, the VDP application program 504 sets the cache ID 523 (GUID 2030) to contentData[4] cacheId. Furthermore, thumbnail data 709d generated in step S1606 is returned, as return value data, to the VDP application program 504. The thumbnail data 709d is stored in a temporary directory indicated by the parameter tmpData, with a file name contentData[4].fileName(00010004.jpg) 2019, in step S1527.

FIG. 20 illustrates an example internal state of the VDP system at the time the VDP application program 504 has finished the routine of steps S1514 through S1527 twice (i.e., at the time the processing for the second page of a job is finished). The parameter recordNo value in this case is "2." The processing for the frame 1003 is similar to the processing described with reference to FIG. 19, although record information acquired in step S1521 is different from the record information described with reference to FIG. 19.

Namely, the VDP application program 504 acquires record information of record number "2" (recordNo=2) from the record information of FIG. 11. Therefore, array contentData [2] 2110 holds the content data 516 for the frame 1003. Furthermore, thumbnail data 709e of the content data 516 has a file name 2121. Furthermore, GUID 2137 is generated as the cache ID 523, MD5 value 2138 is generated as content ID, and PostScript data 2139 is generated as content data.

The processing for the frame 1005 is similar to the processing described with reference to FIG. 19, although the following features are different. The parameter frameIndex value used in the processing for the frame 1005 is "4." Therefore, array contentData[4] 2112 holds the content data 516 for the frame 1005. The contentData[4] fileName has a value "00020004.jpg" according to the rule described in step S1527. The following is the frame rule of the frame 1005 as illustrated in FIG. 12.
if $Gender="M"
¥¥Share¥img¥car.jpg
else
¥¥Share¥img¥bag.jpg As described above, the frame rule of the frame 1005 includes a "data source reference." Accordingly, in step 1521, the VDP application program 504 acquires record information of record number "2" (recordNo=2) from the record information of FIG. 11. Then, in step S1522, the record information is applied to the frame rule and the following "content reference" is derived.
¥¥Share¥img¥bag.jpg If the "content reference" is derived, the determination result in step S1523 becomes NO and the processing flow proceeds to step S1526. Then, in step S1526, the VDP application program 504 sets the cache identification flag (second argument) to "FALSE" and sets the threshold value (third argument) used in the determination of the cache to "200 KB". Then, the VDP application program 504 requests the DB broker program 505 to acquire the content data 516 using the second and third arguments. In response to this request, the DB broker program 505 executes the processing of FIG. 16. As the cache identification flag (second argument) is "FALSE", the determination result in step S1603 becomes NO and the processing flow proceeds to step S1604.

The size of "¥¥Share¥img¥bag.jpg" (indicated by "content reference") is "100 KB" as illustrated in FIG. 13. Accordingly, the determination result in step S1604 becomes NO and the DB broker program 505 terminates the processing of flowchart illustrated in FIG. 16 (i.e., content data acquisition processing). The return value data, the isProxy, and the cacheId have values set in step S1602, i.e., contents of "¥¥Share¥img¥bag.jpg", "FALSE", and "N/A (no value)." The VDP application program 504 receives these return value data, the isProxy, and the cacheId.

Then, in step S1527, the VDP application program 504 stores the content data of "¥¥Share¥img¥bag.jpg" included in the return value data into a temporary directory indicated by the parameter tmpData. The content data 2124 has a file name of contentData[4].fileName(00020004.jpg) 2123. As described above, the stored data in this case is original content data (not thumbnail data). Furthermore in step S1527, the VDP application program 504 sets the return value cacheId and the isProxy to the contentData[4].cacheId and the contentData[4].isProxy.

FIG. 21 illustrates an example internal state of the VDP system at the time the VDP application program 504 has finished the routine of steps S1514 through S1527 three times and the determination in step S1518 becomes NO (i.e., at the time the processing for the third page of a job is finished). The parameter recordNo value in this case is "3." The processing for the frame 1003 is similar to the processing described with reference to FIGS. 19 and 20, although record information acquired in step S1521 is different from the record information described with reference to FIGS. 19 and 20. Namely, the VDP application program 504 acquires record information of record number "3" (recordNo=3) from the record information of FIG. 11. Therefore, array contentData[2] 2210 holds the content data 516 for the frame 1003. Furthermore, thumbnail data 709f of the content data 516 has a file name 2225. Furthermore, the content data 516 has a cache ID 2244, content ID 2245, and contents 2246.

The processing for the frame 1005 is similar to the processing described with reference to FIGS. 19 and 20, although record information acquired in step S1521 is different from the record information described with reference to FIGS. 19 and 20. Namely, the VDP application program 504 acquires record information of record number "3" (recordNo=3) from the record information of FIG. 11. Furthermore, the cache DB 510 already stores cache ID, content ID, content data, and raster data corresponding to "¥¥Share¥img¥car.jpg" indicated by the "content reference." Namely, the cache DB 510 already stores cache ID 2030, content ID 2031, and content data/raster data 2032 corresponding to "¥¥Share¥img¥car.jpg." Accordingly, the cache ID, the content ID, the content data, and the raster data corresponding to the "¥¥Share¥img¥car.jpg" are not newly generated.

FIG. 22 illustrates an example PPML data file 702 generated in step S1528 of FIG. 15B. In FIG. 22, a 3-digit number added for explanation to the left side of each row is a row number which is not included in the description of the actual PPML data file 702.

As described above, the CUSTOMER table 1100 illustrated in FIG. 11 includes three kinds of record information. Accordingly, the VDP application program 504 executes the processing of step S1528 three times for the record information of the CUSTOMER table 1100 illustrated in FIG. 11. The internal state of the VDP system at the time the processing of step S1528 is once completed is illustrated in FIG. 19. The VDP application program 504 generates the description of row numbers 001 through 041 (i.e., first through 41st rows) as a result of first processing of step S1528.

The internal state of the VDP system at the time the processing of step S1528 is twice completed is illustrated in FIG. 20. The VDP application program 504 generates the description of row numbers 042 through 060 (i.e., 42nd through 60th rows) as a result of second processing of step S1528. The internal state of the VDP system at the time the processing of step S1528 is thrice completed is illustrated in FIG. 21. The VDP application program 504 generates the description of row numbers 061 through 079 (i.e., 61st through 79th rows) as a result of third processing of step S1528. Furthermore, the VDP application program 504 adds the description of row numbers 080 through 082 (80th through 82nd rows) immediately before VDP application program 504 generates the VDP job file 518 in step S1529.

The first row (row number 001) describes XML Declaration. According to the example of FIG. 22, the PPML data file 702 is described according to XML 1.0. The second row (row number 002) describes a start tag of "<PPML> element" as root element. According to the example of FIG. 22, "urn://www.podi.org/ppml/ppml2" is designated as a standard XML name space according to PPML2.1. An exemplary embodiment uses a prefix "ext" to designate an XML name space for extension description and a name space URI of "http://xxx.invalid/ppml2-ext", although "http://xxx.invalid/ppml2-ext" is a mere example and is not a real URI.

The third row (row number 003) describes a start tag of "<JOB> element" that indicates a job. The fourth row (row number 004) describes a start tag of "<DOCUMENT> element" that indicates a document. The PPML data file 702 can store a plurality of jobs and documents, although the example illustrated in FIG. 22 includes only one job and only one document.

The fifth to 14th rows (row numbers 005 through 014) define a reusable object used for referring to an object corresponding to the "array contentData[1] 1909 that holds the content data 516 for the frame 1002 (illustrated in FIG. 18)."

The fifth row (row number 005) describes a start tag of "<REUSABLE_OBJECT> element" that defines a reusable object. The sixth row (row number 006) describes a start tag of "<OBJECT> element" that defines a reusable object to be referred to. The Position attribute represents an offset from a drawing position where the reusable object is referred to. An example offset can be defined in increments of 1/72 inch.

The seventh to ninth rows (row numbers 007 through 009) describe a "<SOURCE> element" and an "<EXTERNAL_DATA> element" that designate the position of content data (reusable object). The Format attribute of the "<SOURCE> element" designates a format of the content data. The Dimension attribute of the "<SOURCE> element" represents a drawing size of the content data when it is referred to.

The Src attribute of the "<EXTERNAL_DATA> element" designates a storage place of the content data. The example of FIG. 22 describes the contents of "contentData[1] fileName" illustrated in the array contentData[1] 1909, as Src attribute of "<EXTERNAL_DATA> element." The isProxy attribute of the "<EXTERNAL_DATA> element" designates whether the data is the proxy data 513. The example of FIG. 22 describes the contents of "contentData[1].isProxy" illustrated in the array contentData[1] 1909, as isProxy attribute of the "<EXTERNAL_DATA> element." The cacheId attribute of the "<EXTERNAL_DATA> element" designates the cache ID 523. The example of FIG. 22 describes the contents of "contentData[1].cacheId" illustrated in the array contentData[1] 1909. The isProxy attribute and the cacheId attribute of the "<EXTERNAL_DATA> element" are attributes extended according to an exemplary embodiment. Therefore, another name space can be designated using ext prefix, as the isProxy attribute and the cacheId attribute of the "<EXTERNAL_DATA> element."

The tenth row (row number 010) describes an end tag of the "<OBJECT> element" which is paired with the start tag described in the sixth row (row number 006). The 11th to 13th rows (row numbers 011 through 013) describe an "<OCCURRENCE_LIST> element" and an "<OCCURRENCE> element" which define a method for referring to the reusable object. The Name attribute of the "<OCCURRENCE> element" defines a name to be designated when the reusable object is referred to. The example of FIG. 22 describes the Name attribute of the "<OCCURRENCE> element" using the contentData[4].fileName(00010004.jpg) 2019 except for the extension portion. The Scope attribute of the "<OCCURRENCE> element" designates an effective range when the reusable object is referred to. The example of FIG. 22 describes that the effective range is within a document.

The 14th row (row number 014) describes an end tag of the "<REUSABLE_OBJECT> element" which is paired with the start tag described in the fifth row (row number 005). The 15th through 24th rows (row numbers 015 through 024) define a reusable object used for referring to an object corresponding to the "array contentData[3] 1910 that holds the content data 516 for the frame 1004 (illustrated in FIG. 18)." A method for describing the 15th through 24th rows (row numbers 015 to 024) is similar to the method for describing the fifth through 14th rows (row numbers 005 to 014).

The 25th through 43rd rows (row numbers 025 through 043) define a printout page for the first page. The 25th row (row number 025) describes a comment. The 26th row (row number 026) describes a start tag of a "<PAGE> element" that defines a page.

The 27th through 29th rows (row numbers 027 through 029) describe a "<MARK> element" and an "<OCCURRENCE_REF> element" for drawing the frame 1002. The Position attribute of the "<MARK> element" designates a lower-left coordinate position of the frame 1002. As illustrated in FIG. 19, an object corresponding to the frame 1002 can be identified by the array contentData[1] 1909, and this object is a reusable object. Accordingly, the Ref attribute of the "<OCCURRENCE_REF> element" refers to the reusable object defined in the fifth through 14th rows (row numbers 005 through 014)

The 30th through 34th rows (row numbers 030 through 034) describe an "<OBJECT> element", a "<SOURCE> element," and an "<EXTERNAL_DATA> element" for drawing the frame 1003. The Position attribute of the "<OBJECT> element" designates a lower-left coordinate position of the frame 1003. As illustrated in FIG. 19, an object corresponding to the frame 1003 is the array contentData[2] 2010, and this object is not a reusable object. Accordingly, the content data can be directly designated using the "<SOURCE> element" and the "<EXTERNAL_DATA> element." The Format attribute of the "<SOURCE> element" designates a format of the content data. The Dimension attribute of the "<SOURCE> element" describes a drawing size when the content data is referred to.

The Src attribute of the "<EXTERNAL_DATA> element" designates a storage place of the content data. The example of FIG. 22 describes "00010002.jpg" 2017 which is the contents of contentData[2] fileName. The isProxy attribute of the "<EXTERNAL_DATA> element" designates whether the data is the proxy data. The example of FIG. 22 describes "TRUE" which is the contents of contentData[2].isProxy. The cacheId attribute of the "<EXTERNAL_DATA> element" designates a cache ID. The example of FIG. 22 describes the contents of contentData[2] cacheId. The isProxy attribute and the cacheId attribute of the "<EXTERNAL_DATA> element" are attributes extended according to an exemplary embodiment. Therefore, another name space can be designated using ext prefix, as the isProxy attribute and the cacheId attribute of the "<EXTERNAL_DATA> element."

The 35th through 37th rows (row numbers 035 through 037) describe a "<MARK> element" and an "<OCCURRENCE_REF> element" for drawing the frame 1004. The Position attribute of the "<MARK> element" designates a lower-left coordinate position of the frame 1004. As illustrated in FIG. 19, an object corresponding to the frame 1004 can be identified by the array contentData[3] 1910, and this object is a reusable object. Accordingly, the Ref attribute of the "<OCCURRENCE_REF> element" refers to the reusable object defined in the 15th through 24th rows (row numbers 015 through 024).

The 38th through 42nd rows (row numbers 038 through 042) describe an "<OBJECT> element", a "<SOURCE> element", and an "<EXTERNAL_DATA> element" for drawing the frame 1005. The Position attribute of the "<OBJECT> element" designates a lower-left coordinate position of the frame 1005. As illustrated in FIG. 19, an object corresponding to the frame 1005 is the array contentData[4] 2012, and this object is not a reusable object. Accordingly, the content data can be directly designated using the "<SOURCE> element" and the "<EXTERNAL_DATA> element." The Format attribute of the "<SOURCE> element" designates a format of the content data. The Dimension attribute of the "<SOURCE> element" describes a drawing size when the content data is referred to.

The Src attribute of the "<EXTERNAL_DATA> element" designates a storage place of the content data. The example of FIG. 22 describes "00010004.jpg" which is the contents of contentData[4] fileName. The isProxy attribute of the "<EXTERNAL_DATA> element" designates whether the data is proxy data. The example of FIG. 22 describes "TRUE" which is the contents of contentData[4].isProxy. The cacheId attribute of the "<EXTERNAL_DATA> element" designates a cache ID. The example of FIG. 22 describes the contents of contentData[4] cacheId. The isProxy attribute and cacheId attribute of the "<EXTERNAL_DATA> element" are attributes extended according to an exemplary embodiment. Therefore, another name space can be designated using ext prefix, as the isProxy attribute and the cacheId attribute of the "<EXTERNAL_DATA> element.

The 43rd row (row number 043) describes an end tag of a "<PAGE> element" which is paired with the start tag described in the 26th row (row number 026). The 44th through 62nd rows (row numbers 044 through 062) define a printout page for the second page. The definition of the second page is similar to the definition of the first page described in the 25th through 43rd rows (row numbers 025 through 043) except for a description referring to the internal state of the VDP system illustrated in FIG. 20. According to the contents of array contentData[4] 2112 that holds the content data 516 for the frame 1005, "FALSE" is described as isProxy extension attribute of the "<EXTERNAL_DATA> element" in 59th row (row number 059).

The 63rd through 81st rows (row numbers 063 through 081) define a printout page for the third page. The definition of the third page is similar to the definition of the first page described in the 25th through 43rd rows (row numbers 025 through 043) except for a description referring to the internal state of the VDP system illustrated in FIG. 21.

The 82nd row (row number 082) describes an end tag of the <DOCUMENT> element, which is paired with the start tag described in the fourth row (row number 004). The 83rd row (row number 083) describes an end tag of the "<JOB> element" which is paired with the start tag described in the third row (row number 003). The 84th row (row number 084) describes an end tag of the <PPML> element as a root element, which is paired with the start tag described in the second row (row number 002).

Figure 23:
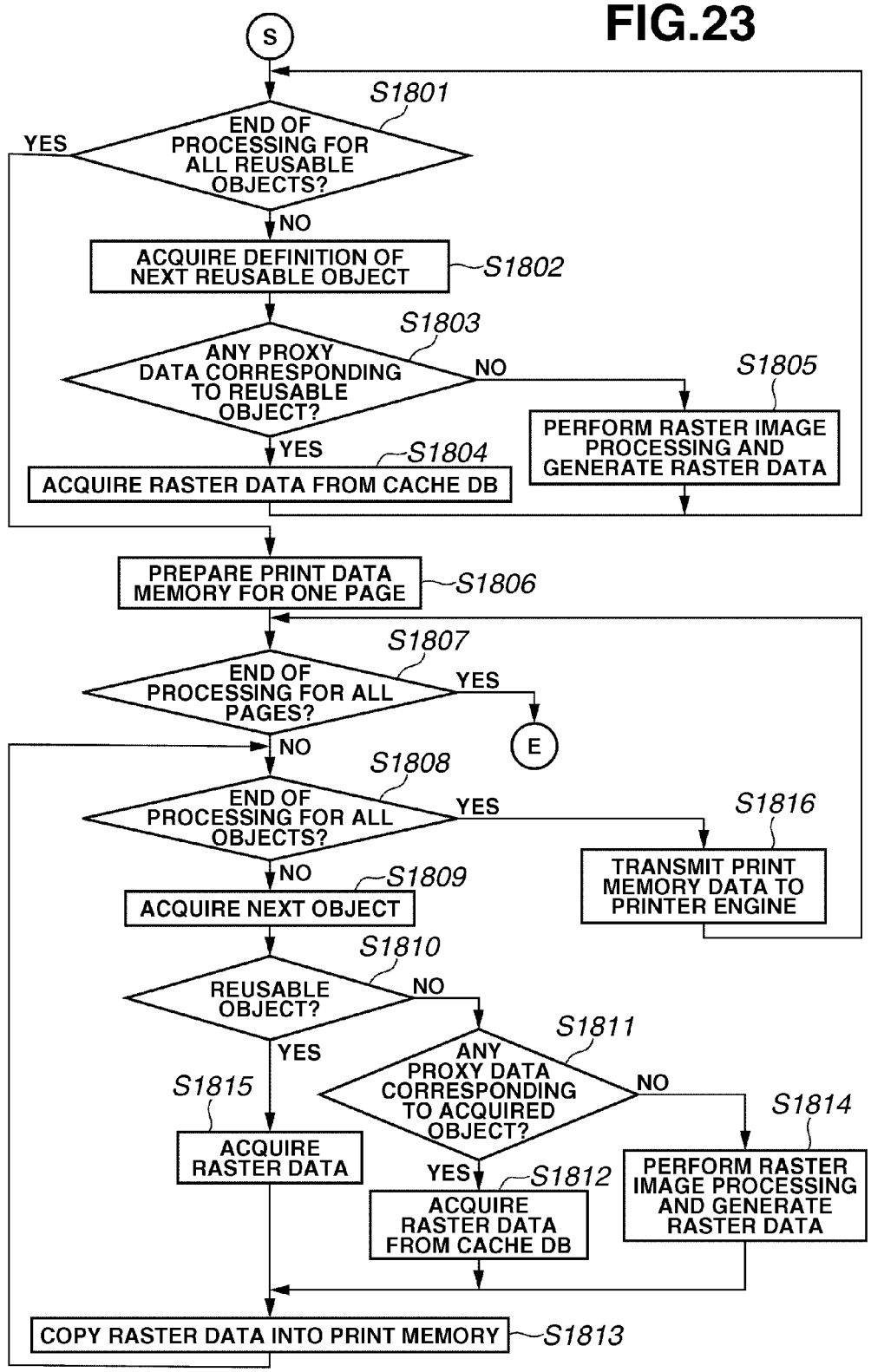
FIG. 23 is a flowchart illustrating an example operation performed by a RIP program in response to transmission of a VDP job file according to an exemplary embodiment of the present invention.

Next, an example operation performed by the RIP program 508 in response to the VDP job file 518 transmitted in step S1529 of FIG. 15B is described with reference to the flowchart of FIG. 23. The VDP job file 518 includes the array contentData [1] through [4] 1909, 1910, 2210, and 2212 (all files in the temporary directory temDir) illustrated in FIG. 21 and the PPML data file 702 illustrated in FIG. 22. The cache DB 510 has the contents illustrated in FIG. 21 when the VDP job file 518 is transmitted. The processing of the flowchart illustrated in FIG. 23 can be realized by the MFP control unit (CPU) 301 which executes a program loaded into the RAM 302 from the external storage apparatus 305.

The processing of steps S1801 through S1804 is loop processing for defining a reusable object. In step S1801, the RIP program 508 determines whether the processing for defining a reusable object in the PPML data file 702 is thoroughly accomplished. If the processing for defining a reusable object in the PPML data file 702 is thoroughly accomplished (YES in step S1801), the processing flow proceeds to step S1806. If the processing for defining a reusable object in the PPML data file 702 is not thoroughly accomplished (NO in step S1801), the processing flow proceeds to step S1802.

In step S1802, the RIP program 508 acquires a definition of a reusable object to be processed. More specifically, the RIP program 508 writes a definition of a reusable object included in the PPML data file 702 into the RAM 302. In step S1803, the RIP program 508 determines whether the VDP job file 518 includes the proxy data 513 corresponding to the reusable object acquired in step S1802. More specifically, the RIP program 508 determines that there is the proxy data 513 if the <isProxy> extension attribute of the "<EXTERNAL_DATA> element" in the PPML data file 702 has a "TRUE" value.

If the VDP job file 518 includes the proxy data 513 (YES in step S1803), the processing flow proceeds to step S1804. If the VDP job file 518 does not include the proxy data 513 (NO in step S1803), the processing flow proceeds to step S1805.

According to the example PPML data file 702 illustrated in FIG. 22, as described in the definition of the reusable object in the fifth through 14th rows (row numbers 005 through 014), the "<isProxy> extension attribute" of the "<EXTERNAL_DATA> element" has a "TRUE" value. Furthermore, as described in the definition of a reusable object in the 15th through 24th rows (row numbers 015 through 024), the "<isProxy> extension attribute" of the "<EXTERNAL_DATA> element" has a "TRUE" value.

If the processing flow proceeds to step S1804, the cache DB 510 already stores the content data 516 and the raster data 507 of the reusable object. Accordingly, the RIP program 508 acquires the raster data 507 from the cache DB 510. More specifically, the RIP program 508 requests the cache manager 509 to acquire the raster data 507 using, as key information, a "<cacheId extension attribute" value of the "<EXTERNAL_DATA> element" in the PPML data file 702. The cache manager 509 reads the corresponding raster data 507 from the cache DB 510 and transmits the read raster data 507 to the RIP program 508. The processing of the above-described step S1804 can be performed using the communication paths 525, 529, 530, and 526. The RIP program 508 receives the raster data 507 from the cache manager 509 and stores the acquired raster data 507 into an associative array reusableObject[ ] prepared in the RAM 302. The key of the associative array is a "Name attribute" value of the "<OCCURRENCE> element."

According to the example PPML data file 702 illustrated in FIG. 22, "cacheId="C55AACBD-66EE-4dc6-974A-2BAC781DOD31" is described in the definition of the reusable object in the fifth through 14th rows (row numbers 005 through 014). Accordingly, the cache ID 1915 is a corresponding cache ID. Therefore, the RIP program 508 acquires raster data corresponding to the content data 1917. Then, the RIP program 508 stores the acquired raster data into the associative array reusableObject[ ] using key information of Name="00000001."

Furthermore, cacheId="1E3B90CC-A325-4d68-AE61-050C7166E14F" is described in the definition of the reusable object in the 15th through 24th rows (row numbers 015 through 024). Accordingly, the cache ID 1918 is a corresponding cache ID. Therefore, the RIP program 508 acquires raster data corresponding to the content data 1920. Then, the RIP program 508 stores the acquired raster data into the associative array reusableObject[ ] using key information of Name="00000003." Then, the processing flow returns to step S1801.

If the processing flow proceeds to step S1805, the cache DB 510 does not store the content data 516 of the reusable object. Accordingly, the RIP program 508 acquires the content data 516 from the VDP job file 518 and performs raster image processing on the acquired content data 516 to generate the raster data 507. Then, the RIP program 508 stores the generated raster data 507 into the associative array reusableObject[ ] prepared in the RAM 302. The key of the associative array is a Name attribute value of the "<OCCURRENCE> element." Then, the processing flow returns to step S1801.

If in step S1801 the processing for defining a reusable object in the PPML data file 702 is thoroughly accomplished (YES in step S1801), the processing flow proceeds to step S1806. Then, the RIP program 508 prepares a print data memory pageData in the RAM 302 to transmit print data of one page to the printer engine 307.

The processing of steps S1807 through S1817 is double-loop processing. The processing of steps S1807 through S1817 (i.e., outer loop) is for printing each page. The end of the outer loop processing is determined in step S1807. The processing of steps S1809 through S1816 (i.e., inner loop) is for drawing each object of the page to the print data memory pageData. The end of the inner loop processing is determined in step S1808.

In step S1807, the RIP program 508 determines whether processing for each "<PAGE> element" of the PPML data file 702 has been completed. More specifically, the RIP program 508 determines that the processing for each "<PAGE> element" has been terminated if </DOCUMENT> (i.e., an end tag of the "<DOCUMENT> element" in the PPML data file 702) is found. If the processing for each "<PAGE> element" of the PPML data file 702 has been completed (YES in step S1807), the RIP program 508 terminates the processing of this routine. If the processing for each "<PAGE> element" of the PPML data file 702 has not been completed (NO in step S1807), the processing flow proceeds to step S1808.

In step S1808, the RIP program 508 determines whether processing for all objects in each "<PAGE> element" of the PPML data file 702 has been completed. More specifically, the RIP program 508 determines that the processing for all objects in each "<PAGE> element" has been terminated if </PAGE> (i.e., an end tag of the "<PAGE> element" in the PPML data file 702) is found. If the processing for all objects in each "<PAGE> element" has been completed (YES in step S1808), the processing flow proceeds to step S1816. If the processing for all objects in each "<PAGE> element" has not been completed (NO in step S1808), the processing flow proceeds to step S1809.

In step S1809, the RIP program 508 acquires a processing object (i.e., an object to be processed). More specifically, the RIP program 508 writes the next object in the "<PAGE> element" of the PPML data file 702 into the RAM 302. In step S1810, the RIP program 508 determines whether the object written in step S1809 is a reusable object. More specifically, if the object written in step S1809 is a "<MARK> element" (YES in step S1810), the RIP program 508 determines that the object is a reusable object and the processing flow proceeds to step S1815. If the object written in step S1809 is not the "<MARK> element" (NO in step S1810), the processing flow proceeds to step S1811. According to the example PPML data file 702 illustrated in FIG. 22, the RIP program 508 determines that both the first object and the third object are reusable in each page.

In step S1811, the RIP program 508 determines whether the VDP job file 514 includes the proxy data 513 corresponding to the object acquired in step S1808. More specifically, the RIP program 508 determines that the VDP job file 514 includes the proxy data 513 if the "<isProxy> extension attribute" of the "<EXTERNAL_DATA> element" in the PPML data file 702 has a "TRUE" value. If the VDP job file 518 includes the proxy data 513 (YES in step S1811), the processing flow proceeds to step S1812. If the VDP job file 518 does not include the proxy data 513 (NO in step S1811), the processing flow proceeds to later-described step S1814.

According to the example PPML data file 702 illustrated in FIG. 22, as described in the definition of the reusable object in the fifth through 14th rows (row numbers 005 through 014), the "<isProxy> extension attribute" of the "<EXTERNAL_DATA> element" has a "TRUE" value. Furthermore, as described in the definition of the reusable object in the 15th through 24th rows (row numbers 015 through 024), the "<isProxy> extension attribute" of the "<EXTERNAL_DATA> element" has a "TRUE" value. According to the PPML data file 702 illustrated in FIG. 22, if the currently processed page is the first page, the RIP program 508 determines that the second object (the 30th through 34th rows) and the fourth object (38th through 42nd rows) are the proxy data 513. Furthermore, if the currently processed page is the second page, the RIP program 508 determines that the second object (49th through 53rd rows) is the proxy data 513 and the fourth object (57th through 61st rows) is not the proxy data 513. Furthermore, if the currently processed page is the third page, the RIP program 508 determines that the second object (68th through 72nd rows) and the fourth object (76th through 80th rows) are the proxy data 513.

If the cache DB 510 already stores the content data 516 and the raster data 507 of the object written into the RAM 302 in step S1809, the processing flow proceeds to step S1812. Accordingly, in step S1812, the RIP program 508 acquires the raster data 507. More specifically, the RIP program 508 requests the cache manager 509 to acquire the raster data 507 using, as key information, a "<cacheId> extension attribute" value of the "<EXTERNAL_DATA> element" in the PPML data file 702. The cache manager 509 reads the corresponding raster data 507 from the cache DB 510 and transmits the read raster data 507 to the RIP program 508. The processing of the above-described step S1812 can be performed using the communication paths 525, 529, 530, and 526. The RIP program 508 receives the raster data 507 from the cache manager 509 and stores the acquired raster data 507 into parameter 'data' prepared in the RAM 302. The key of the associative array is a "Name attribute" value of the "<OCCURRENCE> element." Furthermore, the RIP program 508 stores a "Position attribute" value of the "<OBJECT> element" in the PPML data file 702 into a parameter 'position' prepared in the RAM 302.

According to the PPML data file 702 illustrated in FIG. 22, the 30th through 34th rows (row numbers 030 through 034) describe "D8BB50FE-44E7-41ea-A658-99E77AF3235A" as "<cacheId> extension attribute" value of the "<EXTERNAL_DATA> element." Accordingly, the cache ID 2027 is a corresponding cache ID. Therefore, the RIP program 508 acquires raster data corresponding to the content data 2029 and stores the acquired raster data into the parameter 'data.'

In step S1813, the RIP program 508 overwrites and copies the raster data stored in the parameter 'data' to a coordinate position of the print data memory pageData. Then, the processing flow returns to step S1808.

If in step S1811 the RIP program 508 determines that the VDP job file 514 does not include the proxy data 513 corresponding to the object acquired in step S1808, the processing flow proceeds to step S1814. If the processing flow proceeds to step S1814, the cache DB 510 does not store the content data 516 of the object written in step S1809. Accordingly, in step S1814, the RIP program 508 acquires the content data 516 from the VDP job file 518 and performs raster image processing on the acquired content data 516 to generate the raster data 507. Then, the RIP program 508 stores the generated raster data 507 into the parameter 'data' prepared in the RAM 302. Furthermore, the RIP program 508 stores a "Position attribute" value in the "<OBJECT> element" of the PPML data file 702 into the parameter 'position' prepared in the RAM 302. Then, the processing flow proceeds to the above-described step S1813.

According to the PPML data file 702 illustrated in FIG. 22, the 57th through 61st rows (row numbers 057 through 061) describe "00020004.jpg" as "Src attribute" value of the "<EXTERNAL_DATA> element." Accordingly, the cache ID 2030 is a corresponding cache ID. Therefore, the RIP program 508 acquires the content data 516 from the VDP job file 518 and performs raster image processing on the acquired content data 516 to generate the raster data 507.

If in step S1810 the RIP program 508 determines that the object written in step S1809 is a reusable object, the processing flow proceeds to step S1815. If the processing flow proceeds to step S1815, the raster data 507 is already prepared in the associative array reusableObject[ ]. Accordingly, the RIP program 508 acquires the raster data 507 from the associative array reusableObject[ ] using, as key information, a name designated in "Ref attribute" of the "<OCCURRENCE_REF> element" of the PPML data file 702. Then, the RIP program 508 stores the acquired raster data 507 into the parameter 'data' prepared in the RAM 302. Furthermore, the RIP program 508 stores a "Position attribute" value in the "<MARK> element" of the PPML data file 702 into the parameter 'position' prepared in the RAM 302.

According to the PPML data file 702 illustrated in FIG. 22, the RIP program 508 accesses the associative array reusableObject[ ] using, as key information, a "Ref attribute" value "00000001" of the "<OCCURRENCE_REF> element" described in the 27th through 29th rows (row numbers 027 through 029). Then, the RIP program 508 acquires the raster data 507 prepared in step S1804 for the reusable object defined in the fifth through 14th rows (row numbers 005 through 014).

Figure 25:
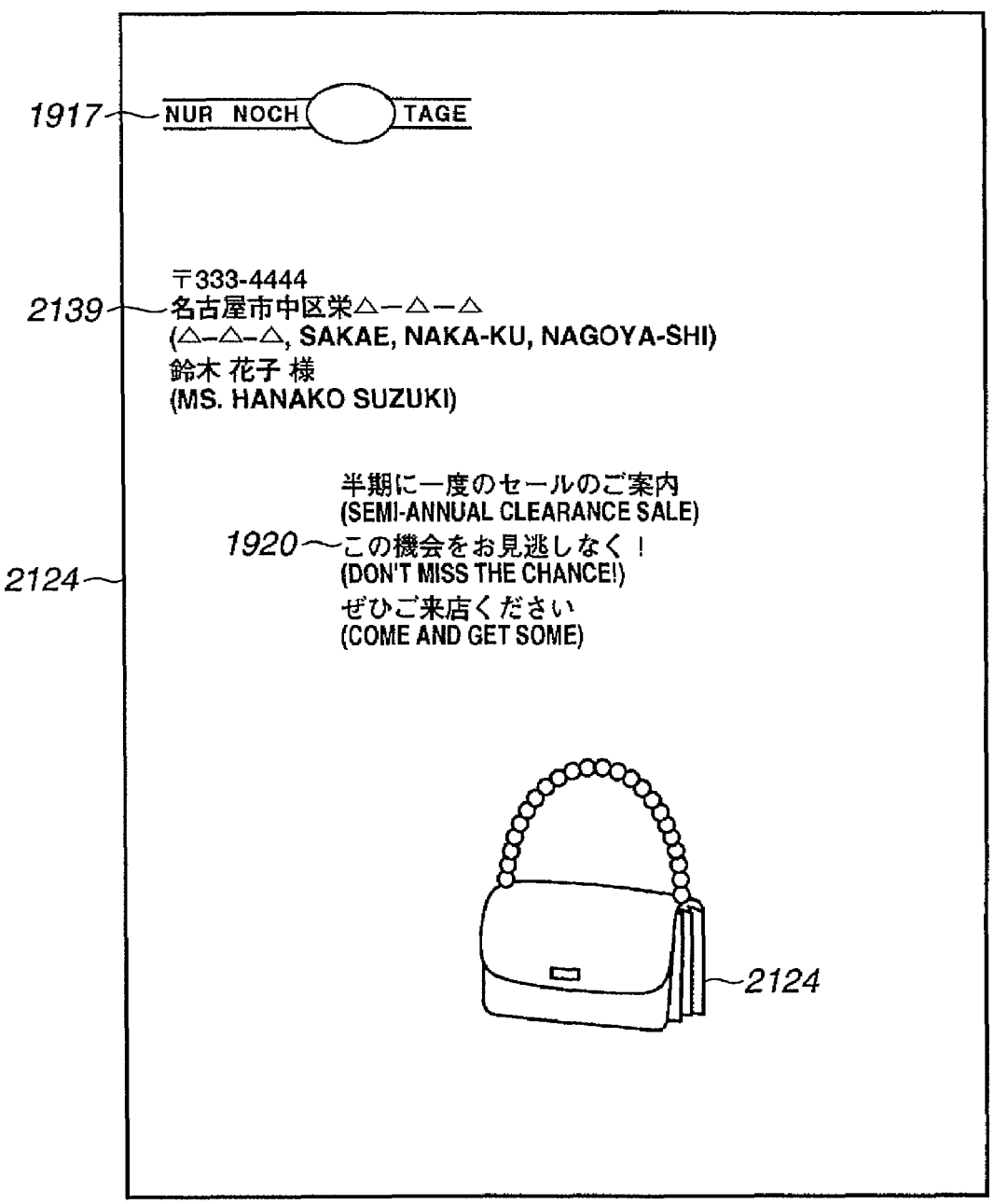
FIG. 25 illustrates an example print result of the second page according to an exemplary embodiment of the present invention.
Figure 26:
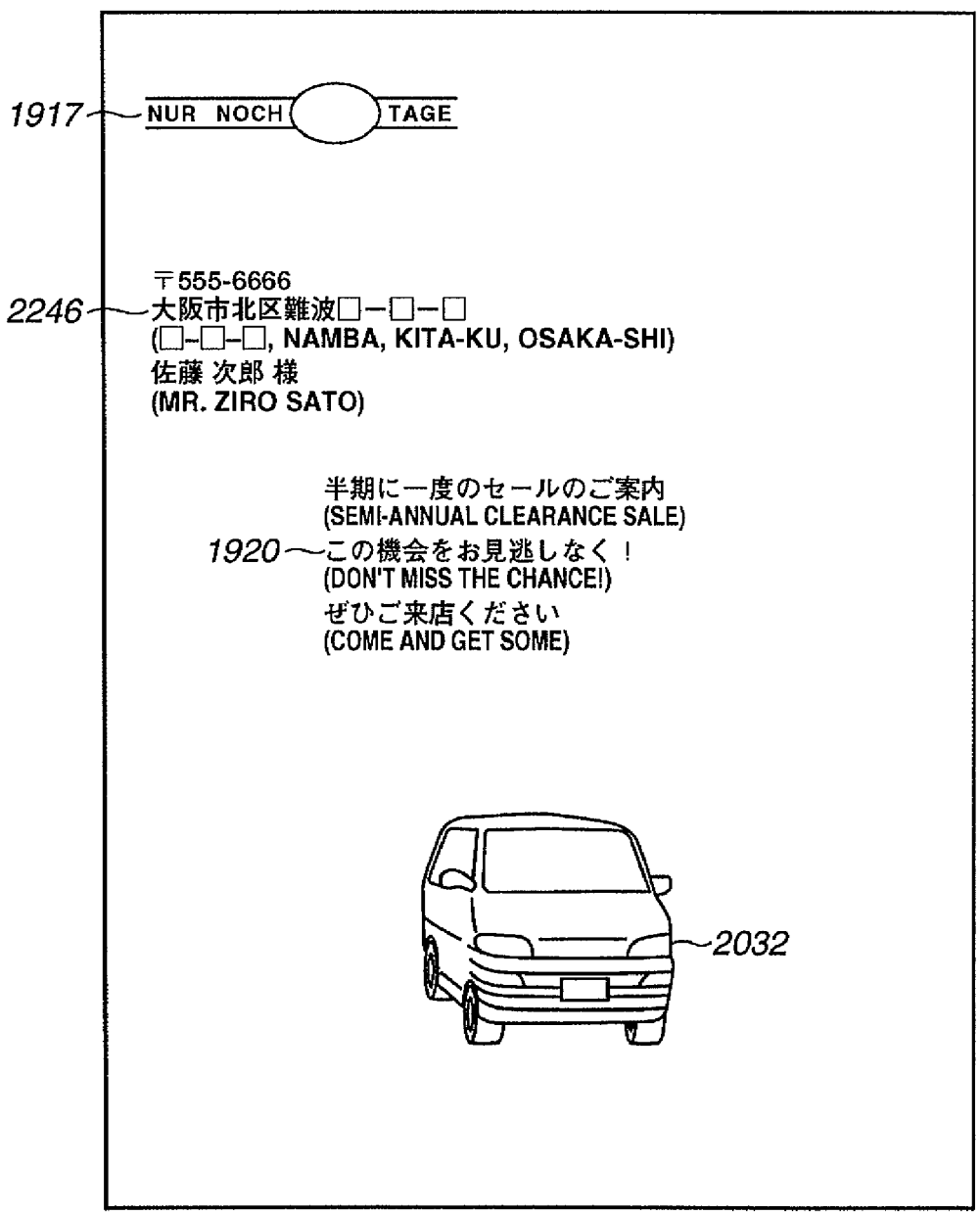
FIG. 26 illustrates an example print result of the third page according to an exemplary embodiment of the present invention.

If in step S1808 the RIP program 508 determines that the processing for all objects in each "<PAGE> element" of the PPML data file 702 has been completed, the processing flow proceeds to step S1816. Then, the RIP program 508 transmits the contents of the print data memory pageData to the printer engine 307 that performs print processing. FIGS. 24, 25, and 26 illustrate example print results of the first through third pages obtained through the above-described operation.

As described above, according to an exemplary embodiment, the VDP client 101 transmits the content data 516 to the VDP printer 102 before generating the VDP job file 518. Then, the VDP client 101 acquires the cache ID 523 (i.e., information used to identify the content data 516) from the VDP printer 102, and stores the acquired cache ID 523 in relation with the content data 516. The VDP client 101 generates the VDP job file 518 based on the proxy data 513 including the cache ID 523 instead of the content data 516 and transmits the generated VDP job file 518 to the VDP printer 102. As described above, an exemplary embodiment uses replaceable data having a smaller data amount compared to the original content data 516 and therefore can reduce the data amount of the VDP job file 518. Therefore, the throughput can be improved in the image formation with insertion of the content data 516.

Furthermore, according to an exemplary embodiment, if the content data 516 is received from the VDP client 101, the VDP printer 102 generates the cache ID 523 of the content data 516. Additionally, the VDP printer 102 performs raster image processing on the content data 516 and generates the raster data 507. Then, the VDP printer 102 relates the cache ID 523, the content data 516, and the raster data 507 and stores the related data into the cache DB 510. Then, if the VDP job file 518 transmitted from the VDP client 101 includes the proxy data 513, the VDP printer 102 performs print processing using the raster data 507 corresponding to the cache ID 523 included in the proxy data 513. Accordingly, the raster image processing performed in the acquisition of the VDP job file 518 can be partly omitted and the time required for the print processing can be reduced.

Furthermore, according to an exemplary embodiment, the cache ID 523, the content data 516 (i.e., data identified by the cache ID 523), and thumbnail data 709 of the content data 516 are related to each other and stored in the external storage device 204. Accordingly, if the cache ID 523 relating to the content data 516 requested by the VDP application program 504 is already stored, the cache ID acquisition processing can be omitted.

According to an exemplary embodiment, as illustrated in FIG. 1, the VDP client 101, the VDP printer 102, and the DB server 103 are mutually connected via the network 104. However, the VDP client 101, the VDP printer 102, and the DB server 103 can be connected differently. For example, the VDP client 101 and the VDP printer 102 can be directly connected. Furthermore, if the VDP client 101 and the VDP printer 102 are not connected with each other, a user can use a portable media (e.g., a USB memory or a removable HDD) to manually transport the VDP job file 518 from the VDP client 101 to the VDP printer 102.

Furthermore, according to an exemplary embodiment, programs are stored in the RAMs 202 and 302 as illustrated in FIGS. 2 and 3. However, the storage place of the programs is not limited to the described examples. For example, programs can be read from the external storage devices 204 and 305 or received via the network interfaces 203 and 303. Furthermore, although not illustrated in FIGS. 2 and 3, programs can be read from a read only storage medium, such as ROM. Furthermore, the VDP client 101 and the DB server 103 can include a sound input device or other input device in addition to the keyboard 206 and the pointing device 207. Furthermore, the display unit 205, the keyboard 206, and the pointing device 207 can be commonly used among a plurality of computers. In the VDP printer 102, an apparatus performing the RIP processing and an apparatus performing a print output can be separately provided.

Furthermore, the VDP application program 504 illustrated in FIG. 5 is a single program. However, according to an exemplary embodiment, the VDP application program 504 is not limited to a single program. For example, the VDP application program 504 may be a sub-program which is executable as Adobe PhotoShop® plug-in, Adobe Illustrator® plug-in, Adobe InDesign® plug-in, or Adobe PDF® plug-in. Furthermore, the VDP application program 504 may be a sub-program which is executable as Microsoft Word® add-on.

Furthermore, the DB broker program 505 may not be present in the VDP client 101. For example, the DB broker program 505 may be present in the DB server 103 or in the VDP printer 102. Furthermore, the DB broker program 505 may be present in another computer.

Furthermore, the VDP application program 504, the DB broker program 505, the content DB 506, the RIP program 508, and the cache manager 509 can perform direct transmission/reception processing of various data. However, the transmission/reception of various data can be executed by using a workflow manager or via a module of a representative server. Especially, regarding the VDP job file 518, if a hot folder is provided in the external storage device 204 of the VDP client 101, the RIP program 508 can monitor a change of the hot folder. As described above, the RIP program 508 can actively acquire the VDP job file 518 placed in the hot folder. For example, various data according to an exemplary embodiment include the raster data 507, the proxy data 513, the content data 516, the VDP job file 518, and the cache ID 523.

Furthermore, according to an exemplary embodiment, the VDP printer 102 may include a job manager capable of managing the VDP job file 518 and a RIP manager capable of managing the processing of the RIP program 508. In this case, it is apparent that the above-described exemplary system can be applied even if the RIP program 508 performs only the raster image processing.

Furthermore, according to an exemplary embodiment, the proxy data 513 includes the cache ID 523 and the thumbnail data 709 as illustrated in FIG. 7B. The thumbnail data 709 is included in the VDP job file 518 so that inspection, preview, and test print processing can be performed. However, the thumbnail data 709 can be omitted if the inspection, the preview, and the test print processing are not required. Furthermore, if the cache ID 523 can be retrieved from the content ID, the cache ID 523 can be replaced with the content ID. Furthermore, according to an exemplary embodiment, GUID is used to generate the cache ID 523. However, any other method can be used to generate the cache ID 523 if the uniqueness is assured. Furthermore, according to an exemplary embodiment, MD5 is used to generate the content ID 523. However, any other method can be used to generate the content ID 523 if the same content ID is generated from the same content and a different content ID is generated from a different content. Namely, any other method can be used to generate the content ID 523 if it can prevent or can almost prevent the substantial collision of the content ID 523.

Furthermore, according to an exemplary embodiment, the menu window 1006 and the main window 1001 are not limited to the separate windows illustrated in FIG. 10. For example, the main window 1001 may include a menu bar or a tool bar used in the Windows® application. Furthermore, any other method can be used to display a menu screen that enables a user to operate the menu. Furthermore, other samples can be used for the menu items illustrated in FIG. 10.

Furthermore, according to an exemplary embodiment, the frames 1002 through 1005 are generated in the main window 1001 as minimum units for the layout of content data. However, the settings of a frame rule may include variable data as part of a text inserted into the frames 1002 through 1005. Furthermore, the settings of a frame rule may include variable data (e.g., position, size, modification method, format, attribute, and visibility) relating to the frames 1002 through 1005. The settings may include variable data representing layers in a VDP document or attributes of the VDP document. As described above, various elements of a VDP document can be set as variable data of the rule. The above-described exemplary system can be applied also in these cases.

Furthermore, according to an exemplary embodiment, the VDP application program 504 directly accesses the CUSTOMER table 1100 designated by the text box 1007. However, the CUSTOMER table 1100 can be stored in an external DB (e.g., the content DB 506). In this case, the DB broker program 505 intervenes between the VDP application program 504 and the external DB to access the CUSTOMER table 1100.

Furthermore, according to an exemplary embodiment, the definition of the frame rule grammar is not limited to the description in the frame management table 1200 of FIG. 12.

Furthermore, according to an exemplary embodiment, the UNC notation is used to refer to the content data 516. However, the content data 516 can be referred to using the URI, URL, URN or other notation. The content data 516 can be referred to using a method depending on a specific environment. Furthermore, the content data 516 can be referred to using an expression referring to a database (e.g., designation based on a Structured Query Language (SQL)) or an expression locally or remotely evoking a program. Namely, an arbitrary description method can be used to refer to the content data 516. Furthermore, the flag stored in the ReusableObject column 1203 can be updated every time if the frame management table 1200 does not include the flag.

Furthermore, according to an exemplary embodiment, the raster data 507 is used as cache data. The intermediate language data that do not depend on a device (printer) can be used as cache data. Furthermore, the cache data can include both intermediate language data and raster data.

Figure 16:
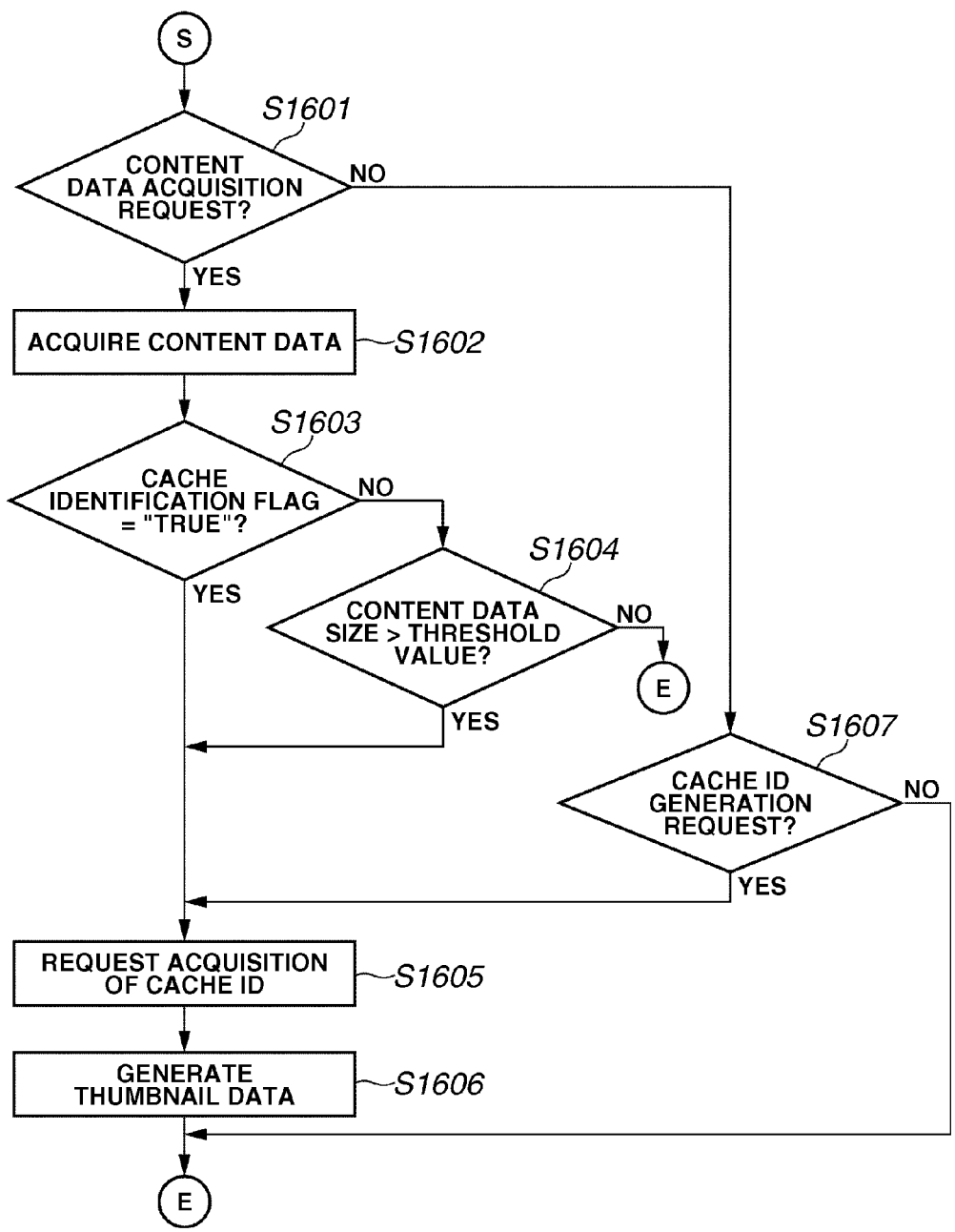
FIG. 16 is a flowchart illustrating an example operation of a database (DB) broker program performed in response to a generation request of a cache ID or an acquisition request of content data according to an exemplary embodiment of the present invention.

Furthermore, according to an exemplary embodiment, in FIG. 16, the threshold value (third argument) used to determine whether to cache the content data 516 is a size (capacity) of the content data 516. However, the threshold value may be a type of the content data 516, complicatedness in the raster image processing, or a remaining capacity of the cache DB 510, or other arbitrary index (condition).

Furthermore, according to an exemplary embodiment, the DB broker program 505 generates the thumbnail data 709. However, the cache manager program 509 can use a function of the RIP program 508 to generate the thumbnail data 709. In this case, the cache manager program 509 can transmit the thumbnail data 709 and the cache ID 523 to the DB broker program 505 via the communication path 104e. In this manner, if the thumbnail data 709 is stored in the cache DB 510, the thumbnail data 709 corresponding to the same the content data 516 can be cached.

Furthermore, according to an exemplary embodiment, the PPML technology is used for formatting a document. However, the document format is not limited to the PPML technology. For example, other document format technology (e.g., PPML/VDX, PPML Template, VIPP, FreeForm, or VPS) can be used.

Furthermore, according to an exemplary embodiment, the proxy data 513 includes the cache ID 523 and the thumbnail data 709. In this case, the thumbnail data 709 is stored in the VDP job file 518 and the cache ID 523 is described in the PPML data file 702 as extension attribute using an XML name space. However, the cache ID 523 can be described in a specific file of the VDP job file 518 or can be directly embedded into the thumbnail data 709.

The above-described functional units constituting a data processing apparatus or an image forming apparatus or steps of a data processing method or an image forming method according to the exemplary embodiments of the present invention can be realized by a computer that operates according to a program stored in a RAM or a ROM. The present invention encompasses the program and a computer-readable recording medium storing the program.

Furthermore, the present invention can be embodied as a system, an apparatus, a method, a program or a storage medium. More specifically, the present invention can be applied to a system including a plurality of devices or can be applied to a single apparatus.

Furthermore, software program code for realizing the functions of the above-described exemplary embodiments (i.e., the sequence illustrated in FIGS. 8 and 9 and the program corresponding to the flowcharts illustrated in FIGS. 15A through 17 and 23) can be directly or remotely supplied to a system or an apparatus including various devices. A computer (or CPU or micro-processing unit (MPU)) in the system or the apparatus can execute the program to operate the devices to realize the functions of the above-described exemplary embodiments.

Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R)

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or all of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-000747 filed Jan. 5, 2007, which is hereby incorporated by reference herein in its entirety.

What is claimed is:

1. An information processing apparatus to transmit image formation data, specifying content to be printed, to an image forming apparatus, and the image forming apparatus to print based on the image formation data,
    wherein the information processing apparatus comprises:
        an instruction unit that instructs printing;
        a content data acquisition unit that acquires content data, including variable data, to be printed in a case where the instruction unit issues a print instruction;
        a content data transmission unit that transmits the content data acquired by the content data acquisition unit to the image forming apparatus and transmits a thumbnail image based on the content data to the instruction unit before the image formation data is transmitted;

an identification information acquisition unit that acquires, from the image forming apparatus, identification information of the content data transmitted from the content data transmission unit;

an image formation data generation unit that generates image formation data for forming the image, using the identification information; and an image formation data transmission unit that transmits the image formation data generated by the image formation data generation unit to the image forming apparatus, wherein the image forming apparatus comprises:

a rasterizing unit that rasterizes the content data transmitted by the content data transmission unit to image data before the image formation data transmission unit transmits the image formation data;

a storage unit that stores the image data rasterized by the rasterizing unit and the identification information, the image data and the identification information being related to each other; and a performing unit that performs printing processing based on the image data corresponding to the identification information specified by the image formation data transmitted by the image formation data transmission unit.

2. A method for transmitting image formation data, specifying content to be printed, to an image forming apparatus, and the image forming apparatus printing based on the image formation data, the method comprising:

instructing printing;

acquiring content data, including variable data, to be printed in a case where the printing is instructed;

transmitting the acquired content data to the image forming apparatus and transmitting a thumbnail image based on the content data, before the image formation data is transmitted;

acquiring, from the image forming apparatus, identification information of the transmitted content data;

generating image formation data for forming the image, using the identification information;

transmitting the generated image formation data to the image forming apparatus;

rasterizing the transmitted content data to image data before transmitting the image formation data;

storing the rasterized image data and the identification information, the image data and the identification information being related to each other; and performing printing processing based on the image data corresponding to the identification information specified by the image formation data.

3. A non-transitory computer-readable storage medium storing instructions which, when executed by a print system composed of an information processing apparatus and an image forming apparatus, causes the print system to execute operations comprising:

instructing printing;

acquiring content data, including variable data, to be printed in a case where the printing is instructed;

transmitting the acquired content data to the image forming apparatus and transmitting a thumbnail image based on the content data, before the image formation data is transmitted;

acquiring, from the image forming apparatus, identification information of the transmitted content data;

generating image formation data for forming the image, using the identification information;

transmitting the generated image formation data to the image forming apparatus;

rasterizing the transmitted content data to image data before transmitting the image formation data;

storing the rasterized image data and the identification information, the image data and the identification information being related to each other; and performing printing processing based on the image data corresponding to the identification information specified by the image formation data.

* * * * *